(12) United States Patent
Gotou et al.

(10) Patent No.: US 6,424,106 B2
(45) Date of Patent: Jul. 23, 2002

(54) MOTOR

(75) Inventors: Makoto Gotou, Nishinomiya; Masaaki Ochi, Hirakata; Hideaki Mori, Moriguchi; Hideki Nishino, Takatsuki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/820,450

(22) Filed: Mar. 29, 2001

(30) Foreign Application Priority Data

Mar. 31, 2000 (JP) .................................... 2000-097299

(51) Int. Cl.[7] .............................................. H02P 6/02
(52) U.S. Cl. ........................ 318/254; 318/138; 318/439
(58) Field of Search ................................ 318/254, 138, 318/439

(56) References Cited

U.S. PATENT DOCUMENTS

| | | | |
|---|---|---|---|
| 4,900,993 A | * 2/1990 | Yasohara et al. | 318/138 |
| 5,122,715 A | 6/1992 | Kimura et al. | 318/138 |
| 5,473,232 A | * 12/1995 | Tamaki et al. | 318/254 |
| 5,530,326 A | * 6/1996 | Galvin et al. | 318/254 |
| 5,616,996 A | * 4/1997 | Tang et al. | 318/254 |
| 5,886,486 A | * 3/1999 | Jeong et al. | 318/254 |
| 5,982,118 A | 11/1999 | Gotou et al. | |
| 5,982,133 A | * 11/1999 | Murakami et al. | 318/254 |

* cited by examiner

Primary Examiner—Robert E. Nappi
Assistant Examiner—Rita Leykin
(74) Attorney, Agent, or Firm—Akin, Gump, Strauss, Hauer & Feld, L.L.P.

(57) ABSTRACT

FET power transistors of a power supplying part execute high-frequency switching operation and form current paths to three-phase windings. A voltage detecting part compares terminal voltages of the three-phase windings and produces a detected pulse signal in response to a comparison result. A state shifting part and an activation control part control active periods of the FET power transistors in response to the detected pulse signal. A commanding part produces a command signal in response to an output pulse signal of the voltage detecting means. A switching operation block produces a switching pulse signal in response to a comparison result of a current-detection signal with the command signal, and causes at least an FET power transistor of the power supplying part to perform high-frequency switching in response to the switching pulse signal. The state shifting part produces a timing signal after an adjust time from the detection of the detected pulse signal and shift-holds a holding state in response to the timing signal. The state shifting part changes the adjust time smaller in case that the command signal is larger than a predetermined value, thereby making the product value of the adjust time and the rotational speed smaller in the case.

23 Claims, 28 Drawing Sheets

F I G. 20
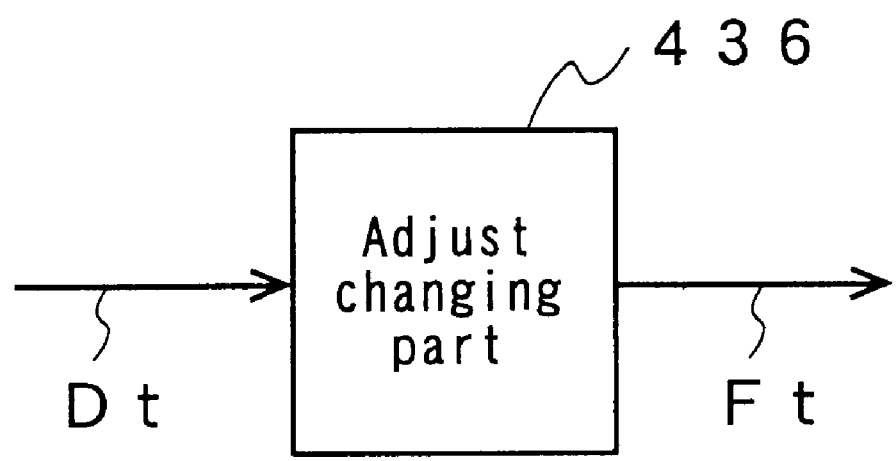

MOTOR

BACKGROUND OF THE INVENTION

The present invention relates to a motor wherein current paths to windings are altered with a plurality of transistors without using position detecting elements.

PRIOR ART

In recent years, motors wherein current paths are altered electronically with a plurality of transistors have been used widely as drive motors for office automation apparatuses and audio-visual apparatuses. These motors are included in disk drive apparatuses, such as optical disk drive apparatuses (DVD apparatuses, CD apparatuses, etc.) and magnetic disk drive apparatuses (HDD apparatuses, FDD apparatuses, etc.). A motor wherein current paths to windings are altered with PNP-type bipolar power transistors and NPN-type bipolar power transistors is available as an example of the above-mentioned motors.

FIG. 28 shows a conventional motor, and its operation will be described below. A rotor 2011 has a field part formed by a permanent magnet. Three position detecting elements of a position detector 2041 detect the magnetic field of the field part of the rotor 2011. In other words, the position detector 2041 generates two sets of voltage signals, Kp1, Kp2 and Kp3, and Kp4, Kp5 and Kp6, from the three-phase output signals of the three position detecting elements in response to the rotation of the rotor 2011. A first distributor 2042 generates three-phase low-side signals Lp1, Lp2 and Lp3 responding with the voltage signals Kp1, Kp2 and Kp3 respectively to control the activation of low-side NPN-type bipolar power transistors 2021, 2022 and 2023. A second distributor 2043 generates three-phase high-side signals Mp1, Mp2 and Mp3 responding with the voltage signals Kp4, Kp5 and Kp6 respectively to control the activation of high-side PNP-type bipolar power transistors 2025, 2026 and 2027. As a result, three-phase drive voltages are supplied to windings 2012, 2013 and 2014.

In this conventional configuration, it is a problem that power losses of the power transistors are large. This is because that the NPN-type bipolar power transistors 2021, 2022 and 2023 and the PNP-type bipolar power transistors 2025, 2026 and 2027 supply drive voltages having necessary amplitudes to the windings 2012, 2013 and 2014 by controlling the voltage drop across the emitter and the collector in an analog manner. When the drive voltages are supplied, a voltage drop in each bipolar power transistor is large. As a result, a large power loss produced by the product value of the voltage drop and the drive current to the winding is caused, resulting in a large heat generation. To reduce this power loss, it is known to perform PWM drive (pulse drive voltages are supplied to the windings). For example, U.S. Pat. No. 5,982,118 discloses an example wherein a method of PWM-controlling power transistors by using two sensor outputs is used to reduce power losses.

However, the above-mentioned conventional example and U.S. Pat. No. 5,982,118 include three or two position detecting elements for detecting the rotational position of the rotor. For this reason, the spaces, connecting wires, etc. for the position detecting elements are required and become complicated, resulting in a high cost.

On the other hand, it is known that sensorless drive is performed to eliminate position detecting elements. U.S. Pat. No. 5,122,715 and U.S. Pat. No. 5,473,232 disclose a motor wherein the terminal voltages of windings are detected and current paths to the windings are altered in response to the timing of the detection. In U.S. Pat. No. 5,122,715, the width of activation has an electrical angle of 120 degrees, thereby having disadvantages of a large vibration and a large acoustic noise. The patent also discloses a complicated configuration having a switching regulator. In U.S. Pat. No. 5,473,232, power losses are reduced by making PWM switching of power transistors. However, the width of the activation for each power transistor has an electrical angle of 120 degrees, thereby having disadvantages of a large vibration and a large acoustic noise.

It is therefore an object of the present invention to provide a motor capable of solving one or all of the above-mentioned problems.

BRIEF SUMMARY OF THE INVENTION

The motor in accordance with the main aspect of the present invention comprises:

a rotor which has a field part generating field fluxes;

Q-phase windings (Q is an integer of 3 or more);

voltage supplying means which includes two output terminals for supplying a DC voltage;

power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;

voltage detecting means for producing a detected pulse signal in response to terminal voltages of said Q-phase windings;

state shifting means for shift-holding a holding state from one state to at least one other state in sequence in response to the detected pulse signal of said voltage detecting means;

activation control means for controlling active periods of said Q first FET power transistors and said Q second FET power transistors in response to said holding state;

commanding means for producing a command signal in response to an output pulse signal of said voltage detecting means; and switching operation means for causing at least one of said Q first FET power transistors and said Q second FET power transistors to perform high-frequency switching in response to said command signal;

and that said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees, said switching operation means produces a switching pulse signal in response to said command signal, and makes high-frequency switching operation of at least one FET power transistor among said Q first FET power transistors and said Q second FET power transistors in response to said switching pulse signal, and said state shifting means includes:

adjusting means for producing a timing signal after an adjust time from detection of said detected pulse signal, shift hold means for shift-holding said holding state in response to said timing signal, and adjust changing means for changing said adjust time of said adjusting means smaller in case that said command signal is larger than a predetermined value, thereby making the product value of said adjust time and said rotational speed of said rotor smaller in said case.

With this configuration, the switching operation means causes at least one of the FET power transistors of the power supplying means to perform high-frequency switching operation in response to the command signal. Therefore, power losses at the FET power transistors of the power supplying means can be reduced significantly, whereby the power efficiency of the motor can be improved greatly.

The voltage detecting means produces the detected pulse signal in response to the terminal voltages of the windings, the state shifting means shifts the phases of the activation to the windings in response to the detected pulse signal, and the activation control means control the active periods of the FET power transistors so as to rotate the rotor in a predetermined direction. Therefore, no position detecting element is required, and the configuration of the motor becomes simplified.

When the command signal of the commanding means becomes larger than a predetermined value, the adjust time to the output of the timing signal from the detected pulse signal is changed so that the product value of the adjust time and the rotational speed of the rotor becomes smaller. Hence, the active periods of the FET power transistors become shortened. Since the command signal becomes larger than the predetermined value during a rotor acceleration period, the active periods of the FET power transistors become shorter. As a result, the voltage detecting means can be prevented from detecting improperly the terminal voltages of the windings, and a stable acceleration can be attained easily.

Further, since the command signal also becomes larger than the predetermined value because of a large load torque, the active periods of the FET power transistors become shorter. As a result, the voltage detecting means can be prevented from detecting improperly the terminal voltages of the windings, and a stable rotation can also be attained even when a load torque is large.

The command signal becomes smaller than the predetermined value during a stable speed control period, and the adjust time becomes longer. Therefore, the active periods (the active electrical angles) of the FET power transistors are made considerably longer than an electrical angle of 360/Q degrees. As a result, the activation widths of the windings are made larger. It is thus possible to reduce acoustic noise and vibration of the motor with a stable rotation.

Since the change operation of the adjust time is carried out in response to the command signal, it is not necessary to provide new connecting wires for the change operation extended from the commanding means such as a speed control circuit. The configuration of the motor can thus be simplified. As a result, a motor performing a stable sensorless operation with reduced power loss, reduced vibration and reduced acoustic noise can be attained at a low cost according to the present invention.

The motor in accordance with another aspect of the present invention comprises:

a rotor which has a field part generating field fluxes;

Q-phase windings (Q is an integer of 3 or more);

voltage supplying means which includes two output terminals for supplying a DC voltage;

power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;

voltage detecting means for producing a detected pulse signal in response to terminal voltages of said Q-phase windings;

state shifting means for shift-holding a holding state from one state to at least one other state in sequence in response to the detected pulse signal of said voltage detecting means;

activation control means for controlling active periods of said Q first FET power transistors and said Q second FET power transistors in response to said holding state;

commanding means for producing a command signal in response to an output pulse signal of said voltage detecting means; and switching operation means for causing at least one of said Q first FET power transistors and said Q second FET power transistors to perform high-frequency switching in response to said command signal;

and that said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees, said switching operation means produces a switching pulse signal in response to said command signal, and makes high-frequency switching operation of at least one FET power transistor among said Q first FET power transistors and said Q second FET power transistors in response to said switching pulse signal, and said state shifting means includes:

adjusting means for producing a first timing signal after a first adjust time from detection of said detected pulse signal and a second timing signal after a second adjust time from detection of said detected pulse signal, said second adjust time being larger than said first adjust time, shift hold means for shift-holding said holding state from a first state to a second state after said first adjust time from detection of said detected pulse signal in response to said first timing signal, and further shift-holding said holding state from said second state to a third state after said second adjust time from detection of said detected pulse signal in response to said second timing signal, and adjust changing means for changing at least said second adjust time of said adjusting means smaller in case that said command signal is larger than a predetermined value, thereby making the product value of said second adjust time and said rotational speed of said rotor smaller in said case.

With this configuration, the switching operation means causes at least one of the FET power transistors of the power supplying means to perform high-frequency switching operation in response to the command signal. Therefore, power losses at the FET power transistors of the power supplying means can be reduced significantly, whereby the power efficiency of the motor can be improved greatly.

The voltage detecting means produces the detected pulse signal in response to the terminal voltages of the windings, the state shifting means shifts the phases of the activation to the windings in response to the detected pulse signal, and the activation control means control the active periods of the FET power transistors so as to rotate the rotor in a predetermined direction. Therefore, no position detecting element is required, and the configuration of the motor becomes simplified.

When the command signal of the commanding means becomes larger than a predetermined value, the second adjust time to the output of the second timing signal from the detected pulse signal is changed so that the product value of the adjust time and the rotational speed of the rotor becomes smaller. Hence, the active periods of the FET power transistors become shortened. Since the command signal becomes larger than the predetermined value during a rotor acceleration period, the active periods of the FET power transistors become shorter. As a result, the voltage detecting means can be prevented from detecting improperly the terminal voltages of the windings, and a stable acceleration can be attained easily.

Further, since the command signal also becomes larger than the predetermined value because of a large load torque, the active periods of the FET power transistors become shorter. As a result, the voltage detecting means can be prevented from detecting improperly the terminal voltages of the windings, and a stable rotation can also be attained even when a load torque is large.

The command signal becomes smaller than the predetermined value during a stable speed control period, and the second adjust time becomes longer. Therefore, the active periods (the active electrical angles) of the FET power transistors are made considerably longer than an electrical angle of 360/Q degrees. As a result, the activation widths of the windings are made larger. It is thus possible to reduce acoustic noise and vibration of the motor with a stable rotation.

Since the change operation of the adjust time is carried out in response to the command signal, it is not necessary to provide new connecting wires for the change operation extended from the commanding means such as a speed control circuit. The configuration of the motor can thus be simplified. As a result, a motor performing a stable sensorless operation with reduced power loss, reduced vibration and reduced acoustic noise can be attained at a low cost according to the present invention.

The motor in accordance with another aspect of the present invention comprises:

a rotor which has a field part generating field fluxes;

Q-phase windings (Q is an integer of 3 or more);

voltage supplying means which includes two output terminals for supplying a DC voltage;

power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;

voltage detecting means for producing a detected pulse signal in response to terminal voltages of said Q-phase windings;

state shifting means for shift-holding a holding state from one state to at least one other state in sequence in response to the detected pulse signal of said voltage detecting means;

activation control means for controlling active periods of said Q first FET power transistors and said Q second FET power transistors in response to said holding state;

commanding means for producing a command signal in response to an output pulse signal of said voltage detecting means; and switching operation means for causing at least one of said Q first FET power transistors and said Q second FET power transistors to perform high-frequency switching in response to said command signal;

and that said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees, said switching operation means produces a switching pulse signal in response to said command signal, and makes high-frequency switching operation of at least one FET power transistor among said Q first FET power transistors and said Q second FET power transistors in response to said switching pulse signal, and said state shifting means, in cooperation with said activation control means, changes active periods of said Q-phase first activation control signals and said Q-phase second activation control signals smaller in case that said command signal is larger than a predetermined value, each of said active periods of said Q-phase first activation control signals and said Q-phase second activation control signals being an electrical angle which is larger than 360/Q degrees.

With this configuration, the switching operation means causes at least one of the FET power transistors of the power supplying means to perform high-frequency switching operation in response to the command signal. Therefore, power losses at the FET power transistors of the power supplying means can be reduced significantly, whereby the power efficiency of the motor can be improved greatly.

The voltage detecting means produces the detected pulse signal in response to the terminal voltages of the windings, the state shifting means shifts the phases of the activation to the windings in response to the detected pulse signal, and the activation control means control the active periods of the FET power transistors so as to rotate the rotor in a predetermined direction. Therefore, no position detecting element is required, and the configuration of the motor becomes simplified.

When the command signal of the commanding means becomes larger than a predetermined value, the active periods (the active electrical angles) of the first activation control signals and the second activation control signals are changed to become smaller, but each of the active periods being larger than an electrical angle of 360/Q degrees. Hence, the active periods (the active electrical angles) of the FET power transistors become shortened. Since the command signal becomes larger than the predetermined value during a rotor acceleration period, the active periods of the FET power transistors become shorter. As a result, the voltage detecting means can be prevented from detecting improperly the terminal voltages of the windings, and a stable acceleration can be attained easily.

Further, since the command signal also becomes larger than the predetermined value because of a large load torque, the active periods of the FET power transistors become shorter. As a result, the voltage detecting means can be prevented from detecting improperly the terminal voltages of the windings, and a stable rotation can also be attained even when a load torque is large.

The command signal becomes smaller than the predetermined value during a stable speed control period, and the active periods of the first activation control signals and the second activation control signals become longer. Therefore, the active periods of the FET power transistors are made considerably longer than an electrical angle of 360/Q degrees. As a result, the activation widths of the windings are made larger. It is thus possible to reduce acoustic noise and vibration of the motor with a stable rotation.

Since the change operation of the adjust time is carried out in response to the command signal, it is not necessary to provide new connecting wires for the change operation extended from the commanding means such as a speed control circuit. The configuration of the motor can thus be simplified. As a result, a motor performing a stable sensorless operation with reduced power loss, reduced vibration and reduced acoustic noise can be attained at a low cost according to the present invention.

The motor in accordance with the another aspect of the present invention comprises:
 a rotor which has a field part generating field fluxes;
 Q-phase windings (Q is an integer of 3 or more);
 voltage supplying means which includes two output terminals for supplying a DC voltage;
 power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;
 voltage detecting means for producing a detected pulse signal in response to terminal voltages of said Q-phase windings;
 state shifting means for shift-holding a holding state from one state to at least one other state in sequence in response to the detected pulse signal of said voltage detecting means;
 activation control means for controlling active periods of said Q first FET power transistors and said Q second FET power transistors in response to said holding state;
 commanding means for producing a command signal in response to an output pulse signal of said voltage detecting means; and
 switching operation means for causing at least one of said Q first FET power transistors and said Q second FET power transistors to perform high-frequency switching in response to said command signal;

and that
 said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees,
 said switching operation means produces a switching pulse signal in response to said command signal, and makes high-frequency switching operation of at least one FET power transistor among said Q first FET power transistors and said Q second FET power transistors in response to said switching pulse signal, and
 said state shifting means includes:
  adjusting means for producing a timing signal after an adjust time from detection of said detected pulse signal and another timing signal after another adjust time from detection of said detected pulse signal,
  shift hold means for shift-holding said holding state in response to said timing signal, and
  adjust changing means for changing said adjust time and said another adjust time of said adjusting means smaller in case that said command signal is larger than a predetermined value, thereby making the product value of said adjust time and said rotational speed of said rotor smaller and the product value of said another adjust time and said rotational speed of said rotor smaller in said case, and
  said voltage detecting means stops detecting of said detected pulse signal from a pulse timing of said detected pulse signal to said another adjust time by said another timing signal, said another adjust time being larger than said adjust time.

With this configuration, the switching operation means causes at least one of the FET power transistors of the power supplying means to perform high-frequency switching operation in response to the command signal. Therefore, power losses at the FET power transistors of the power supplying means can be reduced significantly, whereby the power efficiency of the motor can be improved greatly.

The voltage detecting means produces the detected pulse signal in response to the terminal voltages of the windings, the state shifting means shifts the phases of the activation to the windings in response to the detected pulse signal, and the activation control means control the active periods of the FET power transistors so as to rotate the rotor in a predetermined direction. Therefore, no position detecting element is required, and the configuration of the motor becomes simplified.

When the command signal of the commanding means becomes larger than a predetermined value, the adjust time to the output of the timing signal from the detected pulse signal is changed so that the product value of the adjust time and the rotational speed of the rotor becomes smaller. Hence, the active periods of the FET power transistors become shortened. Furthermore, when the command signal of the commanding means becomes larger than the predetermined value, the another adjust time to the output of the another timing signal from the detected pulse signal is changed so that the product value of the another adjust time and the rotational speed of the rotor becomes smaller. The stop period of the detected pulse signal detecting operation in the voltage detecting means become shortened. Since the command signal becomes larger than the predetermined value during a rotor acceleration period, the active periods (the active electrical angles) of the FET power transistors and the stop period (the stop electrical angle) of the detecting operation become shorter during acceleration. As a result, the voltage detecting means can be prevented from detecting improperly the terminal voltages of the windings, and a stable acceleration can be attained easily.

Further, since the command signal also becomes larger than the predetermined value because of a large load torque, the active periods of the FET power transistors and the stop period of the detecting operation become shorter. As a result, the voltage detecting means can be prevented from detecting improperly the terminal voltages of the windings, and a stable rotation can also be attained even when a load torque is large.

The command signal becomes smaller than the predetermined value during a stable speed control period, and the adjust time and the another adjust time become longer. Therefore, the active periods (the active electrical angles) of the FET power transistors are made considerably longer than an electrical angle of 360/Q degrees and the stop period (the stop electrical angle) of the detecting operation is made longer. As a result, the activation widths of the windings are made larger. It is thus possible to reduce acoustic noise and vibration of the motor with a stable rotation.

Since the change operation of the adjust time is carried out in response to the command signal, it is not necessary to provide new connecting wires for the change operation extended from the commanding means such as a speed control circuit. The configuration of the motor can thus be simplified. As a result, a motor performing a stable sensor-less operation with reduced power loss, reduced vibration and reduced acoustic noise can be attained at a low cost according to the present invention.

The motor in accordance with the another aspect of the present invention comprises:

a rotor which has a field part generating field fluxes;

Q-phase windings (Q is an integer of 3 or more);

voltage supplying means which includes two output terminals for supplying a DC voltage;

power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;

voltage detecting means for producing a detected pulse signal in response to terminal voltages of said Q-phase windings;

state shifting means for shift-holding a holding state from one state to at least one other state in sequence in response to the detected pulse signal of said voltage detecting means;

activation control means for controlling active periods of said Q first FET power transistors and said Q second FET power transistors in response to said holding state;

commanding means for producing a command signal in response to an output pulse signal of said voltage, detecting means; and switching operation means for causing at least one of said Q first FET power transistors and said Q second FET power transistors to perform high-frequency switching in response to said command signal;

and that said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees, said switching operation means produces a switching pulse signal in response to said command signal, and makes high-frequency switching operation of at least one FET power transistor among said Q first FET power transistors and said Q second FET power transistors in response to said switching pulse signal, and said state shifting means includes:

adjusting means for producing a first timing signal after a first adjust time from detection of said detected pulse signal, a second timing signal after a second adjust time from detection of said detected pulse signal, and a third timing signal after a third adjust time from detection of said detected pulse signal, said second adjust time being larger than said first adjust time, shift hold means for shift-holding said holding state from a first state to a second state after said first adjust time from detection of said detected pulse signal in response to said first timing signal, and further shift-holding said holding state from said second state to a third state after said second adjust time from detection of said detected pulse signal in response to said second timing signal, and adjust changing means for changing at least said third adjust time of said adjusting means smaller in case that said command signal is larger than a predetermined value, thereby making the product value of said third adjust time and said rotational speed of said rotor smaller in said case, and said voltage detecting means stops detecting of said detected pulse signal from a pulse timing of said detected pulse signal to said third adjust time in response to said third timing signal, said third adjust time being larger than said second adjust time and substantially proportional to an interval of said detected pulse signal.

With this configuration, the switching operation means causes at least one of the FET power transistors of the power supplying means to perform high-frequency switching operation in response to the command signal. Therefore, power losses at the FET power transistors of the power supplying means can be reduced significantly, whereby the power efficiency of the motor can be improved greatly.

The voltage detecting means produces the detected pulse signal in response to the terminal voltages of the windings, the state shifting means shifts the phases of the activation to the windings in response to the detected pulse signal, and the activation control means control the active periods of the FET power transistors so as to rotate the rotor in a predetermined direction. Therefore, no position detecting element is required, and the configuration of the motor becomes simplified.

When the command signal of the commanding means becomes larger than a predetermined value, the third adjust time to the output of the third timing signal from the detected pulse signal is changed so that the product value of the third adjust time and the rotational speed of the rotor becomes smaller. Hence, the stop period (the stop electrical angle) of the detected pulse signal detecting operation in the voltage detecting means become shortened. Since the command signal becomes larger than the predetermined value during a rotor acceleration period, the third adjust time becomes shorter and the stop period of the detecting operation becomes shorter during acceleration. As a result, the voltage detecting means can be prevented from detecting improperly the terminal voltages of the windings, and a stable acceleration can be attained easily.

Further, since the command signal also becomes larger than the predetermined value because of a large load torque, the third adjust time becomes shorter and the stop period of the detecting operation becomes shorter. As a result, the voltage detecting means can be prevented from detecting improperly the terminal voltages of the windings, and a stable rotation can also be attained.

The command signal becomes smaller than the predetermined value during a stable speed control period, and the third adjust time becomes longer. The stop period (the stop electrical angle) of the detected pulse signal detecting operation in the voltage detecting means becomes longer. Therefore, the active periods (the active electrical angles) of the FET power transistors can be made considerably longer than an electrical angle of 360/Q degrees. As a result, the activation widths of the windings can be made larger. It is thus possible to reduce acoustic noise and vibration of the motor with a stable rotation.

Since the change operation of the adjust time is carried out in response to the command signal, it is not necessary to provide new connecting wires for the change operation extended from the commanding means such as a speed control circuit. The configuration of the motor can thus be simplified. As a result, a motor performing a stable sensorless operation with reduced power loss, reduced vibration and reduced acoustic noise can be attained at a low cost according to the present invention.

The motor in accordance with another aspect of the present invention comprises:

a rotor which has a field part generating field fluxes;

Q-phase windings (Q is an integer of 3 or more);

voltage supplying means which includes two output terminals for supplying a DC voltage;

power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;

voltage detecting means for producing a detected pulse signal in response to terminal voltages of said Q-phase windings;

state shifting means for shift-holding a holding state from one state to at least one other state in sequence in response to the detected pulse signal of said voltage detecting means;

activation control means for controlling active periods of said Q first FET power transistors and said Q second FET power transistors in response to said holding state;

commanding means for producing a command signal in response to an output pulse signal of said voltage detecting means; and switching operation means for causing at least one of said Q first FET power transistors and said Q second FET power transistors to perform high-frequency switching in response to said command signal;

and that said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees, said switching operation means produces a switching pulse signal in response to said command signal, and makes high-frequency switching operation of at least one FET power transistor among said Q first FET power transistors and said Q second FET power transistors in response to said switching pulse signal, said state shifting means, in cooperation with said activation control means, changes active periods of said Q-phase first activation control signals and said Q-phase second activation control signals smaller in case that said command signal is larger than a predetermined value, each of said active periods of said Q-phase first activation control signals and said Q-phase second activation control signals being an electrical angle which is larger than 360/Q degrees, and said voltage detecting means stops detecting of said detected pulse signal from a pulse timing of said detected pulse signal to an adjust time, the product value of said adjust time and said rotational speed of said rotor being changed smaller in said case.

With this configuration, the switching operation means causes at least one of the FET power transistors of the power supplying means to perform high-frequency switching operation in response to the command signal. Therefore, power losses at the FET power transistors of the power supplying means can be reduced significantly, whereby the power efficiency of the motor can be improved greatly.

The voltage detecting means produces the detected pulse signal in response to the terminal voltages of the windings, the state shifting means shifts the phases of the activation to the windings in response to the detected pulse signal, and the activation control means control the active periods of the FET power transistors so as to rotate the rotor in a predetermined direction. Therefore, no position detecting element is required, and the configuration of the motor becomes simplified.

When the command signal of the commanding means becomes larger than a predetermined value, the active periods (the active electrical angles) of the first activation control signals and the second activation control signals are changed to become smaller, but each of the active periods being larger than an electrical angle of 360/Q degrees. Hence, the active periods (the active electrical angles) of the FET power transistors are shortened. Furthermore, when the command signal of the commanding means becomes larger than a predetermined value, the adjust time to the output of the timing signal from the detected pulse signal is changed so that the product value of the adjust time and the rotational speed of the rotor becomes smaller. Hence, the stop period (the stop electrical angle) of the detected pulse signal detecting operation in the voltage detecting means become shortened. Since the command signal becomes larger than the predetermined value during a rotor acceleration period, the active periods of the first activation control signals and the second activation control signals and the stop period of the detected pulse signal detecting operation are changed to become smaller during acceleration. As a result, the voltage detecting means can be prevented from detecting improperly the terminal voltages of the windings, and a stable acceleration can be attained easily.

Further, since the command signal also becomes larger than the predetermined value because of a large load torque, the active periods of the first activation control signals and the second activation control signals and the stop period of the detected pulse signal detecting operation are changed to become smaller. As a result, the voltage detecting means can be prevented from detecting improperly the terminal voltages of the windings, and a stable rotation can also be attained.

The command signal becomes smaller than the predetermined value during a stable speed control period, and the active periods of the first activation control signals and the second activation control signals become considerably longer than an electrical angle of 360/Q degrees. Furthermore, the stop period of the detected pulse signal detecting operation in the voltage detecting means becomes longer. Therefore, the active periods of the FET power transistors are made considerably longer than an electrical angle of 360/Q degrees. As a result, the activation widths of the windings are made larger. It is thus possible to reduce acoustic noise and vibration of the motor with a stable rotation.

Since the change operation of the adjust time is carried out in response to the command signal, it is not necessary to provide new connecting wires for the change operation extended from the commanding means such as a speed control circuit. The configuration of the motor can thus be simplified. As a result, a motor performing a stable sensorless operation with reduced power loss, reduced vibration and reduced acoustic noise can be attained at a low cost according to the present invention.

These and other configurations and operations will be described in detail in the explanations of embodiments of the present invention.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 20 is a circuit diagram of an adjust changing part 436 replaceable to the adjust changing part 36 of the state shifting part 19 in accordance with the embodiment 1;

It will be recognized that some or all of the Figures are schematic representations for purposes of illustration and do not necessarily depict the actual relative sizes or locations of the elements shown.

DETAILED DESCRIPTION OF THE INVENTION

Embodiments of the present invention will be described below referring to the accompanying drawings.

EMBODIMENT 1

Figure 1:
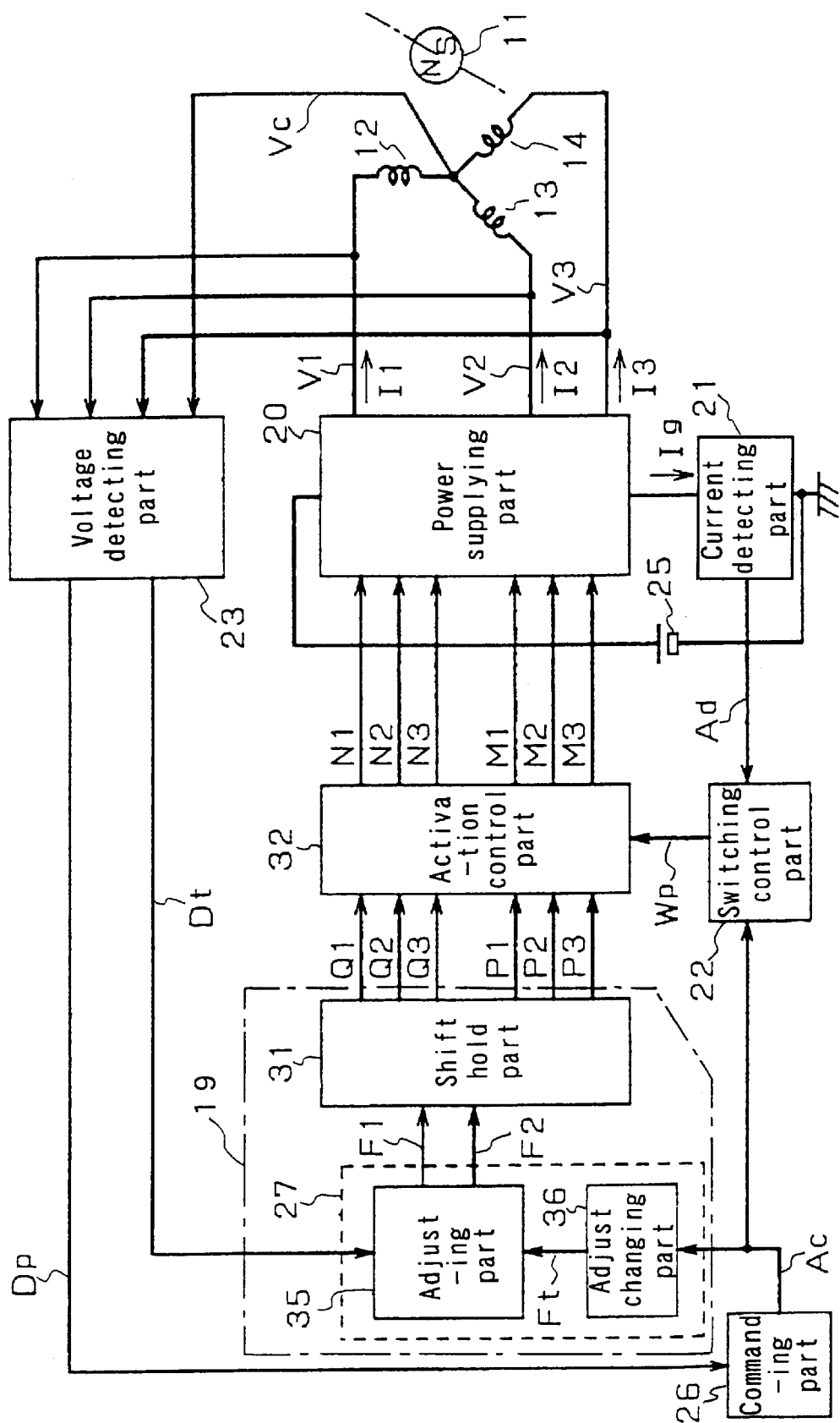
FIG. 1 is a diagram showing the configuration in accordance with embodiment 1 of the present invention.

FIGS. 1 to 12 show a motor in accordance with embodiment 1 of the present invention. FIG. 1 shows a comprehensive configuration of the motor. A rotor 11 is provided with a field part for generating field fluxes from a plurality of magnetic poles. Although a field part formed by a two-pole permanent magnet is herein shown, it is generally possible to form a multi-pole field part with a multi-pole magnet or with many magnetic pole pieces. Three-phase windings 12, 13 and 14 are disposed on a stator, each displaced from the others by an electrical angle of 120 degrees. An electrical angle of 360 degrees corresponds to an angle width of one set of the N and S poles in the field part of the rotor. The one end of each of the three-phase windings 12, 13 and 14 is commonly connected, and the other end thereof is used as a power supply terminal and connected to each output terminal of a power supplying part 20. The three-phase windings 12, 13 and 14 generate three-phase magnetic fluxes by three-phase drive current signals I1, I2 and I3, and also generate a drive force by the interaction between the field part of the rotor 11 and the drive current signals, thereby rotating the rotor 11.

The power supplying part 20 of FIG. 1 forms current paths from a voltage supplying part 25 to the three-phase windings 12, 13 and 14 in response to three-phase low-side activation control signals M1, M2 and M3 and three-phase high-side activation control signals N1, N2 and N3 of an activation control part 32, and supplies electric power to the three-phase windings 12, 13 and 14.

Figure 2:
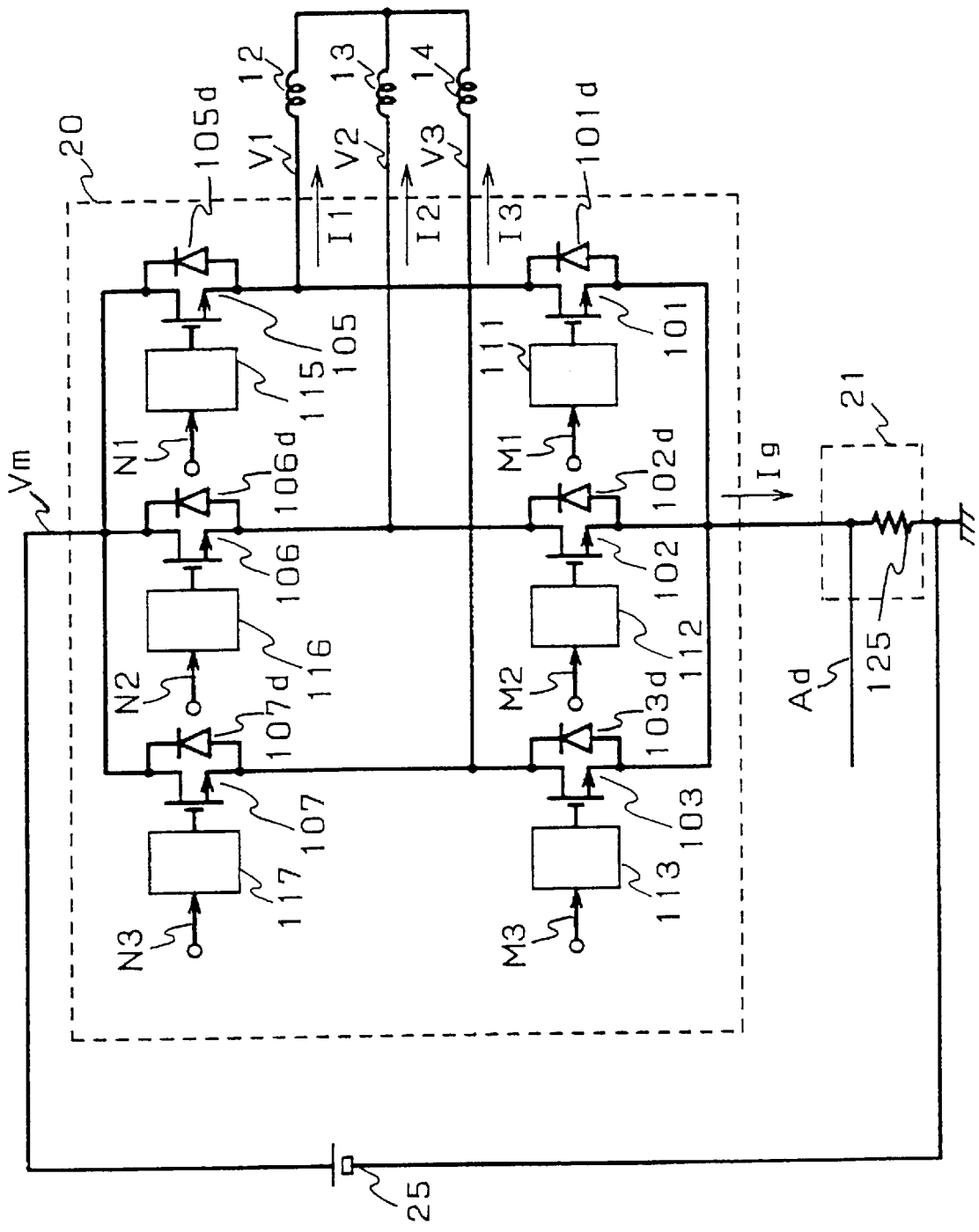
FIG. 2 is a circuit diagram of a power supplying part 20 and a current-detecting part 21 in accordance with the embodiment 1.

In other words, the power supplying part 20 shown in FIG. 1 is a circuit wherein the electric power from the voltage supplying part 25 is controlled in a predetermined way and supplied to the three-phase windings 12, 13 and 14. FIG. 2 shows a configuration of the power supplying part 20.

Three low-side FET power transistors 101, 102 and 103 shown in FIG. 2 form current supply paths between the negative terminal (ground-side terminal) of the voltage supplying part 25 and each of the power supply terminals of the windings 12, 13 and 14. In addition, three high-side FET power transistors 105, 106 and 107 shown in FIG. 2 form current supply paths between the positive terminal (Vm-side terminal) of the voltage supplying part 25 and each of the power supply terminals of the windings 12, 13 and 14.

Three high-side power diodes 105$d$, 106$d$ and 107$d$ are connected reversely in parallel with the high-side FET power transistors 105, 106 and 107, respectively (in a direction opposite to the direction of voltage application to each transistor).

Three low-side power diodes 101$d$, 102$d$ and 103$d$ are also connected reversely in parallel with the low-side FET power transistors 101, 102 and 103, respectively (in a direction opposite to the direction of voltage application to each transistor). The low-side power diodes 101$d$, 102$d$ and 103$d$ may be omitted.

In this embodiment, NMOS-FET power transistors are used as the low-side FET power transistors 101, 102 and 103 and the high-side FET power transistors 105, 106 and 107. Parasitic diodes formed so as to be reversely connected from the current flowing-out terminals to the current flowing-in terminals of the low-side FET power transistors 101, 102 and 103 and the high-side FET power transistors 105, 106 and 107 are used as the low-side power diodes 101$d$, 102$d$ and 103$d$ and the high-side power diodes 105$d$, 106$d$ and 107$d$, respectively.

The low-side FET power transistors and the high-side FET power transistors are not limited to FET transistors having the same polarity. FET transistors having different polarities can also be used. For example, PMOS-FET power transistors can be used as the high-side FET power transistors, and NMOS-FET power transistors can be used as the low-side FET power transistors. Furthermore, since an IGBT transistor controls its output current by using a field effect, the FET power transistors are not limited to FET transistors in the narrow sense of the word, but they can be IGBT transistors, which are a kind of FET transistors.

The low-side activate circuits 111, 112 and 113 of the power supplying part 20 turn ON/OFF the low-side FET power transistors 101, 102 and 103 in response to the low-side activation control signals M1, M2 and M3, respectively. The low-side FET power transistors 101, 102 and 103 form current paths for supplying the negative parts of the three-phase drive current signals I1, I2 and I3 to the three-phase windings 12, 13 and 14. Since the low-side activation control signals M1, M2 and M3 are digital PWM signals (pulse width modulation signals) in their respective active periods, the low-side FET power transistors 101, 102 and 103 perform ON-OFF high-frequency switching operation. When the low-side FET power transistor 101 is ON for example, the terminal voltage V1 of the winding 12 becomes 0 V or nearly 0 V, and the negative part of the drive current signal I1 is supplied to the winding 12. When the low-side FET power transistor 101 turns OFF, the high-side power diode 105$d$ becomes active, and the terminal voltage V1 of the winding 12 becomes Vm or nearly Vm or more, and the negative part of the drive current signal I1 is continuously supplied to the winding 12. Hence, the terminal voltage V1 of the winding 12 becomes a PWM voltage, the level of which digitally changes between nearly 0 V and nearly Vm. As a result, the terminal voltages V1, V2 and V3 of the windings 12, 13 and 14 become PWM voltages respectively in their respective active periods of the low-side FET power transistors 101, 102 and 103.

The high-side activate circuits 115, 116 and 117 of the power supplying part 20 turn ON/OFF the high-side FET power transistors 105, 106 and 107 in response to the high-side activation control signals N1, N2 and N3, respectively. The high-side FET power transistors 105, 106 and 107 form current paths for supplying the positive parts of the three-phase drive current signals I1 I2 and I3 to the three-phase windings 12, 13 and 14, respectively.

When NMOS-FET power transistors are used for the high-side FET power transistors, the high-side activate circuits output control signals for activating the high-side FET power transistors by using a high potential higher than the positive potential Vm of the voltage supplying part by a predetermined value. Therefore, the high-side activate circuits can fully turn on the NMOS-FET power transistors. Furthermore, the power losses of the high-side power diodes can be reduced by the complementary OFF-ON synchronous-rectifying switching operation of the high-side FET power transistors in phase with the low-side FET power transistors performing ON-OFF high-frequency switching operation.

A current-detecting part 21 includes a current detecting resistor 125, and outputs a current-detection signal Ad proportional to a composed supply current Ig from the voltage supplying part 25 to the three-phase windings 12, 13 and 14 via the low-side FET power transistors 101, 102 and 103. Since the low-side FET power transistors perform ON-OFF high-frequency switching operation, the composed supply current Ig and the current-detection signal Ad become pulse signals.

Figure 3:
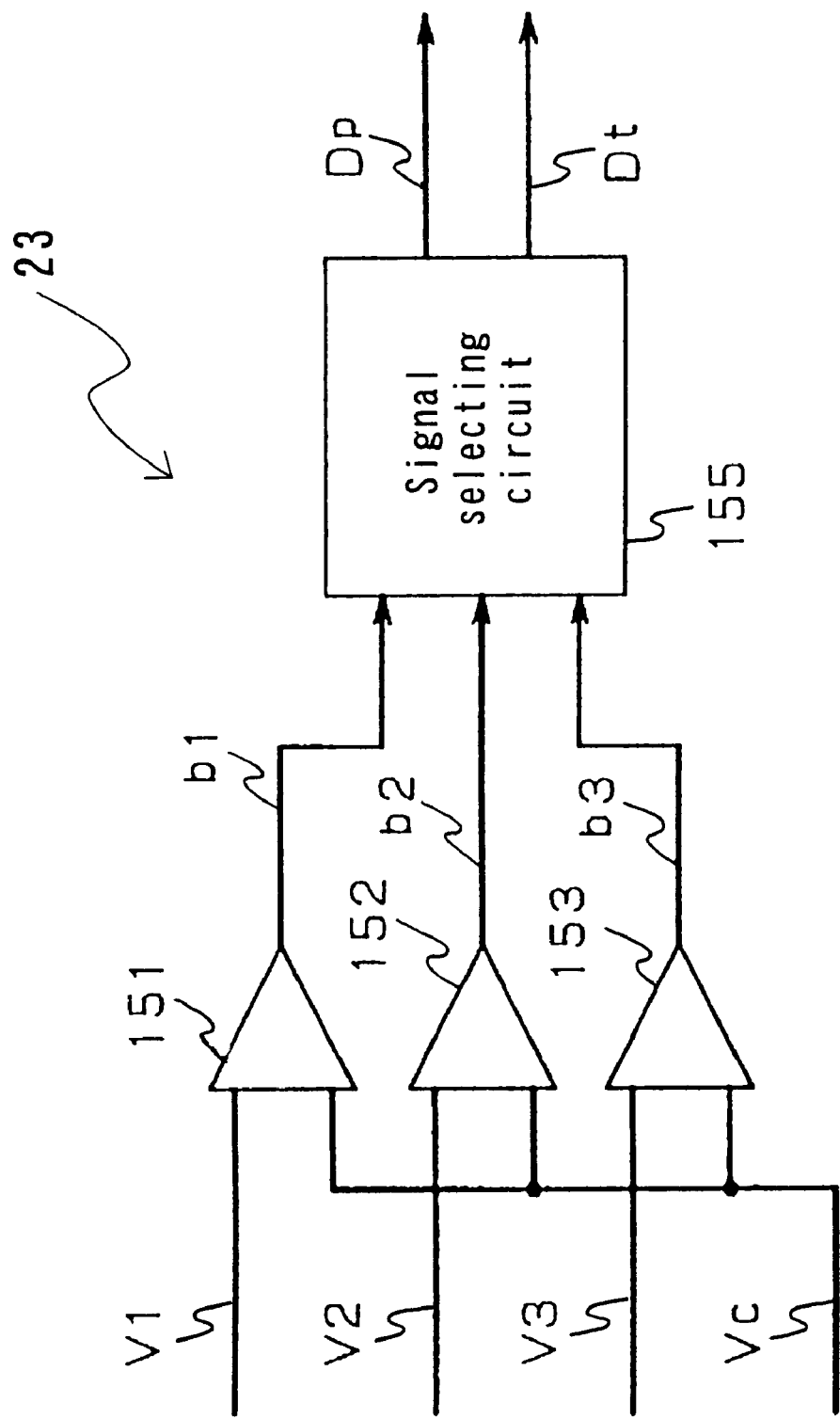
FIG. 3 is a circuit diagram of a voltage detecting part 23 in accordance with the embodiment 1.
Figure 4:
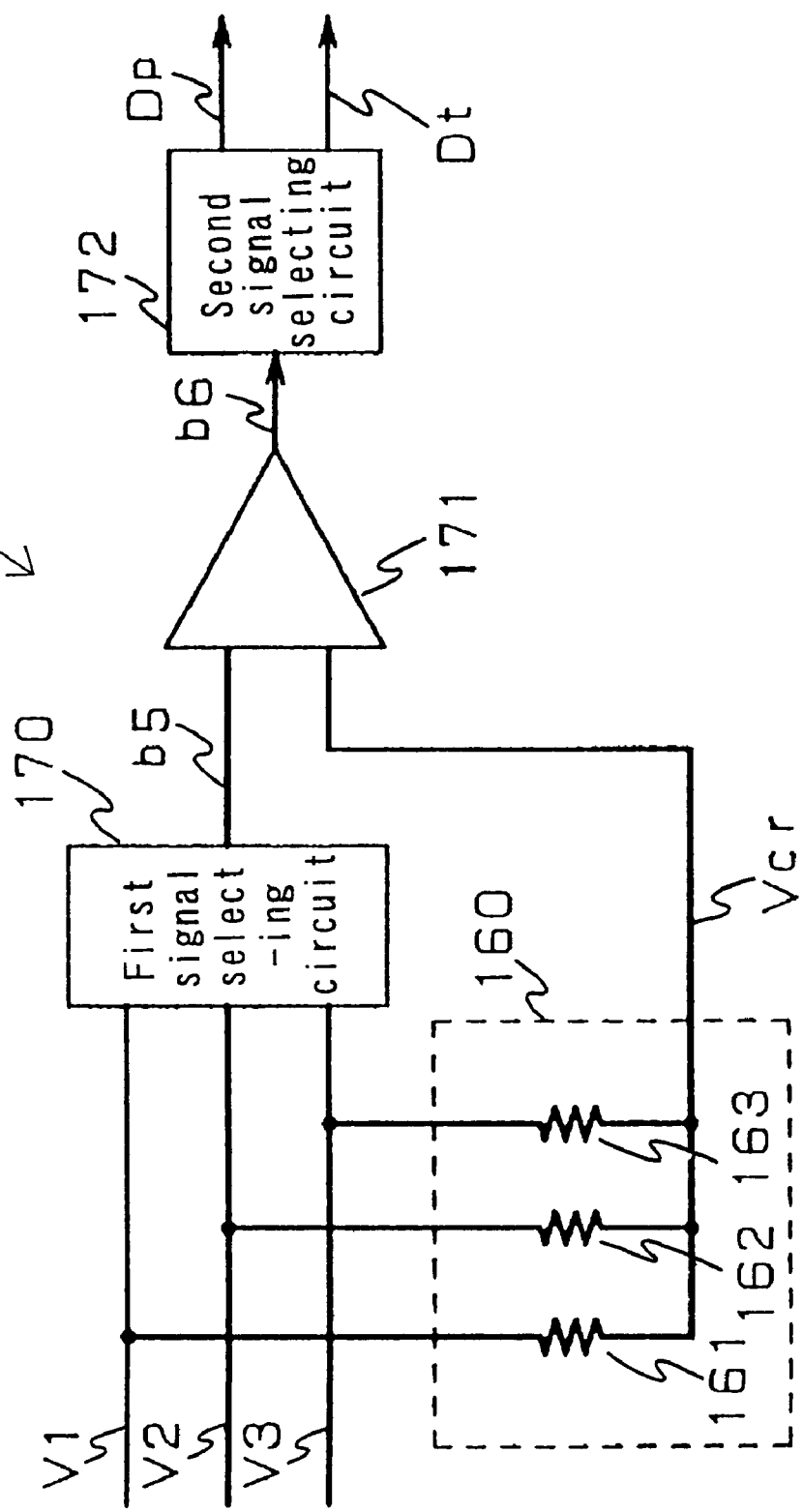
FIG. 4 is another circuit diagram of the voltage detecting part 23 in accordance with the embodiment 1.

The voltage detecting part 23 of FIG. 1 detects the terminal voltages of the windings and outputs a detected pulse signal. The three-phase terminal voltages V1, V2 and V3 at the power supply terminals of the three-phase windings 12, 13 and 14 and the common terminal voltage Vc at the common-connected terminal of the three-phase windings 12, 13 and 14 are input to the voltage detecting part 23. FIG. 3 or FIG. 4 shows a configuration of the voltage detecting part 23.

In FIG. 3, the three comparator circuits 151, 152 and 153 of the voltage detecting part 23 compare the three-phase terminal voltages V1, V2 and V3 with the common terminal voltage Vc, i.e., the voltage at the common connection point, and output three-phase compared pulse signals b1, b2 and b3 responding with the comparison result. A signal selecting circuit 155 selectively detects the rising edge or the falling edge of one of the compared pulse signals b1, b2 and b3 depending on the state of the activation to the windings, and outputs a detected pulse signal Dt by composing the detected edges. In addition, the signal selecting circuit 155 outputs a speed pulse signal Dp in response to the rising edges of the compared pulse signal b1 responding with the terminal voltage V1.

Figure 13:
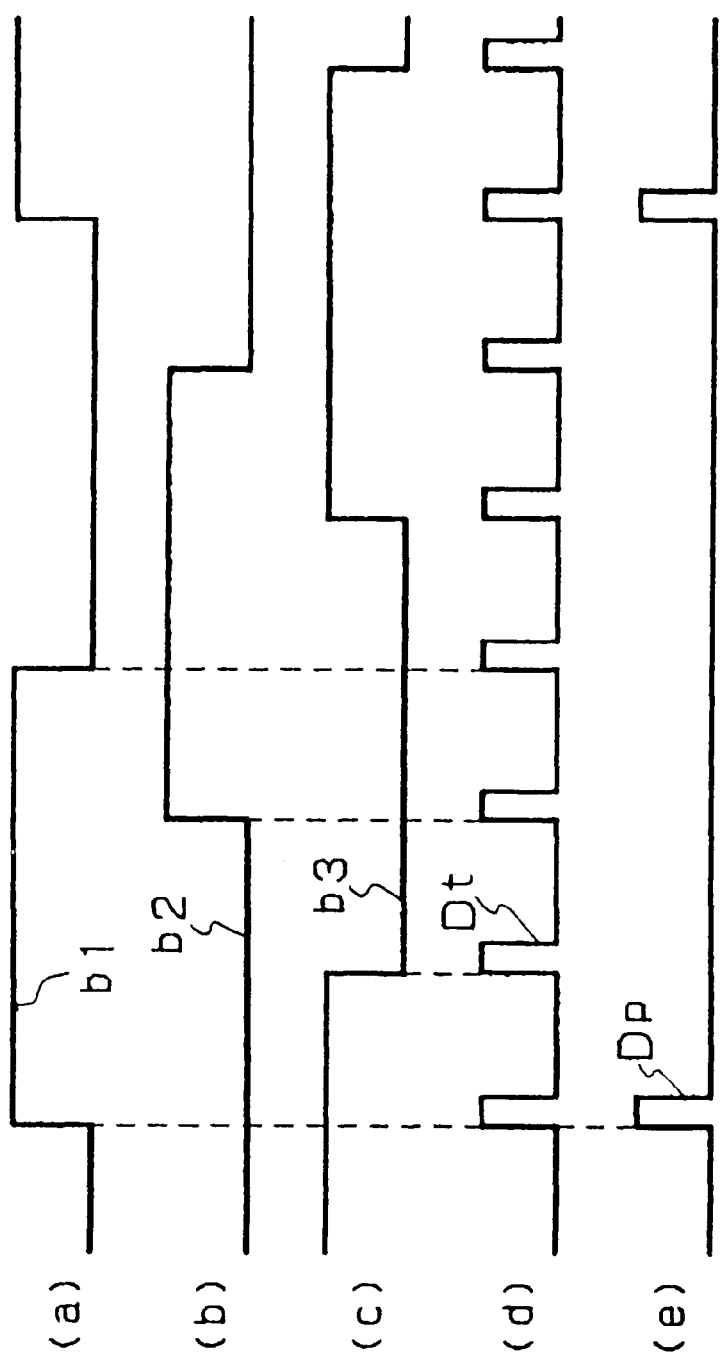
FIG. 13 is a waveform diagram illustrating the operation of the voltage detecting part 23 in accordance with the embodiment 1.

FIG. 13 shows waveforms for explaining the operation of the voltage detecting part 23. The part (d) in FIG. 13 shows the detected pulse signal Dt which is obtained by composing the selected and detected edges of the three-phase compared pulse signals b1, b2 and b3 shown in the parts (a), (b) and (c) in FIG. 13. The part (e) in FIG. 13 shows the speed pulse signal Dp corresponding to the rising edges of the compared pulse signal b1. The signal selecting circuit 155 eliminates PWM noises in the compared pulse signals b1, b2 and b3 caused by the PWM operation of the power supplying part 20. In addition, the signal selecting circuit 155 performs signal selection in response to the hold state of a shift hold part 31 described later.

FIG. 4 shows another configuration of the voltage detecting part 23. The voltage composing circuit 160 of the voltage detecting part produces a composed common voltage Vcr by composing the three-phase terminal voltages V1, V2 and V3 via resistors 161, 162 and 163. A first signal selecting circuit 170 selects one of the terminal voltages V1, V2 and V3 depending on the state of the activation to the windings in an analog manner and outputs it to a comparator circuit 171 as a selected output signal b5. The comparator circuit 171 compares the selected terminal voltage with the composed common voltage Vcr and outputs a compared pulse signal b6 in response to the comparison result. A second signal selecting circuit 172 selects the detected edge of the compared pulse signal b6 in response to the state of the activation to the windings and outputs the detected pulse signal Dt and the speed pulse signal Dp. The second signal selecting circuit 172 includes a noise eliminating circuit for eliminating PWM noises in the composed pulse signal b6. Furthermore, the first signal selecting circuit 170 and the second signal selecting circuit 172 performs signal selection in response to the holding state of the shift hold part 31 described later.

The commanding part 26 of FIG. 1 comprises a speed control circuit, for example. The rotational speed of the rotor 11 is detected by the speed pulse signal Dp of the voltage detecting part 23, and a command signal Ac responding with the difference between the rotational speed and the aimed speed of the rotor 11. The command signal Ac is a voltage signal produced by the speed control circuit.

Figure 5:
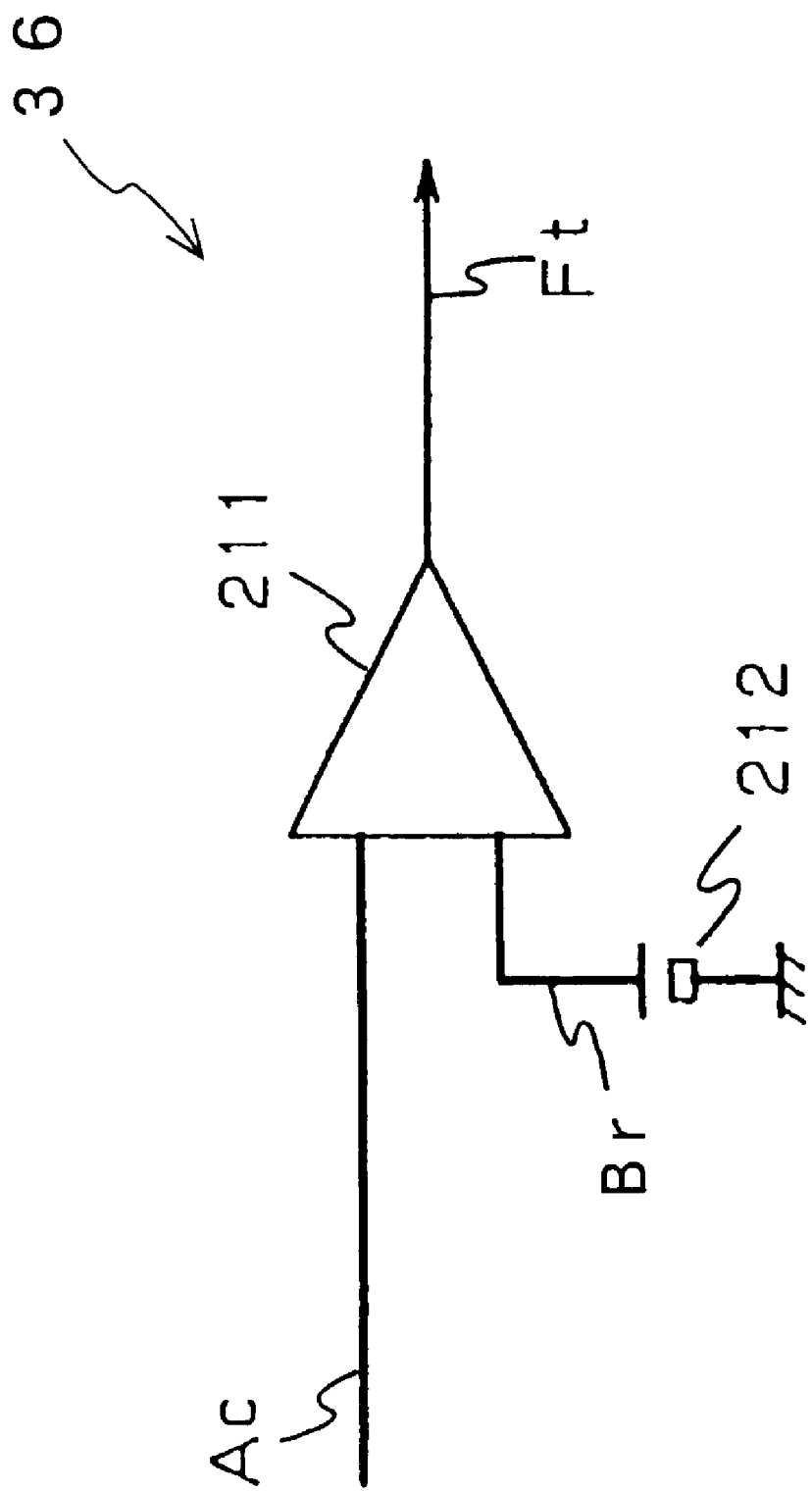
FIG. 5 is a circuit diagram of an adjust changing part 36 of a state shifting part 19 in accordance with the embodiment 1.

The state shifting part 19 of FIG. 1 comprises a shift hold part 31 and an adjust operation part 27 having an adjusting part 35 and an adjust changing part 36. The adjusting part 35 outputs a first timing signal F1 delayed by a first adjust time T1 and a second timing signal F2 delayed by a second adjust time T2 from every arrival of the rising edge of the detected pulse signal Dt of the voltage detecting part 23. The adjust changing part 36 outputs a digital adjust changing signal Ft responding with the command signal Ac of the commanding part 26. The shift hold part 31 shifts its hold state in response to the arrival of the first timing signal F1 and the second timing signal F2 of the adjusting part 35, and outputs three-phase low-side period signals P1, P2 and P3 and three-phase high-side period signals Q1, Q2 and Q3 in response to the hold state. FIG. 5 shows a configuration of the adjust changing part 36, and FIG. 6 shows a configuration of the adjusting part 35.

In FIG. 5, the comparator circuit 211 of the adjust changing part 36 compares the command signal Ac with the reference voltage Br of a reference voltage source 212, and outputs an adjust change signal Ft responding with the result of the comparison. When the command signal Ac is smaller than the reference voltage Br, the adjust change signal Ft is "L". When the command signal Ac is larger than the reference voltage Br, the adjust change signal Ft becomes "H".

Figure 6:
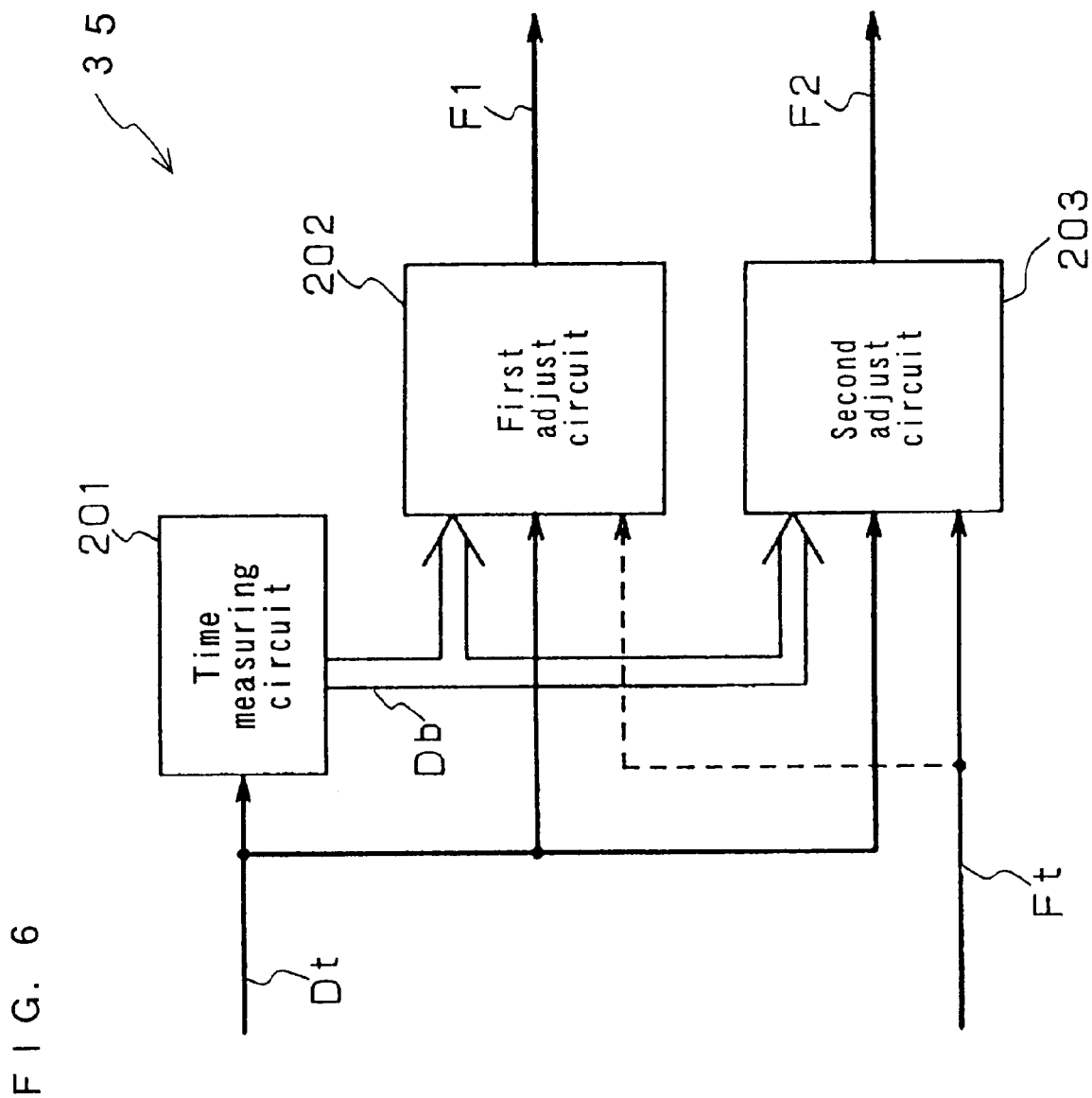
FIG. 6 is a circuit diagram of an adjusting part 35 of the state shifting part 19 in accordance with the embodiment 1.

In FIG. 6, the adjusting part 35 comprises a time measuring circuit 201, a first adjust circuit 202 and a second adjust circuit 203. The time measuring circuit 201 measures the time interval T0 of the rising edges of the detected pulse signal Dt, and outputs a count data signal Db responding with the time interval T0. The first adjust circuit 202 receives the count data signal Db at the generation timing of the rising edge of the detected pulse signal Dt, and outputs the first timing signal F1 delayed by the first adjust time T1 proportional or nearly proportional to the count data signal Db. Similarly, the second adjust circuit 203 receives the count data signal Db at the generation timing of the rising edge of the detected pulse signal Dt, and outputs the second timing signal F2 delayed by the second adjust time T2 proportional or nearly proportional to the count data signal Db.

The time measuring circuit 201 is an up-counter, for example. Its internal state is reset at every arrival of the detected pulse signal Dt. First clock pulse signal is then counted upward. The first adjust circuit 202 is a down-counter, for example. It receives the count data signal Db at the timing of the arrival of the detected pulse signal Dt. Second clock pulse signal is then counted downward. The second adjust circuit 203 is a down-counter, for example. It receives the count data signal Db at the time of the arrival of the detected pulse signal Dt. Third clock pulse signal is then counted downward. By making the frequency of the first clock pulse signal to the first adjust circuit 202 higher than the frequency of the second clock pulse signal to the second adjust circuit 203, the second adjust time T2 is longer than the first adjust time T1, that is, T2>T1.

The second adjust circuit 203 changes the second adjust time T2 in response to the adjust change signal Ft of the adjust changing part 36. The second adjust time T2 is changed so that the product value of the second adjust time and the rotational speed of the rotor 11 becomes smaller in case that the adjust change signal Ft becomes "H". That is, the product value when the adjust change signal Ft is "H" is smaller than that when the adjust change signal Ft is "L". This change operation can be done easily by changing the second clock pulse signal of the second adjust circuit 203. For example, when the adjust change signal Ft becomes "H", the second adjust time T2 decreases 4/5 times by increasing the frequency of the second clock pulse signal 5/4 times. At this time, the second adjust time T2 is proportional or nearly proportional to the time interval T0 of the detected pulse signal Dt. Besides, the first adjust time T1 of the first adjust circuit 202 can be changed in response to the adjust change signal Ft of the adjust changing part 36. In other words, the first adjust time T1 can be changed so that the product value of the first adjust time and the rotational speed of the rotor 11 becomes smaller in case that the adjust change signal Ft becomes "H". At this time, the second timing signal F2 must be produced after the first timing signal F1 so that the relationship of the second adjust time T2>the first adjust time T1 is established.

Figure 14:
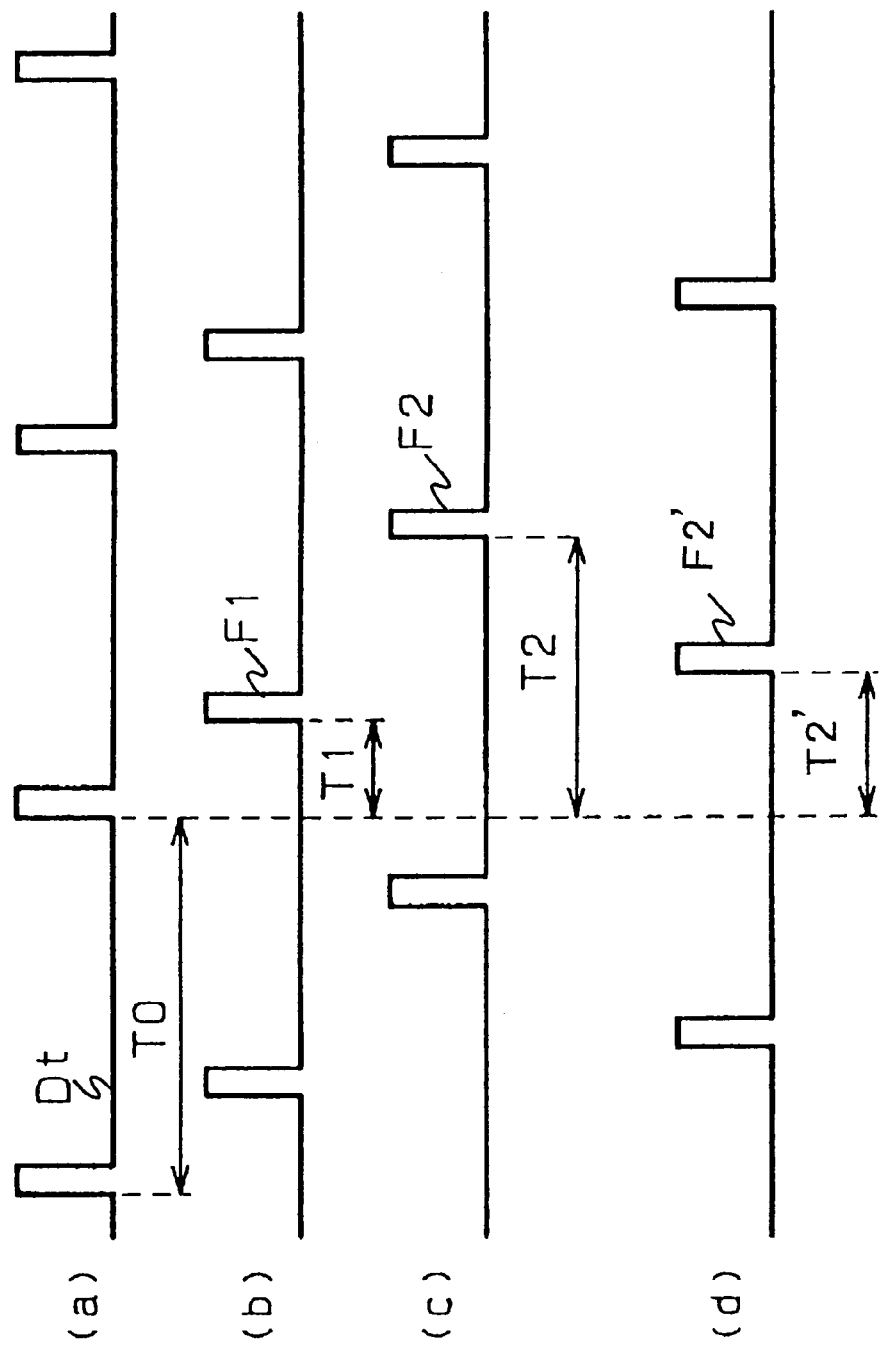
FIG. 14 is a waveform diagram illustrating the operation of the adjusting part 35 of the state shifting part 19 in accordance with the embodiment 1.

FIG. 14 shows the relationship among these signals. The time measuring circuit 201 produces the count value corresponding to the time interval T0 between the successive rising edges of the detected pulse signal Dt shown in the part (a) in FIG. 14. The first adjust circuit 202 outputs the first timing signal F1 (see the part (b) in FIG. 14) which is delayed by the first adjust time T1 proportional or nearly proportional to the time interval T0. In other words, the first timing signal F1 becomes a pulse signal delayed by the first adjust time T1 from the generation moment of the rising edge of the detected pulse signal Dt (see the part (a) in FIG. 14). The second adjust circuit 203 outputs the second timing signal F2 (see the part (c) in FIG. 14) which is delayed by the second adjust time T2 proportional or nearly proportional to the time interval T0. In other words, the second timing signal F2 becomes a pulse signal delayed by the second adjust time T2 from the generation moment of the rising edge of the detected pulse signal Dt. The first adjust time T1, the second adjust time T2 and the time interval T0 have a relationship of T1<T2<T0.

When the adjust change signal Ft of the adjust changing part 36 changes from "L" to "H", the second adjust time of the second adjust circuit 203 becomes shorter, and T2 is changed to T2' (T2'<T2). In other words, the second adjust circuit 203 outputs the second timing signal F2 (see the part (d) in FIG. 14) which is delayed by the second adjust time T2' proportional or nearly proportional to the time interval T0. Besides, when the adjust change signal Ft of the adjust changing part 36 changes from "L" to "H", the first adjust time of the first adjust circuit 202 can also be changed so as to be made shorter from T1 to T1' (T1'<T1). Even when the second adjust time is changed by the adjust change signal Ft of the changing part 36, the second adjust time is made longer than the first adjust time, whereby the second timing signal F2 is produced after the first timing signal F1.

The shift hold part 31 in the state shifting part 19 shown in FIG. 1 includes a state hold circuit for shift-holding its hold state in response to the arrival of the first timing signal F1 or the second timing signal F2 of the adjusting part 35. The shift hold part 31 shifts its hold state in response to the first timing signal F1 or the second timing signal F2, and outputs three-phase low-side period signals P1, P2 and P3 and three-phase high-side period signals Q1, Q2 and Q3 in response to the hold state. In other words, one of the low-side period signals P1, P2 and P3 and the high-side period signals Q1, Q2 and Q3 becomes changed from "L" to "H" at the arrival of the first timing signal F1, and one of the FET power transistors corresponding to the signal changed becomes activated. Furthermore, one of the low-side period signals P1, P2 and P3 and the high-side period signals Q1, Q2 and Q3 becomes changed from "H" to "L" at the arrival of the second timing signal F2, and one of the FET power transistors corresponding to the signal changed becomes deactivated.

Figure 7:
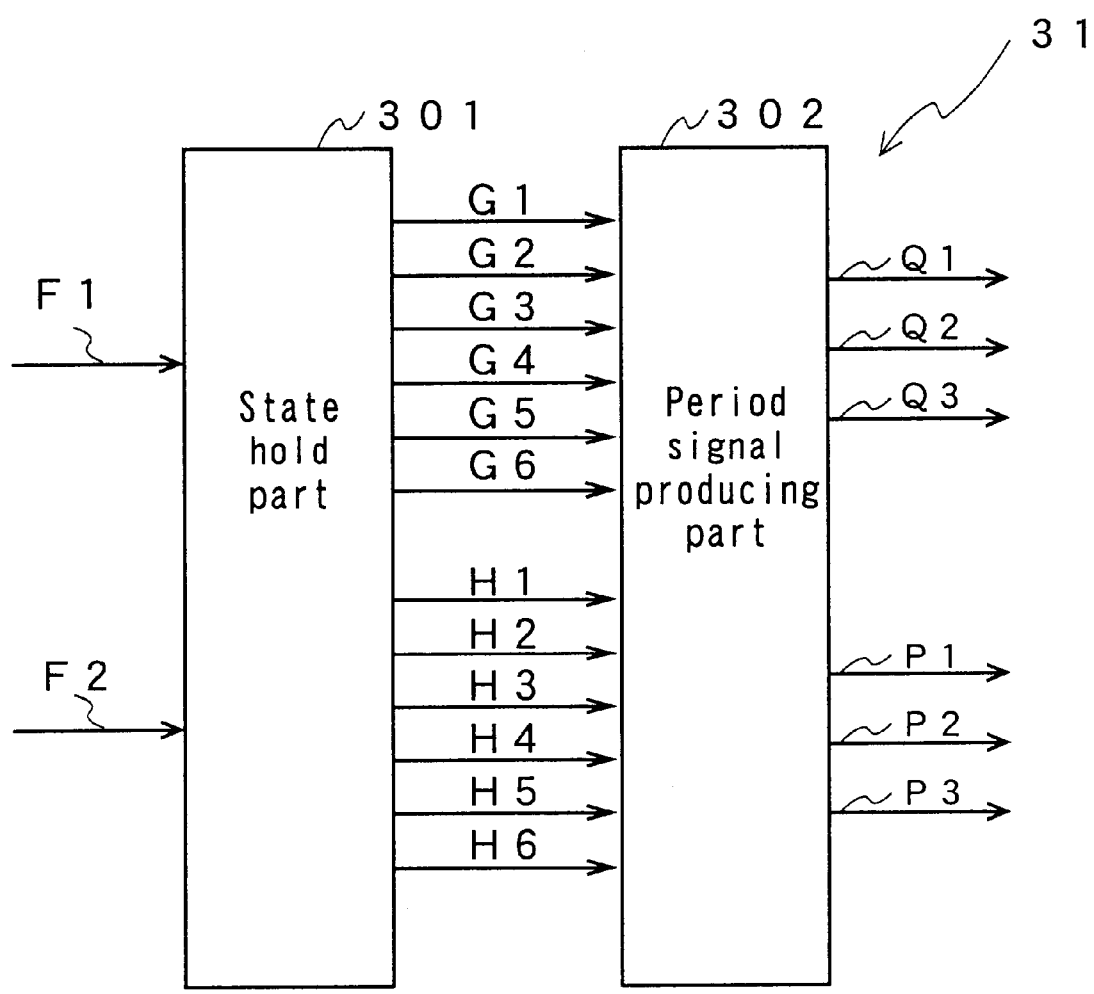
FIG. 7 is a circuit diagram of a shift hold part 31 of the state shifting part 19 in accordance with the embodiment 1.

The periods during which the low-side period signals P1, P2 and P3 of the shift hold part 31 become the "H" state correspond to the active periods of the low-side FET power transistors 101, 102 and 103 of the power supplying part 20, respectively. In each of the active periods, each of the low-side FET power transistors 101, 102 and 103 supplies each of the negative parts of the drive current signals I1, I2 and I3 to the windings 12, 13 and 14. The periods during which the high-side period signals QP, Q2 and Q3 of the shift hold part 31 become the "H" state correspond to the active periods of the high-side power FET transistors 105, 106 and 107 of the power supplying part 20, respectively. In each of the active periods, each of the high-side power FET transistors 105, 106 and 107 supplies each of the positive parts of the drive current signals I1, I2 and I3 to the windings 12, 13 and 14. FIG. 7 shows a configuration of the shift hold part 31.

Figure 8:
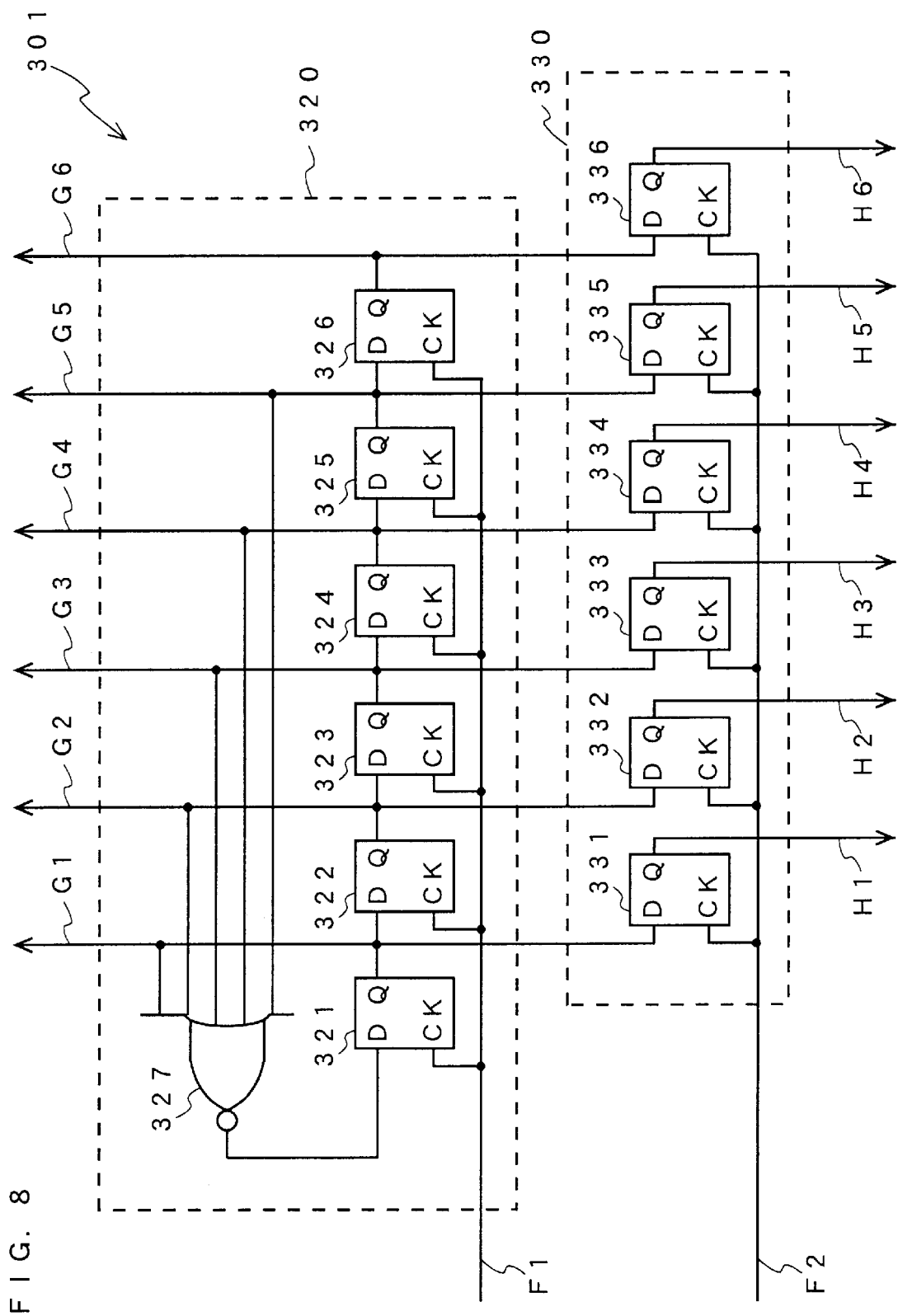
FIG. 8 is a circuit diagram of a state hold part 301 of the shift hold part 31 in accordance with the embodiment 1.

In FIG. 7, the shift hold part 31 comprises a state hold part 301 and a period signal producing part 302. The state hold part 301 shifts its hold state in response to the arrival of the first timing signal F1 and the second timing signal F2, and outputs first state hold signals G1, G2, G3, G4, G5 and G6, and second state hold signals H1, H2, H3, H4, H5 and H6. The holding state of the shift hold part 31 of the state shifting part 19 means the composed state or the vector state of the first state hold signals G1, G2, G3, G4, G5 and G6 and second state hold signals H1, H2, H3, H4, H5 and H6. The period signal producing part 302 composes the first state hold signals G1 to G6 and second state hold signals H1 to H6, and outputs the low-side period signals P1, P2 and P3 and the high-side period signals Q1, Q2 and Q3. FIG. 8 shows a configuration of the state hold part 301, and FIG. 9 shows a configuration of the period signal producing part 302.

In FIG. 8, the state hold part 301 comprises a first state hold circuit 320 and a second state hold circuit 330. The first state hold circuit 320 includes six D-type flip-flops 321, 322, 323, 324, 325 and 326, which are designed so that one of the flip-flops becomes the "H" state and the other flip-flops become the "L" state. The states of the flip-flops 321, 322, 323, 324, 325 and 326 are shifted at the rising edge of the first timing signal F1, and the "H" state is shifted in sequence just as in the case of a ring counter. The first state hold circuit 320 outputs the internal states of the six flip-flops 321, 322, 323, 324, 325 and 326 as first state hold signals G1 to G6. The second state hold circuit 330 comprises six D-type flip-flops 331, 332, 333, 334, 335 and 336. The first state hold signals G1 to G6 are input to the data input terminals of the flip-flops 331, 332, 333, 334, 335 and 336, respectively. At the rising edge of the second timing adjust signal F2, the first state hold signals G1, G2, G3, G4, G5 and G6 are input to the internal states of the flip-flops 331, 332, 333, 334, 335 and 336, and their outputs are changed. The second state hold circuit 330 outputs the internal states of the six flip-flops 331, 332, 333, 334, 335 and 336 as the second state hold signals H1, H2, H3, H4, H5 and H6.

Figure 9:
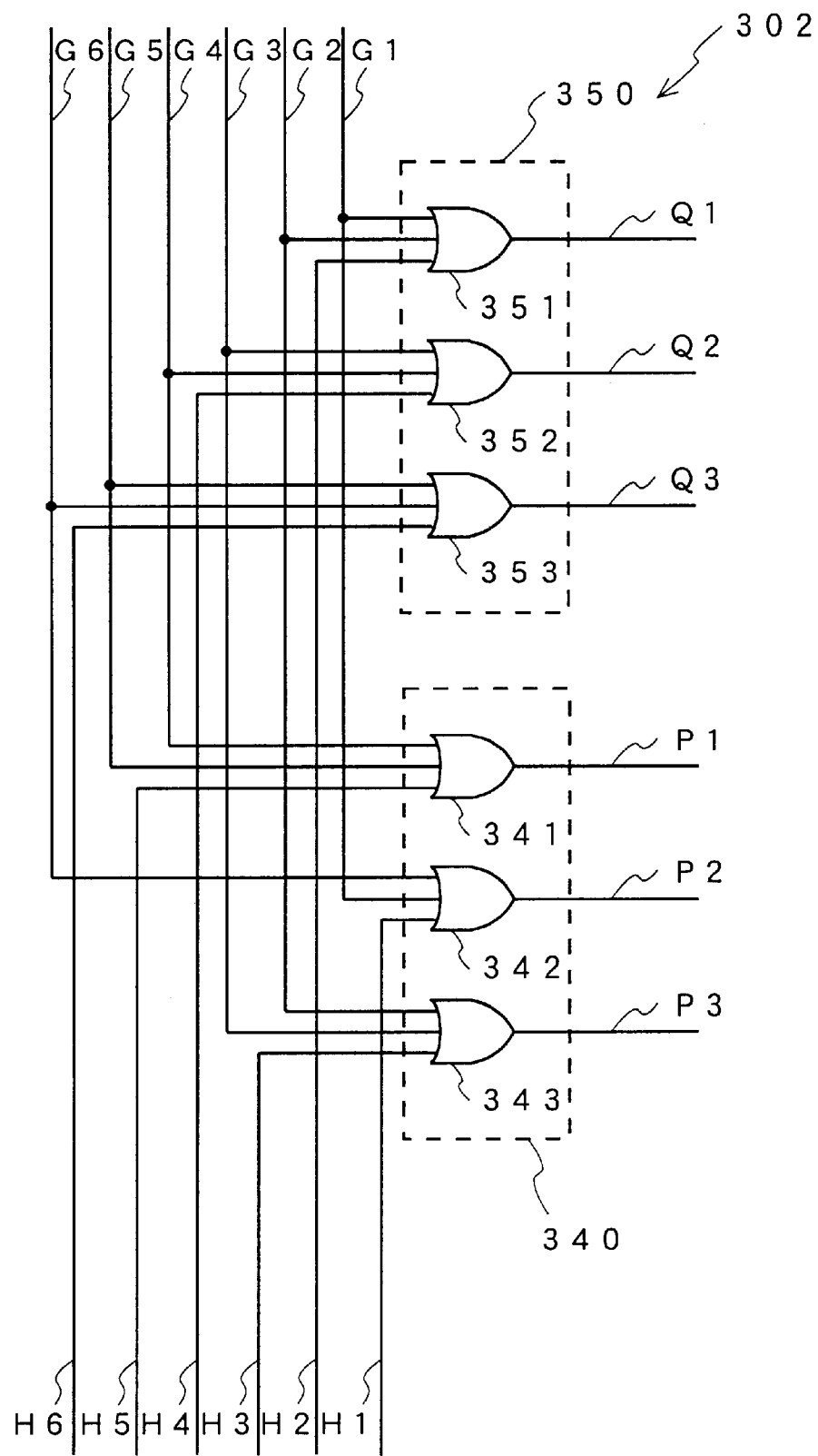
FIG. 9 is a circuit diagram of a period signal producing part 302 of the shift hold part 31 in accordance with the embodiment 1.

In FIG. 9, the period signal producing part 302 comprises a low-side period signal producing circuit 340 and a high-side period signal producing circuit 350. The low-side period signal producing circuit 340 produces low-side period signals P1, P2 and P3 responding with the first state hold signals G1 to G6 and the second state hold signals H1 to H6 of the state hold part 301. The "H" state periods of the low-side period signals P1, P2 and P3 correspond to the active periods of the low-side FET power transistors 101, 102 and 103 of the power supplying part 20, respectively. The high-side period signal producing circuit 350 produces high-side period signals Q1, Q2 and Q3 responding with the first state hold signals G1 to G6 and the second state hold signals H1 to H6 of the state hold part 301. The "H" state periods of the high-side period signals Q1, Q2 and Q3 correspond to the active periods of the high-side FET power transistors 105, 106 and 107 of the power supplying part 20, respectively. As a result, the active periods of the FET power transistors correspond to the first state hold signals and the second state hold signals, that is, the holding state of the state shifting part 19.

Figure 15:
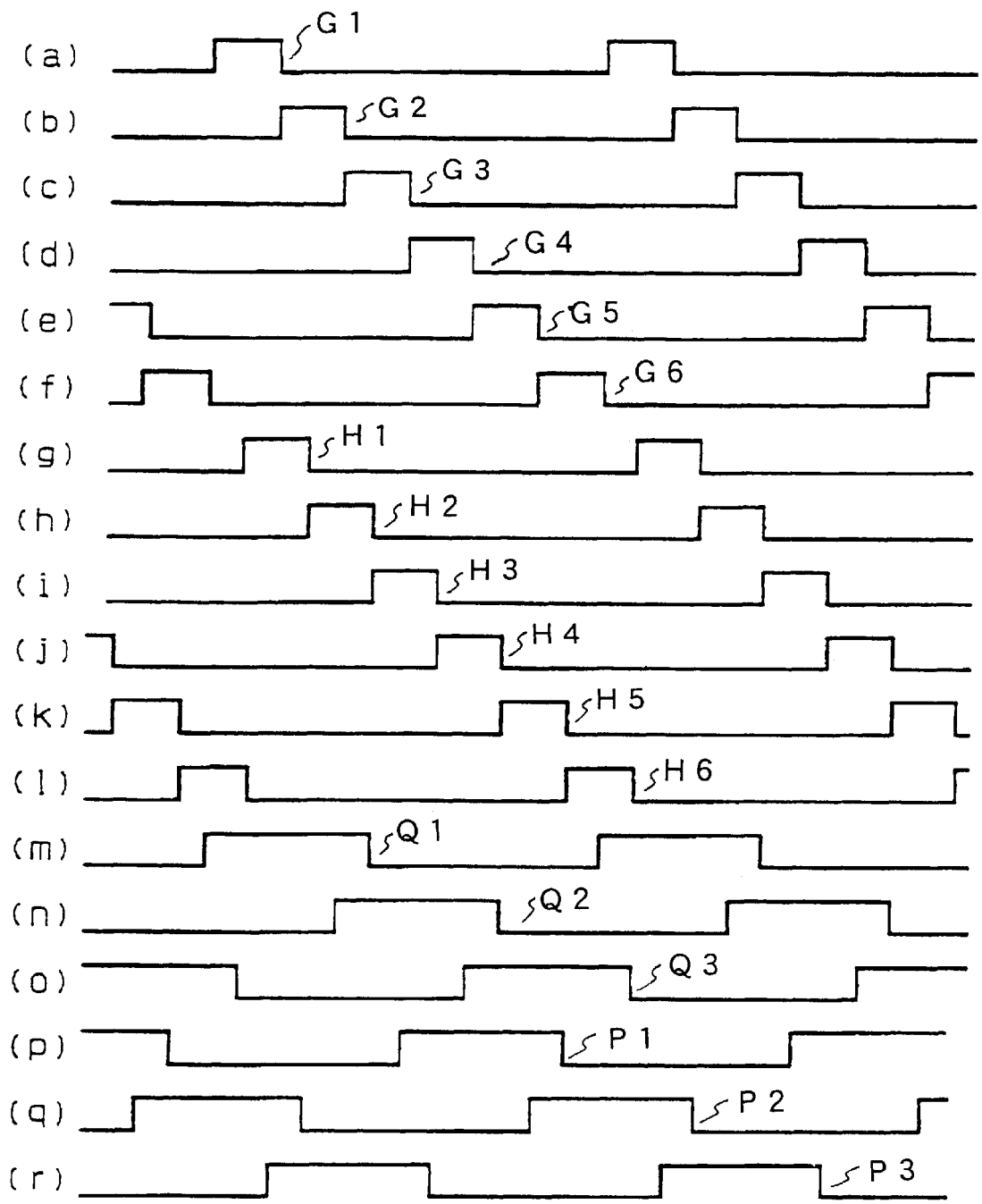
FIG. 15 is a waveform diagram illustrating the operation of the state hold part 301 and the period signal producing part 302 of the shift hold part 31 in accordance with the embodiment 1.

FIG. 15 shows the relationship among the low-side period signals P1, P2 and P3, the high-side period signals Q1, Q2 and Q3, the first state hold signals G1 to G6 and the second state hold signals H1 to H6. The abscissa of FIG. 15 represents time. The first state hold signals G1 to G6 (see the parts (a) to (f) in FIG. 15) are six-phase signals, wherein one "H" signal is shifted at every arrival of the first timing signal F1 (see the part (b) in FIG. 14). The second state hold signals H1 to H6 (see the parts (g) to (l) in FIG. 15) are six-phase signals, wherein one "H" signal is shifted at every arrival of the second timing signal F2 (see the part (c) in FIG. 14). The low-side period signals P1, P2 and P3 are produced by logically composing the first state hold signals G1 to G6 and the second state hold signals H1 to H6, and each of the low-side period signals P1, P2 and P3 has one "H" period larger than an electrical angle of 120 degrees (see the parts (p) to (r) in FIG. 15). More specifically, the low-side period signals P1, P2 and P3 are three-phase signals, each having one "H" period of about 140 degrees. An electrical angle of 360 degrees corresponds to the rotation angle of a pair of the N and S poles of the rotor 11. In a similar way, the high-side period signals Q1, Q2 and Q3 are produced by logically composing the first state hold signals G1 to G6 and the second state hold signals H1 to H6, and each of the high-side period signals Q1, Q2 and Q3 has one "H" period larger than an electrical angle of 120 degrees (see the parts (m) to (o) in FIG. 15). More specifically, the high-side period signals Q1, Q2 and Q3 are three-phase signals, each having one "H" period of about 140 degrees.

Figure 16:
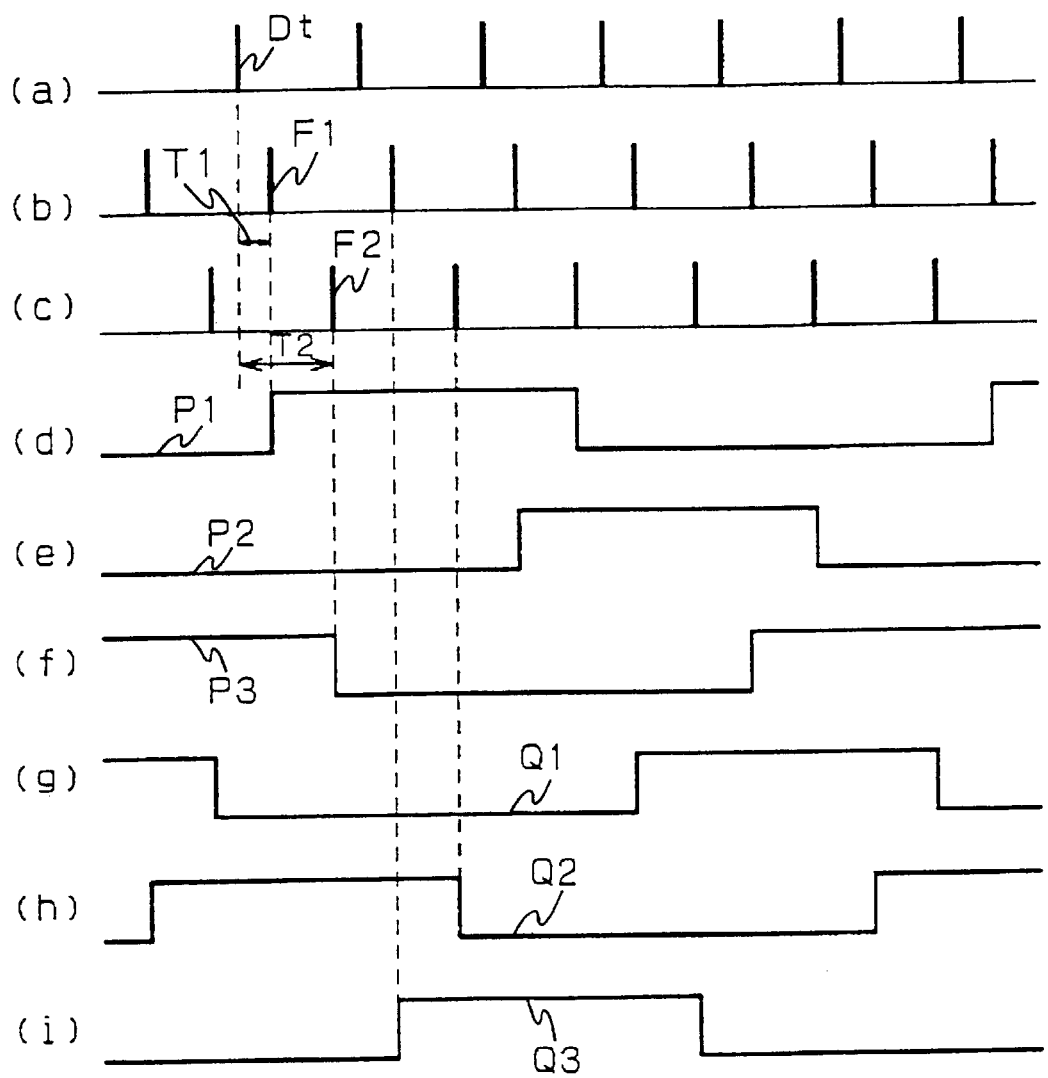
FIG. 16 is a waveform diagram illustrating the operation of the shift hold part 31 of the state shifting part 19 in accordance with the embodiment 1.

FIG. 16 shows the relationship between the timing signals and the period signals in case that the adjust change signal Ft is "L". The first timing signal F1 (see the part (b) in FIG. 16) is delayed by the first adjust time T1 from the detected pulse signal Dt (see the part (a) in FIG. 16). The second timing signal F2 (see the part (c) in FIG. 16) is output delayed by the second adjust time T2 from the same detected pulse signal Dt. The shift hold part 31 of the state shifting part 19 shifts its holding state in sequence at every arrival of the first timing signal F1 and the second timing signal F2, whereby 12 holding states are repeated cyclically. This produces the three-phase low-side period signals P1, P2 and P3 (see the parts (d), (e) and (f) of FIG. 16) and the three-phase high-side period signals Q1, Q2 and Q3 (see the parts (g), (h) and (i) of FIG. 16). For example, the low-side period signal P1 changes from "L" to "H" at the arrival of the first timing signal F1, and the low-side FET power transistor 101 becomes activated. The low-side period signal P3 changes from "H" to "L" at the arrival of the second timing signal F2, and the low-side FET power transistor 103 becomes deactivated. The high-side period signal Q3 changes from "L" to "H" at the arrival of the next first timing signal F1, and the high-side FET power transistor 107 becomes activated. The high-side period signal Q2 changes from "H" to "L" at the arrival of the next second timing signal F2, and the high-side FET power transistor 106 becomes deactivated. Furthermore, the low-side period signal P2 changes from "L" to "H" at the arrival of the first timing signal F1, and the low-side FET power transistor 102 becomes activated. The low-side period signal P1 changes from "H" to "L" at the arrival of the second timing signal F2, and the low-side FET power transistor 101 becomes deactivated. The high-side period signal Q1 changes from "L" to "H" at the arrival of the next first timing signal F1, and the high-side FET power transistor 105 becomes activated. The high-side period signal Q3 changes from "H" to "L" at the arrival of the next second timing signal F2, and the high-side FET power transistor 107 becomes deactivated. In this way, the shift hold part 31 of the state shifting part 19 outputs the three-phase low-side period signals P1, P2 and P3 and the three-phase high-side period signals Q1, Q2 and Q3, and determines the active periods of the low-side FET power transistors 101, 102 and 103 and the high-side FET power transistors 105, 106 and 107. As understood by referring to FIG. 16, an FET power transistor becomes activated in response to the first timing signal F1 which is produced after the first adjust time T1 from the generation of the detected pulse signal Dt. Another FET power transistor becomes deactivated in response to the second timing signal F2 which is produced after the second adjust time T2 from the generation of the detected pulse signal Dt.

As a result, the low-side period signals P1, P2 and P3 become three-phase signals, each having one "H" period larger than an electrical angle of 120 degrees (see the parts (d) to (f) in FIG. 16). More specifically, the low-side period signals P1, P2 and P3 become three-phase signals, each having one "H" period of about 140 degrees. In a similar way, the high-side period signals Q1, Q2 and Q3 become three-phase signals, each having one "H" period larger than an electrical angle of 120 degrees (see the parts (g) to (l) in FIG. 16). More specifically, the high-side period signals Q1, Q2 and Q3 become three-phase signals, each having one "H" period of about 140 degrees. Furthermore, since the second adjust time T2 is longer than the first adjust time T1, the activation to two of the three-phase windings and the activation to three of the three-phase windings are alternated in accordance with the rotation of the rotor 11.

Figure 17:
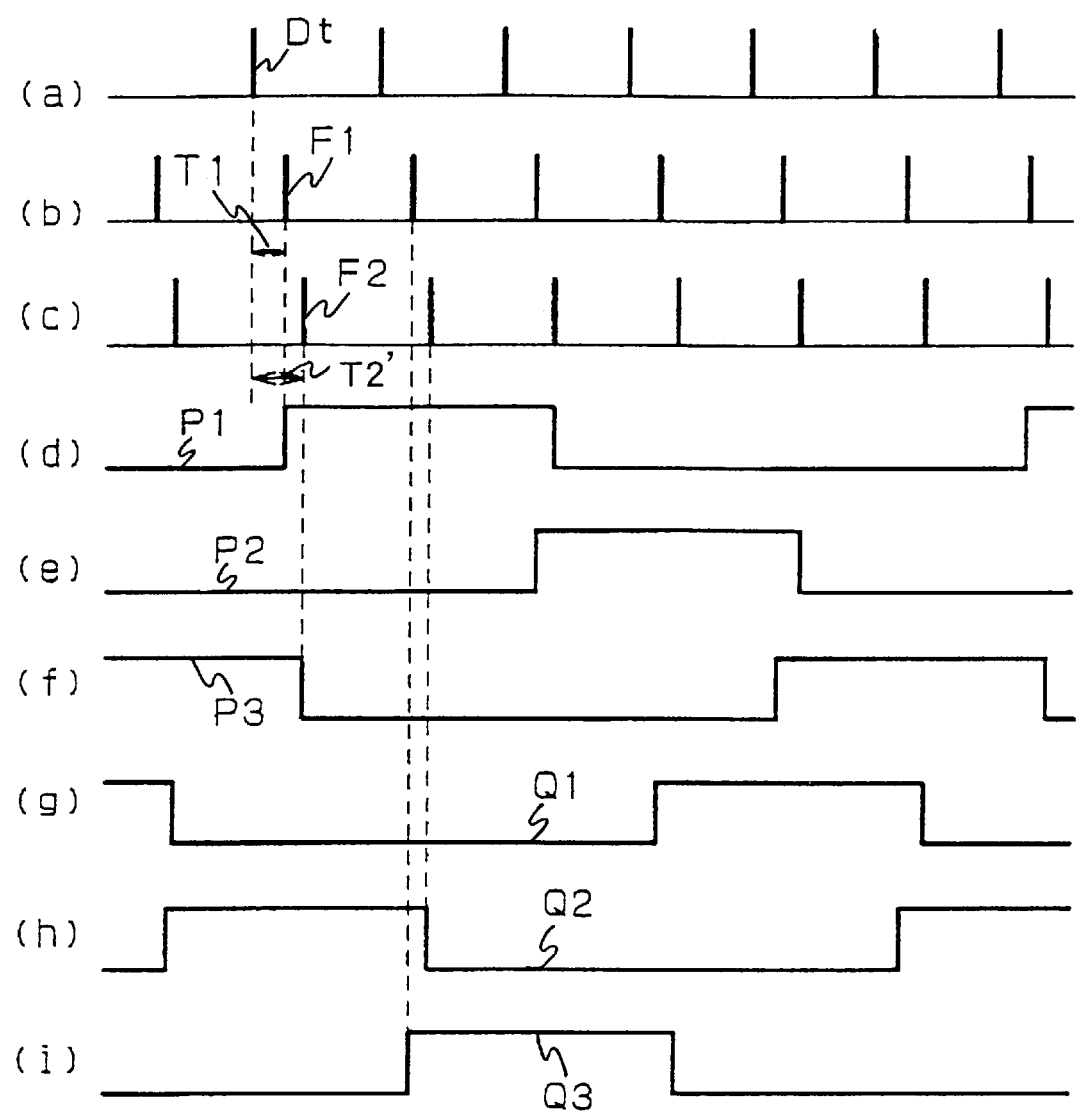
FIG. 17 is another waveform diagram illustrating the operation of the shift hold part 31 of the state shifting part 19 in accordance with the embodiment 1.
Figure 18:
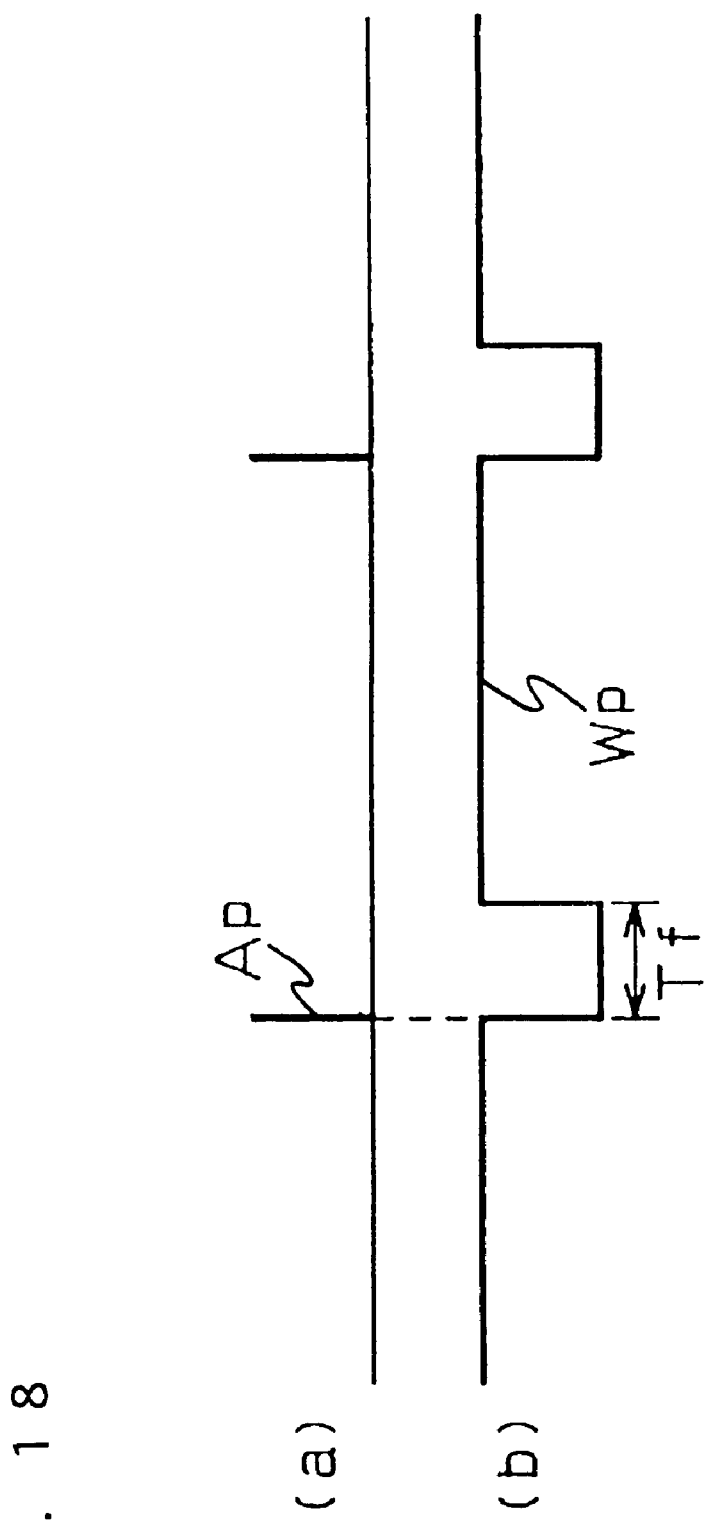
FIG. 18 is a waveform diagram illustrating the operation of the switching control part 22 shown in FIG. 11 in accordance with the embodiment 1.

FIG. 17 shows the relationship between the timing signals and the period signals in case that the adjust change signal Ft is "H". The first timing signal F1 (see the part (b) in FIG. 17) is delayed by the first adjust time T1 from the detected pulse signal Dt (see the part (a) in FIG. 17). The second timing signal F2 (see the part (c) in FIG. 17) is delayed by the second adjust time T2'. The figure herein shows a case wherein only the second adjust time is shortened. The shift hold part 31 of the state shifting part 19 shifts its holding state at every arrival of the first timing signal F1 and the second timing signal F2, whereby 12 holding states are repeated cyclically. This produces the three-phase low-side period signals P1, P2 and P3 (see the parts (d), (e) and (f) of FIG. 17) and the three-phase high-side period signals Q1, Q2 and Q3 (see the parts (g), (h) and (i) of FIG. 17). The shift hold part 31 outputs the three-phase low-side period signals P1, P2 and P3 and the three-phase high-side period signals Q1, Q2 and Q3, and determines the active periods of the low-side FET power transistors 101, 102 and 103 and the high-side FET power transistors 105, 106 and 107. As understood by referring to FIG. 17, an FET power transistor becomes activated in response to the first timing signal F1 which is produced after the first adjust time T1 from the generation of the detected pulse signal Dt. In addition, another FET power transistor becomes deactivated in response to the second timing signal F2 which is produced after the second adjust time T2' from the generation of the detected pulse signal Dt. As a result, when the adjust change signal becomes "H", the active periods of the low-side period signals P1, P2 and P3 and the high-side period signals Q1, Q2 and Q3 become shortened, that is, the active periods of the low-side FET power transistors 101, 102 and 103 and the high-side FET power transistors 105, 106 and 107 become shortened. Since T2' is larger than T1, the active periods of the low-side period signals P1, P2 and P3 and the high-side period signals Q1, Q2 and Q3 are larger than an electrical angle of 120 degrees. The activation to two of the three-phase windings and the activation to three of the three-phase windings are thus alternated in accordance with the rotation of the rotor 11.

Figure 10:
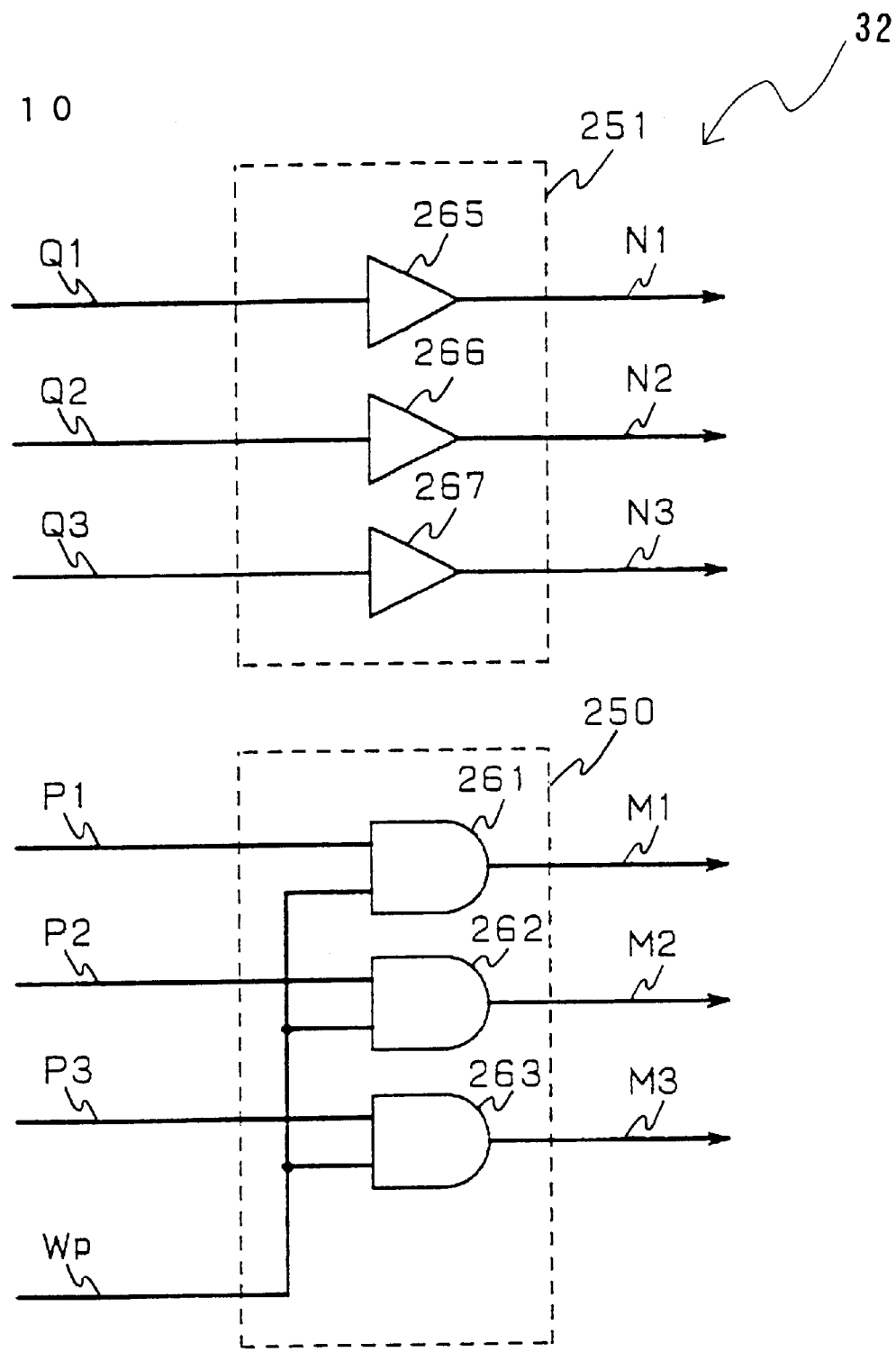
FIG. 10 is a circuit diagram of an activation control part 32 in accordance with the embodiment 1.

The activation control part 32 of FIG. 1 outputs the low-side activation control signals M1, M2 and M3 and the high-side activation control signals N1, N2 and N3 responding with the low-side period signals P1, P2 and P3 and the high-side period signals Q1, Q2 and Q3 of the shift hold part 31 of the state shifting part 19, respectively. Therefore, the active periods of the low-side and high-side FET power transistors are determined by the low-side period signals and the high-side period signals. Furthermore, the activation control part 32 makes the low-side activation control signals M1, M2 and M3 switching signals responding with the switching pulse signals Wp of the switching control part 22. FIG. 10 shows a configuration of the activation control part 32.

In FIG. 10, the activation control part 32 comprises a low-side activation circuit 250 and a high-side activation circuit 251. The low-side activation circuit 250 logically composes the switching pulse signal Wp of the switching control part 22 and the low-side period signals P1, P2 and P3, and produces the low-side activation control signals M1, M2 and M3. Each of the low-side activation control signals M1, M2 and M3 is coincident with the switching pulse signal Wp in each active period. The high-side activation circuit 251 produces the high-side activation control signals N1, N2 and N3 from the high-side period signals Q1, Q2 and Q3.

Figure 11:
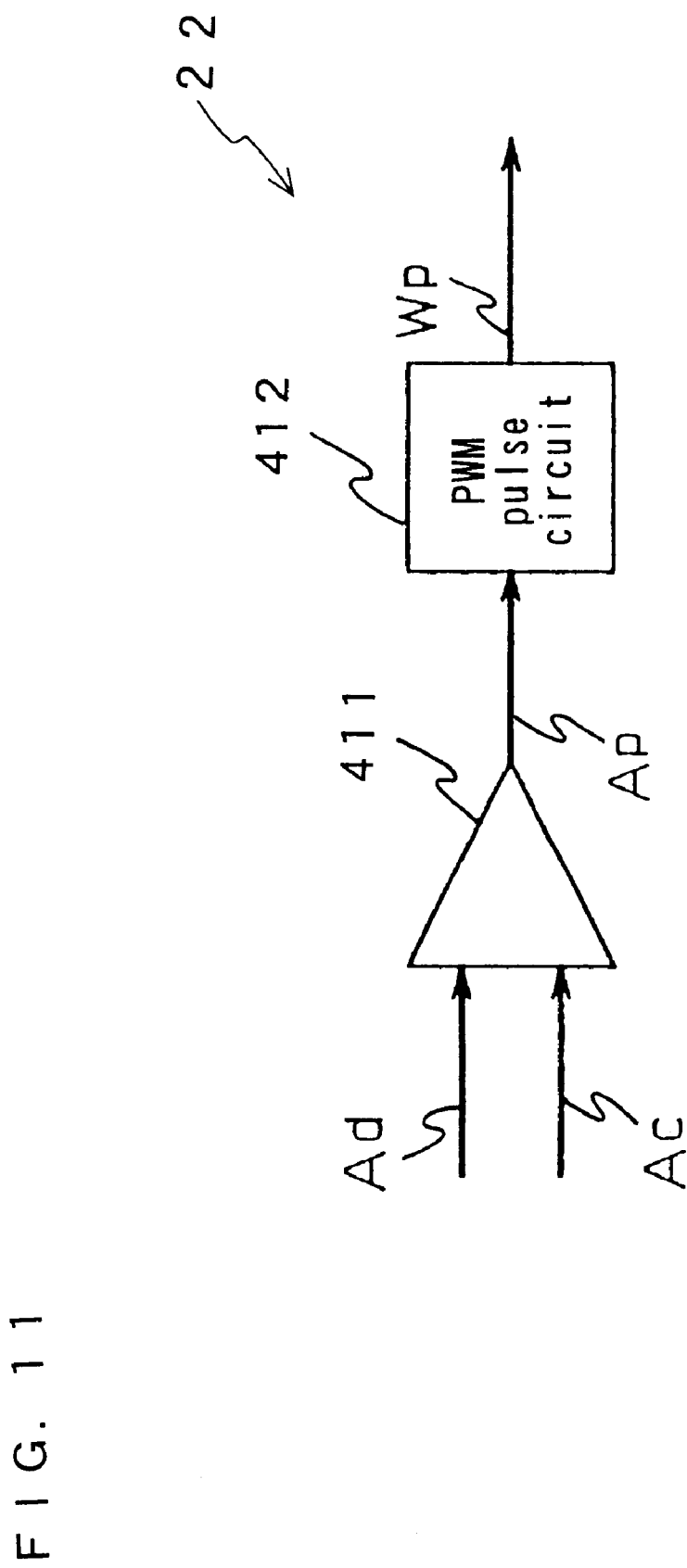
FIG. 11 is a circuit diagram of a switching control part 22 in accordance with the embodiment 1.
Figure 12:
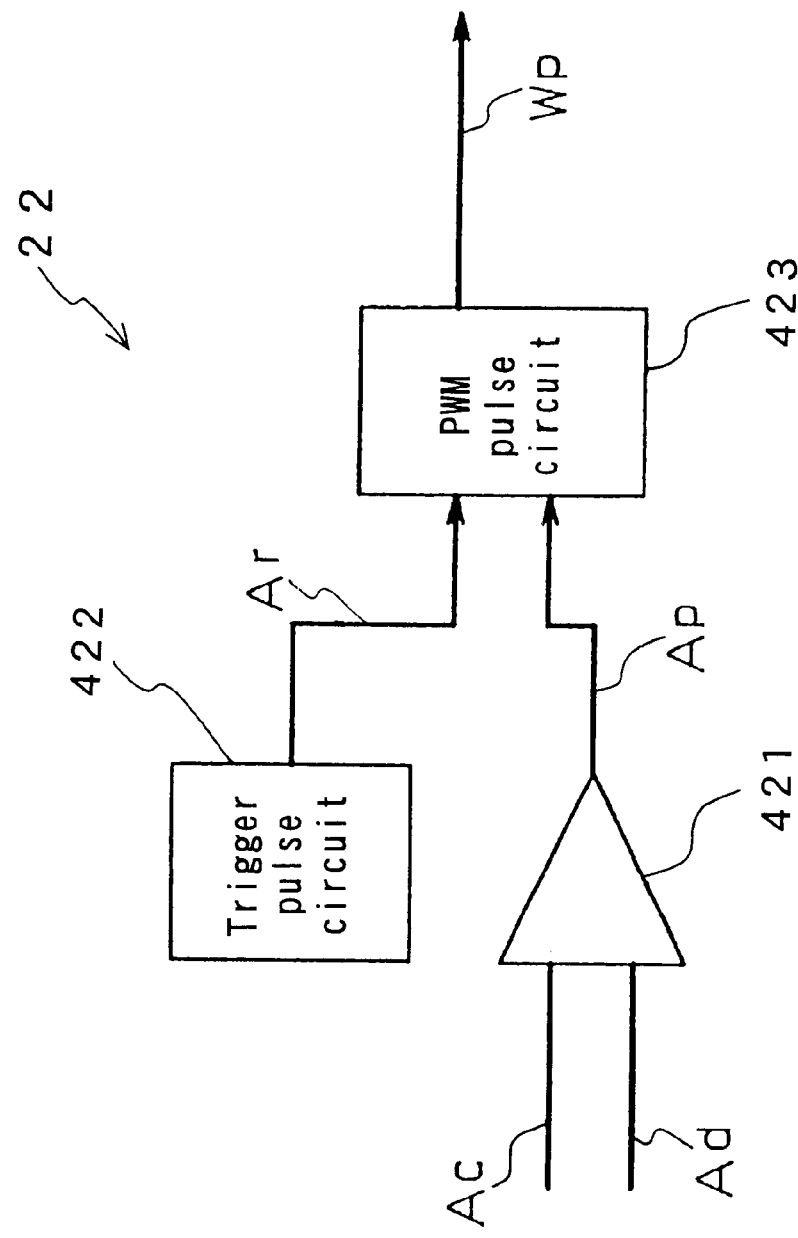
FIG. 12 is another circuit diagram of the switching control part 22 in accordance with the embodiment 1.

The switching control part 22 of FIG. 1 compares the current-detection signal Ad of the current-detecting part 21 with the command signal Ac of the commanding part 26, and outputs the switching pulse signal Wp responding with the comparison result. The switching pulse signal Wp of the switching control part 22 is input to the activation control part 32. The low-side FET power transistors 101, 102 and 103 perform ON-OFF high-frequency switching operation simultaneously in response to the switching pulse signal Wp in their active periods. For example, when the low-side period signals P1 and P2 are "H" and the low-side period signal P3 is "L", the low-side FET power transistors 101 and 102 perform ON-OFF high-frequency switching operation simultaneously in response to the switching pulse signal Wp. In particular, when the current-detection signal Ad reaches the command signal Ac, the switching pulse signal wp becomes "L". Hence, the peak value of the composed supply current Ig from the voltage supplying part 25 to the three-phase windings 12, 13 and 14 by the low-side FET power transistors 101, 102 and 103 is controlled to be proportional or nearly proportional to the command signal Ac. As a result, the amplitudes of the drive current signals I1, I2 and I3 to the three-phase windings 12, 13 and 14 are controlled in response to the command signal Ac. FIG. 11 or FIG. 12 shows a configuration of the switching control part 22.

In FIG. 11, the switching control part 22 comprises a comparing circuit 411 and a PWM pulse circuit 412. The comparing circuit 411 compares the current-detection signal Ad with the command signal Ac, and changes its compared signal Ap to "H" when the current-detection signal Ad becomes larger than the command signal Ac. The switching pulse signal Wp (PWM pulse signal Wp) of the PWM pulse circuit 412 becomes "L" in a predetermined time Tf just after every arrival of the rising edges of the compared signal Ap as a trigger. The switching pulse signal Wp changes to "H" after the predetermined time Tf has passed. The parts (a) and (b) in FIG. 15 show the relationship between the compared signal Ap and the switching pulse signal Wp. The compared signal Ap is "L" when the current-detection signal Ad is smaller than the command signal Ac, and changes to "H" when the current-detection signal Ad becomes larger than the command signal Ac. The switching pulse signal Wp becomes "L" in the predetermined period Tf after the compared signal Ap becomes "H". When the switching pulse signal Wp becomes "L", the low-side FET power transistors become OFF simultaneously, then the current-detection signal Ad becomes zero and the compared signal Ap becomes "L". When the switching pulse signal Wp becomes "H" after the predetermined time Tf, the low-side FET power transistors become ON or active in their active periods. In this way, the switching pulse signal Wp becomes a PWM signal (pulse width modulation signal) responding with the comparison result between the current-detection signal Ad and the command signal Ac.

Figure 19:
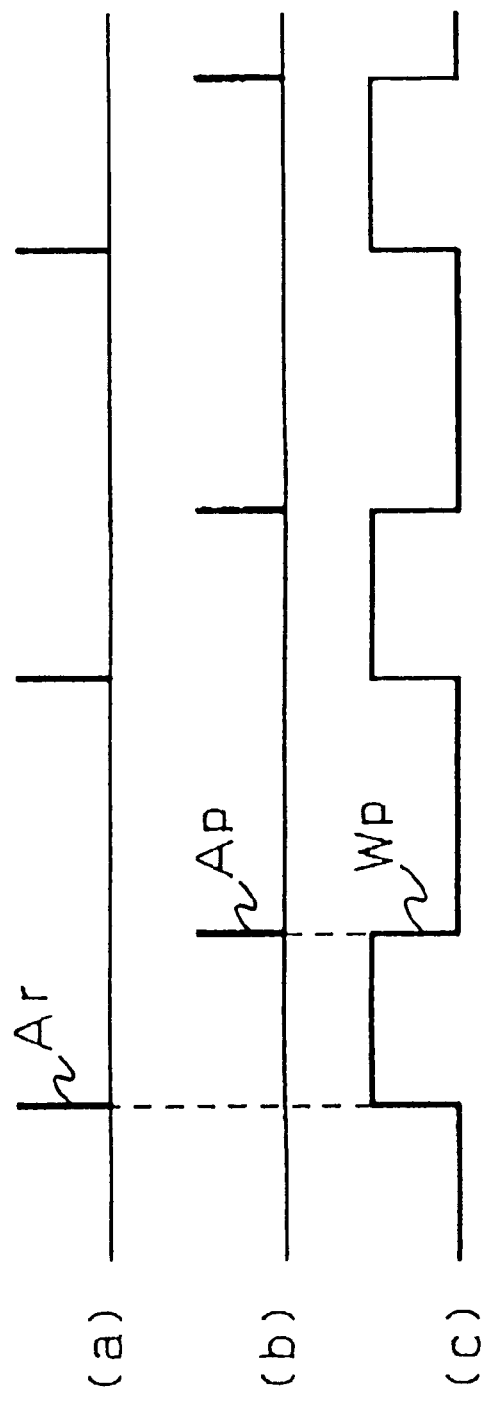
FIG. 19 is a waveform diagram illustrating the operation of the switching control part 22 shown in FIG. 12 in accordance with the embodiment 1.

In FIG. 12, another configuration of the switching control part 22 comprises a comparing circuit 421, a trigger pulse circuit 422 and a PWM pulse circuit 423. The comparing circuit 421 compares the current-detection signal Ad with the command signal Ac. When the current-detection signal Ad becomes larger than the command signal Ac, the compared signal Ap of the comparing circuit 421 is changed to "H". The trigger pulse circuit 422 outputs a trigger pulse signal Ar at a predetermined interval. The PWM pulse circuit 423 includes a flip-flop for example, and sets the state of the flip-flop to "H" at the rising edge of the trigger pulse signal Ar, thereby setting the switching pulse signal Wp (PWM pulse signal Wp) to "H". The PWM pulse circuit 423 sets the state of the flip-flop to "L" at the rising edge of the compared signal Ap, thereby setting the switching pulse signal Wp to "L". The parts (a) to (c) in FIG. 19 show the signal relationship among the trigger pulse signal Ar, the compared signal Ap and the switching pulse signal Wp. The switching pulse signal Wp becomes "H" at the rising edge of the trigger pulse signal Ar, and the switching pulse signal Wp becomes "L" at the rising edge of the compared signal Ap. In this way, the switching pulse signal Wp becomes a PWM signal responding with the comparison result between the current-detection signal Ad and the command signal Ac.

The operation and advantages of the embodiment 1 will be described below. In response to the low-side period signals P1, P2 and P3 and the high-side period signals Q1, Q2 and Q3 of the shift hold part 31 of the state shifting part 19, the activation control part 32 produces the low-side activation control signals M1, M2 and M3 and the high-side activation control signals N1, N2 and N3 to select the low-side and high-side FET power transistors to be activated. The power supplying part 20 turns ON and OFF the low-side FET power transistors 101, 102 and 103 and the high-side FET power transistors 105, 106 and 107 in response to the low-side activation control signals M1, M2 and M3 and the high-side activation control signals N1, N2 and N3 of the activation control part 32, respectively. As a result, the power supplying part 20 supplies power to the three-phase windings 12, 13 and 14.

A switching operation block comprising the switching control part 22 and the current-detecting part 21 operates to supply PWM pulse drive voltages V1, V2 and V3 to the three-phase windings 12, 13 and 14, respectively. In response to the switching pulse signal Wp of the switching control part 22, the low-side activation control signals M1, M2 and M3 of the activation control part 32 become switching signals. One or two of the low-side FET power transistors, which are selected by the low-side activation control signals M1, M2 and M3 of the activation control part 32, perform ON-OFF high-frequency switching operation simultaneously. The power supplying part 20 thus supplies the negative parts of the drive current signals I1, I2 and I3 to the three-phase windings 12, 13 and 14, respectively. When the low-side FET power transistors 101, 102 and 103 of the power supplying part 20 turn OFF, one or two of the high-side power diodes 105d,106d and 107d connected to the corresponding active-phase windings are turned ON by the inductive reaction of the windings 12, 13 and 14, thereby supplying the negative parts of the drive currents I1, I2 and I3 to the windings 12, 13 and 14 continuously. As a result, the drive voltages V1, V2 and V3 to the three-phase windings 12, 13 and 14 become PWM voltages. This reduces the power losses of the low-side FET power transistors 101, 102 and 103 of the power supplying part 20 significantly.

The high-side FET power transistors 105, 106 and 107 of the power supplying part 20 supply the positive parts of the drive current signals I1, I2 and I3 to the three-phase windings 12, 13 and 14. One or two of the high-side FET power transistors, which are selected by the high-side activation control signals N1, N2 and N3 of the activation control part 32, are turned ON simultaneously (do not perform PWM operation in the embodiment). The power supplying part 20 thus supplies the positive parts of the drive current signals I1, I2 and I3 to the windings 12, 13 and 14, respectively. As a result, in accordance with the rotation of the rotor 11, the three-phase bi-directional drive current signals I1, I2 and I3, alternating in the positive and negative directions, are supplied to the three-phase windings 12, 13 and 14, respectively. In addition, this reduces the power losses of the high-side FET power transistors 105, 106 and 107 of the power supplying part 20 significantly.

The current-detecting part 21 detects the composed supply current Ig from the voltage supplying part 25 to the three-phase windings 12, 13 and 14 via the three low-side FET power transistors 101, 102 and 103 of the power supplying part 20, and outputs the current-detection signal Ad. The composed supply current Ig corresponds to the composite value of the negative parts of the three-phase drive current signals I1, I2 and I3 to the three-phase windings 12, 13 and 14. The switching control part 22 compares the current-detection signal Ad with the command signal Ac, and produces the switching pulse signal Wp responding with the comparison result. The low-side FET power transistors 101, 102 and 103 of the power supplying part 20 perform ON-OFF high-frequency switching operation in response to the switching pulse signal Wp. As a result, the composed supply current Ig is controlled in response to the command signal Ac. Consequently, the drive current signals I1, I2 and I3 to the three-phase windings 12, 13 and 14 are controlled accurately in response to the command signal Ac, and a pulsation of the generated drive force can be reduced. In addition, the low-side FET power transistors of the power supplying part 20 perform ON-OFF high-frequency switching operation simultaneously in response to the switching pulse signal Wp (a single pulse signal) from the switching control part 22, thereby making the configuration of the motor very simple. Furthermore, the high-side FET power transistors of the power supplying part 20 do not perform PWM operation (high-frequency switching operation) but perform only ON-OFF operation. Therefore, the ON-OFF operation of the high-side FET transistors is carried out very easily.

The voltage detecting part 23 compares the three-phase drive voltages V1, V2 and V3 with the common voltage Vc or the composed common voltage Vcr. Compared pulse signals obtained as the result of the comparison are selected in response to the low-side period signals P1, P2 and P3 and the high-side period signals Q1, Q2 and Q3 for example. As a result, the detected pulse signal Dt and the speed pulse signal Dp are produced. In other words, the detected pulse signal Dt and the speed pulse signal Dp correspond to the counter electromotive forces induced in the three-phase windings 12, 13 and 14 and are obtained in response to the rotation of the rotor 11. Since the power transistors of the power supplying part 20 perform switching operation in response to the switching pulse signal Wp used as a single pulse signal, the voltage detecting part 23 can easily eliminate the influence of the PWM noise as necessary.

The adjusting part 35 of the state shifting part 19 detects the arrival of the rising edge of the detected pulse signal Dt, and the time measuring circuit 201 measures the interval T0 of the detected pulse signal Dt. The first adjust circuit 202 produces the first timing signal F1 which is delayed from the edge of the detected pulse signal Dt by the first adjust time T1 responding with the interval T0 of the detected pulse signal Dt. In addition, the second adjust circuit 203 produces the second timing signal F2 which is delayed from the edge of the detected pulse signal Dt by the second adjust time T2 responding with the interval T0 of the detected pulse signal Dt. The first adjust time T1, the second adjust time T2 and the interval T0 have a relationship of T1<T2<T0, even when the adjust change signal Ft of the adjust changing part 36 is "L" or "H".

The shift hold part 31 of the state shifting part 19 shifts its holding state from a first state to a second state in response to the first timing adjust signal F1, and one of the low-side period signals and the high-side period signals becomes activated ("H"). The shift hold part 31 shifts its holding state from the second state to a third state in response to the second timing adjust signal F2, and one of the low-side period signals and the high-side period signals becomes deactivated ("L"). The holding state of the shift hold part 31 is shifted in sequence to be one of the 12 holding states at every arrival of the first timing signal F1 and the second timing signal F2. The low-side period signals P1, P2 and P3 determine the active periods of the low-side FET power transistors 101, 102 and 103, respectively. The high-side period signals Q1, Q2 and Q3 determine the active periods of the high-side FET power transistors 105, 106 and 107, respectively.

The low-side activation circuit 250 of the activation control part 32 logically composes the low-side period signals P1, P2 and P3 of the shift hold part 31 of the state shifting part 19 and the switching pulse signal Wp of the switching control part 22, and produces the low-side activation control signals M1, M2 and M3. By these low-side activation control signals M1, M2 and M3, the low-side FET power transistors 101, 102 and 103 of the power supplying part 20 are subjected to ON-OFF high-frequency switching operation. Therefore, power losses of the low-side FET power transistors can be reduced significantly, and the power efficiency of the motor can be improved.

The high-side activation circuit 251 of the activation control part 32 outputs the high-side period signals Q1, Q2 and Q3 of the shift hold part 31 of the state shifting part 19 via buffers, and produces the high-side activation control signals N1, N2 and N3. By these high-side activation control signals N1, N2 and N3, the high-side FET power transistors 105, 106 and 107 of the power supplying part 20 are subjected to ON-OFF operation. Therefore, power losses of the high-side FET power transistors can be reduced significantly, and the power efficiency of the motor can be improved.

The commanding part 26 detects the rotational speed of the rotor 11 by the interval or the frequency of the speed pulse signal Dp of the voltage detecting part 23, and produces the command signal Ac in response to the difference between an aimed speed and the actual rotational speed. Since at least one of the low-side FET power transistors 101, 102 and 103 of the power supplying part 20 is subjected to high-frequency switching operation in response to the command signal Ac. the composed supply current Ig from the voltage supplying part 25 to the three-phase windings 12, 13 and 14 is proportional to the command signal Ac. When the rotor 11 is controlled to rotate at the aimed rotational speed, the command signal Ac becomes a small value because of a light load torque in the speed controlled state.

In case that the command signal Ac is smaller than the reference voltage Br, the adjust change signal Ft of the adjust changing part 36 becomes "L". The adjusting part 35 of the state shifting part 19 produces the first timing signal F1 delayed by the first adjust time T1 and the second timing signal F2 delayed by the second adjust time T2. In the case when Ft="L", the second adjust time T2 is considerably a large electrical angle in the range between 30 degrees and 60 degrees. The second adjust time T2 is much larger than the first adjust time T1. For this reason, the active periods (the active electrical angles) of the low-side period signals P1, P2 and P3 and the high-side period signals Q1, Q2 and Q3 are made considerably larger than an electrical angle of 360/3= 120 degrees. The active periods (the active electrical angles) of the three-phase low-side activation control signals M1, M2 and M3 and the three-phase high-side activation control signals N1, N2 and N3 are also made considerably larger than an electrical angle of 360/3=120 degrees. As a result, the active periods (the active electrical angles) of the low-side and high-side FET power transistors are made larger than 120 degrees. This reduces vibration and acoustic noise of the motor remarkably. In this embodiment, each of the active periods of the three-phase low-side activation control signals M1, M2 and M3 and the three-phase high-side activation control signals N1, N2 and N3 is set to an electrical angle of about 140 degrees or more.

When the rotational speed of the rotor 11 is lower than the aimed rotational speed and the rotor 11 is accelerated, the command signal Ac of the commanding part 26 becomes much larger (maximum). While at least one of the low-side FET power transistors 101, 102 and 103 of the power supplying part 20 is subjected to high-frequency switching operation in response to the command signal Ac, the composed supply current Ig from the voltage supplying part 25 to the three-phase windings 12, 13 and 14 is proportional to the command signal Ac. Hence, the rotor 11 is accelerated with a large generated torque. At this time, the command signal Ac of the commanding part 26 becomes larger than the reference voltage Br, and the adjust change signal Ft of the adjust changing part 36 becomes "H". In case when Ft="H", the adjusting part 35 of the state shifting part 19 changes at least the second adjust time smaller so that the product value of the second adjust time and the rotational speed of the rotor becomes smaller, and produces the second timing signal F2 delayed by the shortened second adjust time T2'. This makes that the low-side period signals P1, P2 and P3 and the high-side period signals Q1, Q2 and Q3 are deactivated earlier in response to the second timing signal F2. The active periods (the active electrical angles) of the three-phase low-side activation control signals M1, M2 and M3 and the three-phase high-side activation control signals N1, N2 and N3 are shortened, and the active periods (the active electrical angles) of the low-side and high-side FET power transistors are shortened. As a result, the voltage detection of the voltage detecting part 23 becomes stable. This will be described below. Since the second adjust time is proportional to the previous interval T0 of the detected pulse signal Dt, the generation timing of the second timing signal F2 becomes much delayed in the condition of a rapid acceleration of the rotor 11. This makes the detection delay of the terminal voltages of the voltage detecting part 23, and the acceleration becomes unstable. To solve this problem, when the command signal Ac becomes larger than the predetermined value in such a case of the acceleration of the rotor 11, at least the second adjust time becomes shortened to improve the delay of the second timing signal F2. As a result, the voltage detection of the voltage detecting part 23 becomes stabilized, and a smooth acceleration of the motor is attained. At this time, the relationship of the first adjust time<the second adjust time is maintained even when Ft="H". So the active periods of the three-phase low-side activation control signals M1, M2 and M3 and the three-phase high-side activation control signals N1, N2 and N3 and the active periods of the low-side and high-side FET power transistors are made a little wider than an electrical angle of (360/3)=120 degrees during acceleration (Ft="H").

This kind of advantage can also be obtained when the load torque of the motor is large. When the load torque is large, the command signal Ac becomes larger than the reference voltage Br, and the adjust change signal Ft becomes "H". In case when Ft="H", the adjusting part 35 of the adjust operation part 27 shortens the second adjust time, and produces the second timing signal F2 delayed by the shortened second adjust time T2'. Hence, the low-side period signals P1, P2 and P3 and the high-side period signals Q1, Q2 and Q3 are deactivated earlier. The active periods (the active electrical angles) of the three-phase low-side activation control signals M1, M2 and M3 and the three-phase high-side activation control signals N1, N2 and N3 are shortened, and the active periods (the active electrical angles) of the low-side and high-side FET power transistors are shortened. As a result, the voltage detection by the voltage detecting part 23 becomes stable. When the load torque is large in particular, the composed supply current Ig corresponding to the command signal Ac becomes large, and a pulse voltage in changing ON to OFF of a FET power transistor is produced by the inductances of the windings. The voltage detection of the voltage detecting part 23 is liable to be disturbed by the pulse voltage. To solve this problem, when the command signal Ac becomes large in case of the large load torque, at least the second adjust time becomes shortened so that the operation of the voltage detecting part 23 is prevented from adversely affected by the pulse voltage in changing ON to OFF of a FET power transistor.

In this embodiment, as understood from the above-mentioned descriptions, position detecting elements for detecting the rotational position of the rotor are made unnecessary by detecting the terminal voltages of the windings. Furthermore, the FET power transistors for supplying the bi-directional drive currents to the windings are subjected to ON-OFF high-frequency switching operation or ON-OFF operation, thereby reducing power losses drastically. In other words, the low-side FET power transistors are subjected to ON-OFF high-frequency switching operation, thereby reducing the power losses of the low-side FET power. transistors significantly. The current paths are altered by turning ON and OFF the high-side FET power transistors, thereby reducing the power losses of the high-side FET power transistors. As a result, the power losses of the FET power transistors are reduced drastically, and the power efficiency of the motor is improved greatly. In particular, since the low-side FET power transistors and the high-side FET power transistors are operated in the full-ON/OFF states, the power losses of the low-side and high-side FET power transistors become very small.

In this embodiment, one or two of the three low-side FET power transistors are subjected to ON-OFF high-frequency switching operation to attain a first switching operation for high-frequency switching of one low-side FET power transistor and a second switching operation for high-frequency switching of two low-side FET power transistors. The first switching operation and the second switching operation are alternated in accordance with the rotation of the rotor. Hence, the alteration of the current paths by the low-side FET power transistors is overlapped. As a result, the pulsation of the generated drive force of the motor is reduced, thereby reducing vibration and acoustic noise of the motor. In this embodiment, one or two of the three high-side FET power transistors are subjected to ON-OFF operation to attain a first active operation for active operation of one high-side FET power transistor and a second active operation for active operation of two high-side FET power transistors. The first active operation and the second active operation are alternated in accordance with the rotation of the rotor. Hence, the alteration of the current paths by the high-side FET power transistors is overlapped. As a result, the pulsation of the generated drive force of the motor is reduced, thereby reducing vibration and acoustic noise of the motor. In this embodiment, each of the active periods (the active electrical angles) of the high-side FET power transistors and the low-side FET power transistors are set to about 140 degrees. The active periods, however, are not limited to 140 degrees, but can be increased to 180 degrees so as to reduce vibration and acoustic noise of the motor.

In this embodiment, a single switching pulse signal Wp is produced in response to the command signal. The low-side FET power transistors are subjected to ON-OFF high-frequency switching operation in response to the single switching pulse signal to reduce the power losses of the power transistors. In particular, the current-detection signal is produced in response to the supply current from the voltage supplying part 25 to the three-phase windings. The current-detection signal is compared with the command signal, and a single switching pulse signal is produced in response to the comparison result. In response to this switching pulse signal, the low-side FET power transistors are subjected to ON-OFF high-frequency switching operation simultaneously in their active periods. With this simple configuration, the drive currents to the windings can be controlled accurately in response to the command signal. As a result, an accurate drive force in response to the command signal is produced, thereby reducing vibration and acoustic noise of the motor greatly. Besides, the high-side FET power transistors can be subjected to OFF-ON high-frequency switching operation complementary to the ON-OFF high-frequency switching operation of the low-side FET power transistors responding with the switching pulse signal. In this way, the power losses of the high-side power diodes and the high-side FET power transistors can be further reduced, whereby the power efficiency of the motor can be improved further.

In addition, in this embodiment, when the command signal becomes larger than a predetermined value, at least the second adjust time is changed so as to make at least the product value of the second adjust time and the rotational speed of the rotor smaller, and the active periods (the active electrical angles) of the three-phase low-side activation control signals and the three-phase high-side activation control signals are shortened. As a result, the voltage detecting operation of the voltage detecting part is stabilized in case of an acceleration and/or a large load torque, and the active periods are made far wider than an electrical angle of 360/3=120 degrees in case of a steady speed controlled state. In other words, both a stable motor acceleration in the starting of the motor and a low acoustic noise and a low vibration in the speed controlled state can be attained without position detecting elements. Usually, the power supplying part 20, the current-detecting part 21, the switching control part 22, the voltage detecting part 23, the state shifting part 19 and the activation control part 32 are formed into a one-chip integrated circuit (IC). The commanding part 26 is formed in a microcomputer for speed control. In this embodiment, since the adjust time is changed depending on the magnitude of the command signal, the commanding part 26 for speed control can be connected to the one-chip integrated circuit easily. In other words, the number of connection wires between them is reduced, thereby simplifying the configuration of the motor. In addition, the command signal controls the drive currents to the windings while the FET power transistors are subjected to high-frequency switching operation in response to the command signal. As a result, the command signal becomes large during acceleration and/or heavy load operation, and becomes small during steady speed control operation. The adjust time can thus be changed accurately by the command signal, and the operation of the voltage detecting part can be stabilized. In the case of the spindle motor of an optical disk drive apparatus in particular, the aimed speed of speed control changes depending on the reproducing position on a disk. In this case, it is easy and stable to use the command signal for changing the adjust time.

The adjust time changing operation during acceleration can also be carried out by detecting the rotational speed of the rotor. FIG. 20 shows an adjust changing part 436 for comparing the rotational speed of the rotor. The adjust changing part 436 detects the rotational speed of the rotor 11 by using the period or frequency of the detected pulse signal Dt, i.e., the output signal of the voltage detecting part 23. In addition, the adjust changing part 436 compares the rotational speed of the rotor 11 with a predetermined value, and changes the adjust change signal Ft in response to the comparison result. The adjust changing part 436 is used in place with the adjust changing part 36 shown in FIG. 1. Hence, when the rotational speed of the rotor 11 is lower than the predetermined value, the adjust change signal Ft becomes "H". The adjusting part 35 of the state shifting part 19 shortens at least the second adjust time, decrease the product value of the second adjust time and the rotational speed, and outputs the second timing signal F2 earlier. For this reason, when the rotational speed of the rotor 11 is lower than the predetermined value, the changing operation is carried out so that the active periods of the three-phase low-side activation control signals and the three-phase high-side activation control signals are shortened in terms of electrical angle. Therefore, the active periods of the FET power transistors are shortened (in terms of electrical angle), and the voltage detecting operation of the voltage detecting part 23 is stabilized. As a result, the motor can be rotated stably even during acceleration. Besides, the active periods of the FET power transistors are maintained larger than an electrical angle of 120 degrees even during acceleration.

When the rotational speed of the rotor 11 is higher than the predetermined value, the adjust change signal Ft becomes "L". The adjusting part 35 of the state shifting part 19 sets the second adjust time to a required value (proportional to the interval T0 of the detected pulse signal Dt), and produces the second timing signal F2 at appropriate timing. As a result, the active periods (the active electrical angles) of the power transistors during speed control have an appropriate width (considerably larger than an electrical angle of 120 degrees). Therefore, a pulsation of the generated drive power, can be reduced. In other words, vibration and acoustic noise of the motor are reduced during speed control.

The other configurations and operations are similar to those of the above-mentioned motor shown in FIG. 1, and their detailed explanations are omitted. This kind of configuration is easy to use when the aimed speed of the speed control is a single just as with the spindle motor of a hard disk drive apparatus.

EMBODIMENT 2

Figure 21:
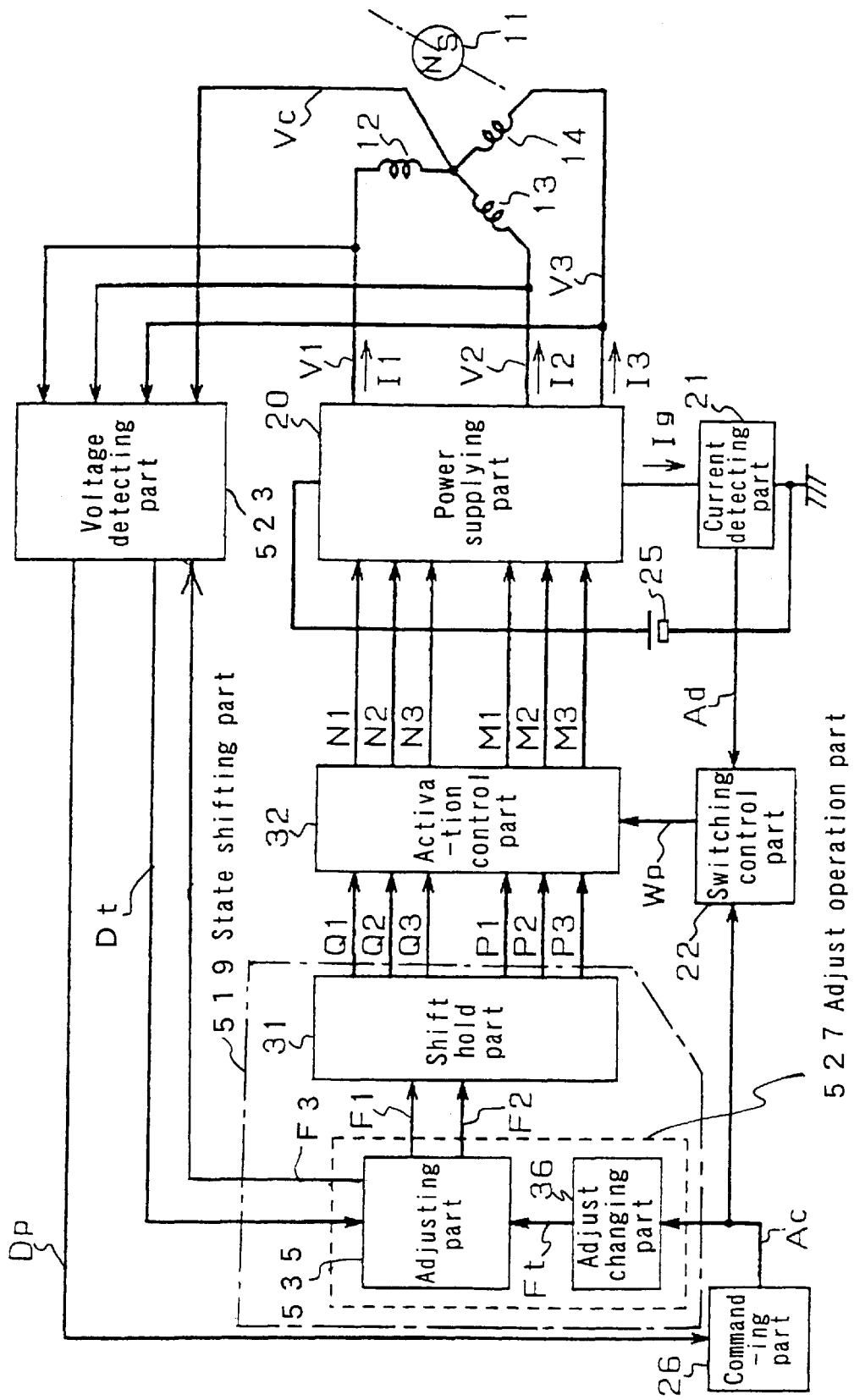
FIG. 21 is a diagram showing the configuration in accordance with embodiment 2 of the present invention.
Figure 22:
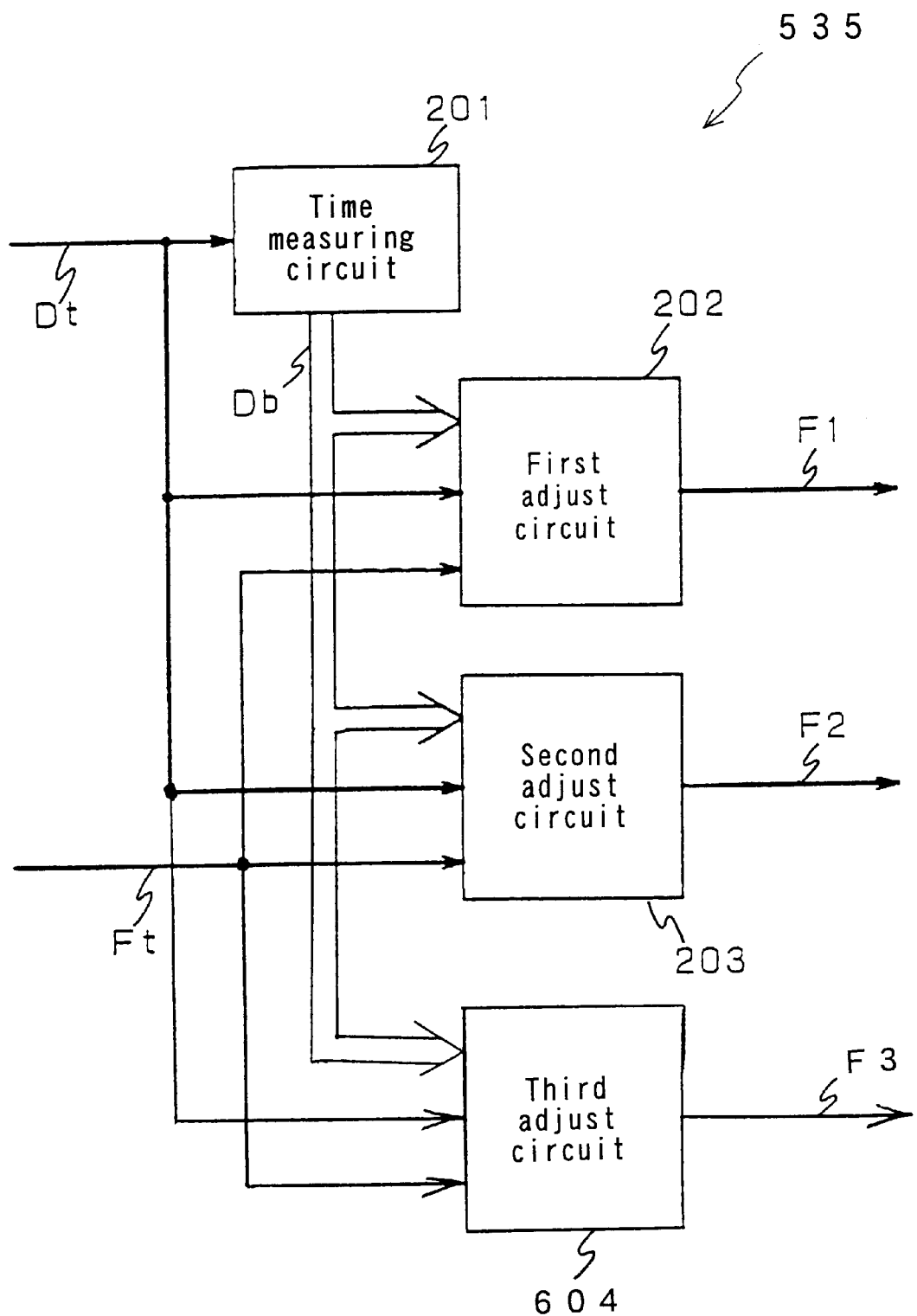
FIG. 22 is a circuit diagram of an adjusting part 535 of a state shifting part 519 in accordance with the embodiment 2.
Figure 23:
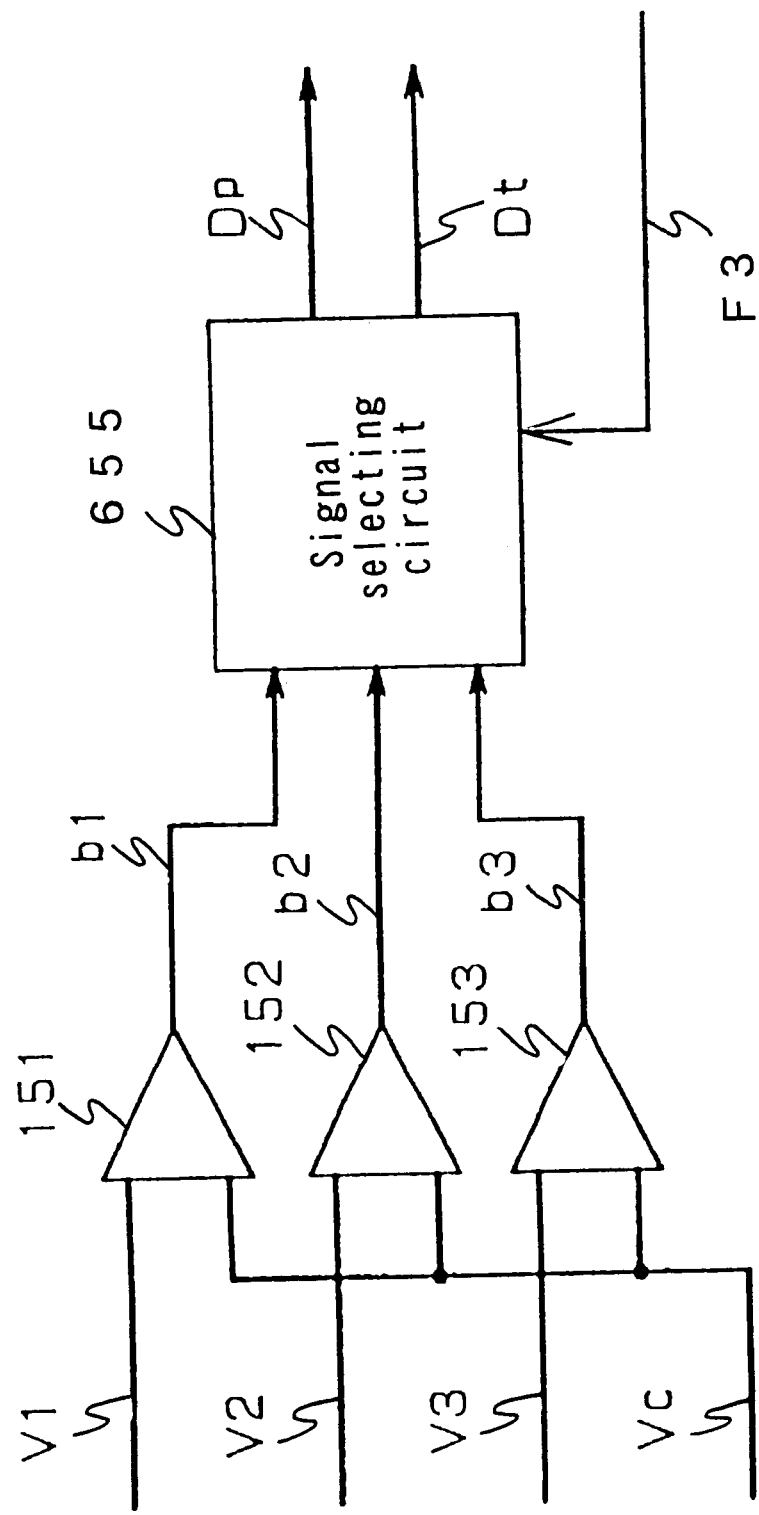
FIG. 23 is a circuit diagram of a voltage detecting part 523 in accordance with the embodiment 2.

FIGS. 21 to 23 show a motor in accordance with embodiment 2 of the present invention. FIG. 21 shows a comprehensive configuration of the motor. In this embodiment, a voltage detecting part 523 and a state shifting part 519 are changed on the basis of the configuration of the above-mentioned embodiment 1. The parts or the circuits having functions similar to those of the above-mentioned embodiment 1 are designated by the same numerals, and their explanations are omitted.

In FIG. 21, an adjusting part 535 of an adjust operation part 527 of the state shifting part 519 produces the first timing signal F1 after the first adjust time T1, the second timing signal F2 after the second adjust time T2 (T2>T1) and a third timing signal F3 after a third adjust time T3 (T3>T2) in response to the arrival of the detected pulse signal Dt of the voltage detecting part 523. The third timing signal F3 is input to the voltage detecting part 523. The voltage detecting part 523 stops its terminal voltage detecting operation temporarily after the generation of the detected pulse signal Dt, and resumes the terminal voltage detecting operation after the arrival of the third timing signal F3. When the terminal voltage of a phase to be detected becomes equal to the common voltage, the voltage detecting part 523 produces the detected pulse signal Dt, and stops the terminal voltage detecting operation temporarily until the next arrival of the third timing signal F3. This operation is then repeated. Thus, the third adjust time T3 determines the stop period (the stop electrical angle) of the voltage detecting part 523. FIG. 22 shows a configuration of the adjusting part 535 of the state shifting part 519, and FIG. 23 shows a configuration of the voltage detecting part 523.

In FIG. 22, the adjusting part 535 comprises a time measuring circuit 201, a first adjust circuit 202 and a second adjust circuit 203 and a third adjust circuit 604. The time measuring circuit 201 measures a time interval T0 of the rising edges of the detected pulse signal Dt and outputs the count data signal Db responding with the time interval T0. The first adjust circuit 202 receives the count data signal Db at the rising edge of the detected pulse signal Dt, and produces the first timing signal F1 which is delayed by the first adjust time T1 proportional or nearly proportional to the time interval T0 (the count data signal Db). Similarly, the second adjust circuit 203 receives the count data signal Db at the rising edge of the detected pulse signal Dt, and produces the second timing signal F2 which is delayed by the second adjust time T2 proportional or nearly proportional to the time interval T0 (the count data signal Db). Similarly, the third adjust circuit 604 receives the count data signal Db at the rising edge of the detected pulse signal Dt, and produces the third timing signal F3 which is delayed by the third adjust time T3 proportional or nearly proportional to the time interval T0 (the count data signal Db). The relationship of the first adjust time T1<the second adjust time T2<the third adjust time T3 has been selected herein.

The first adjust circuit 202, the second adjust circuit 203 and the third adjust circuit 604 change the first adjust time T1, the second adjust time T2 and the third adjust time T3 in response to the adjust change signal Ft of the adjust changing part 36. When the adjust change signal Ft becomes "H", the first adjust circuit 202 changes the first adjust time smaller so that the first product value of the first adjust time and the rotational speed of the rotor becomes smaller, the second adjust circuit 203 changes the second adjust time smaller so that the second product value of the second adjust time and the rotational speed of the rotor becomes smaller, and the third adjust circuit 604 changes the third adjust time smaller so that the third product value of the third adjust time and the rotational speed of the rotor becomes smaller. At this time, the relationship of the first adjust time<the second adjust time<the third adjust time is maintained even when Ft="H", thereby producing the second timing signal F2 after the first timing signal F1, and producing the third timing signal F3 after the second timing signal F2.

Figure 24:
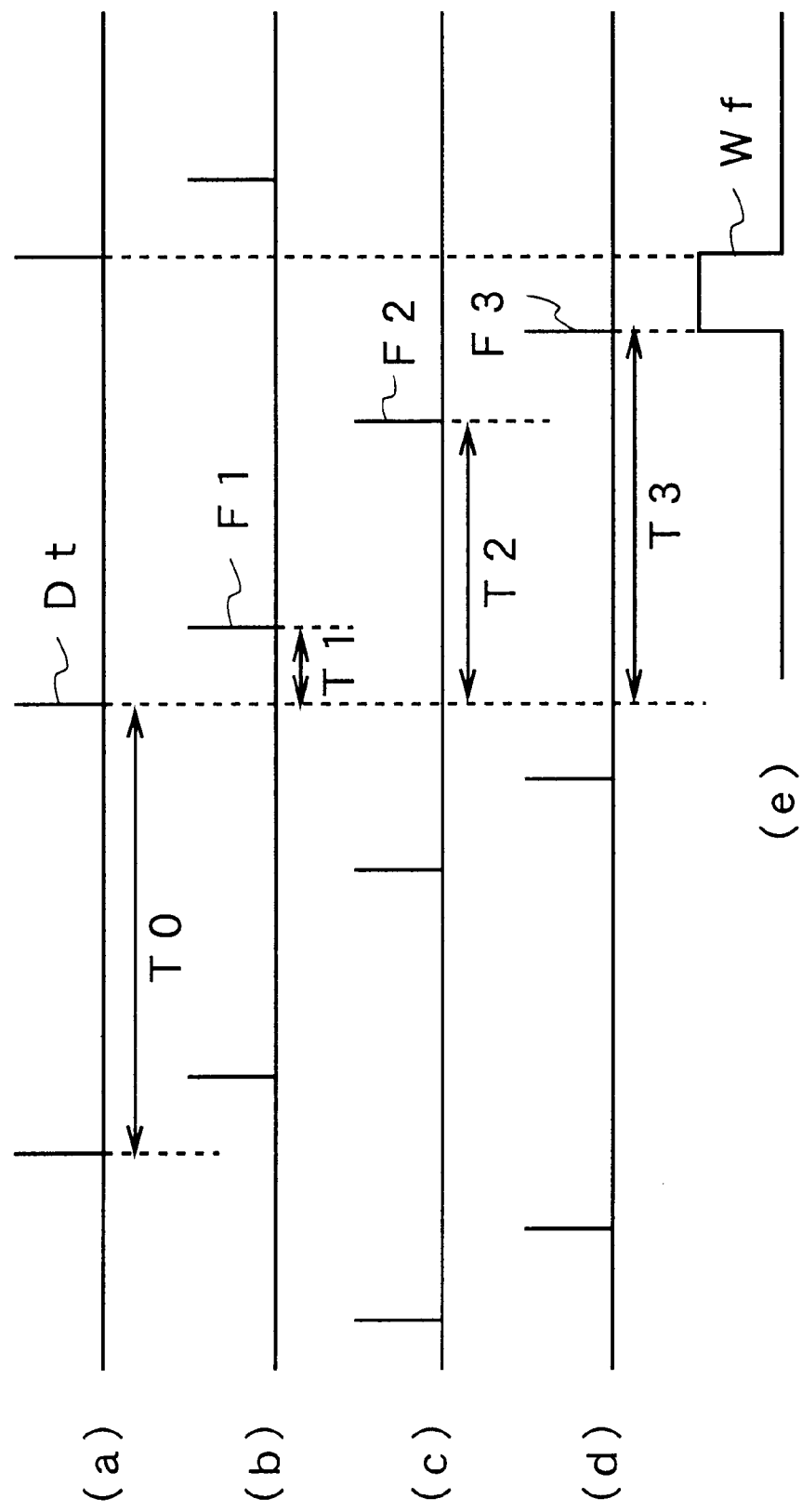
FIG. 24 is a waveform diagram illustrating the operation of the adjusting part 535 of the state shifting part 519 in accordance with the embodiment 2.

FIG. 24 shows the relationship among these signal waveforms when the adjust change signal Ft is "L". The time measuring circuit 201 produces the count value corresponding to the time interval T0 between the successive rising edges of the detected pulse signal Dt shown in the part (a) in FIG. 24. The first adjust circuit 202 produces the first timing signal F1 (see the part (b) in FIG. 24) delayed by the first adjust time T1 which is proportional or nearly proportional to the time interval T0. Thus, the first timing signal F1 becomes a pulse signal delayed by the first adjust time T1 from the rising edge of the detected pulse signal Dt. The second adjust circuit 203 produces the second timing signal F2 (see the part (c) in FIG. 24) delayed by the second adjust time T2 which is proportional or nearly proportional to the time interval T0. Thus, the second timing signal F2 becomes a pulse signal delayed by the second adjust time T2 from the rising edge of the detected pulse signal Dt. The third adjust circuit 604 produces the third timing signal F3 (see the part (d) in FIG. 24) delayed by the third adjust time T3 which is proportional or nearly proportional to the time interval T0. Thus, the third timing signal F3 becomes a pulse signal delayed by the third adjust time T3 from the rising edge of the detected pulse signal Dt. At this time, the relationship of the first adjust time T1<the second adjust time T2<the third adjust time T3 is maintained. The third adjust time T3 is considerably a large electrical angle in the range between 30 degrees and 60 degrees when Ft="L". The second adjust time T2 is also considerably a large electrical angle in the range between 30 degrees and 60 degrees when Ft="L".

Figure 25:
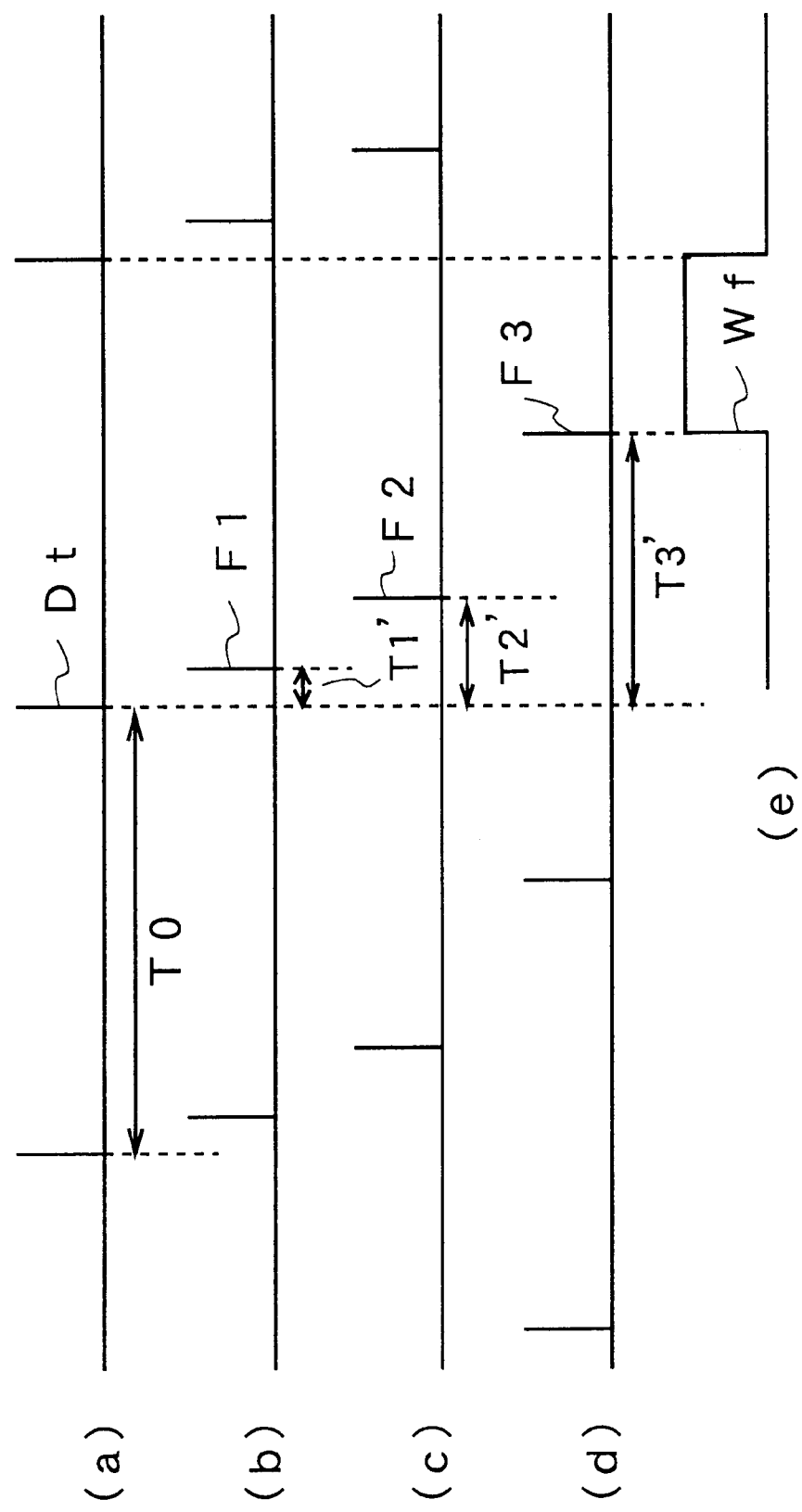
FIG. 25 is another waveform diagram illustrating the operation of the adjusting part 535 of the state shifting part 519 in accordance with the embodiment 2.

When the adjust change signal Ft of the adjust changing part 36 changes from "L" to "H", the first adjust time, the second adjust time and the third adjust time become shorter, and the first timing signal F1, the second timing signal F2 and the third timing signal F3 are produced earlier. FIG. 25 shows the relationship among these signal waveforms when the adjust change signal Ft is "H". The first adjust circuit 202 produces the first timing signal F1 (see the part (b) in FIG. 25) which is delayed by the first adjust time T1' proportional or nearly proportional to the time interval T0 from the rising edge of the detected pulse signal Dt, where T1'<T1<T0. The second adjust circuit 203 produces the second timing signal F2 (see the part (c) in FIG. 25) which is delayed by the second adjust time T2' proportional or nearly proportional to the time interval T0 from the rising edge of the detected pulse signal Dt, where T2'<T2<T0. The third adjust circuit 604 produces the third timing signal F3 (see the part (d) in FIG. 25) which is delayed by the third adjust time T3' proportional or nearly proportional to the time interval T0 from the rising edge of the detected pulse signal Dt, where T3'<T3<T0. At this time, the relationship of the first adjust time T1'<the second adjust time T2'<the third adjust time T3' is also maintained. . The third adjust time T3' becomes a small electrical angle which is smaller than T3. The second adjust time T2 becomes a small electrical angle which is smaller than T2.

In FIG. 23, the voltage detecting part 523 comprises three comparator circuits 151, 152 and 153 and a signal selecting circuit 655. The three comparator circuits 151, 152 and 153 compare the three-phase terminal voltages V1, V2 and V3 with the common terminal voltage Vc, and output three-phase compared pulse signals b1, b2 and b3 responding with the comparison result. The signal selecting circuit 655 selectively detects the rising edge or the falling edge of one of the compared pulse signals b1, b2 and b3 depending on the holding state of the shift hold part 31 or the activation state to the three-phase windings. The signal selecting circuit 655 stops its detecting operation temporarily in the stop period (the stop electrical angle) from the generation of the detected pulse signal Dt to the arrival of the third timing signal F3 of the adjusting part 535 of the state shifting part 519, the stop period being equal to the third adjust time. Then, the signal selecting circuit 655 waits for the next generation of the selected edge of the compared pulse signals after the arrival of the third timing signal F3, and produces the detected pulse signal Dt upon generation of the edge of the compared pulse signal selected. The part (e) in FIG. 24 or the part (e) in FIG. 25 shows a window signal Wf, "L" of which represents the stop period and "H" of which represents a waiting period from the third timing signal F3 to the next detecting timing of the detected pulse signal Dt. So the detecting operation of the detected pulse signal Dt is carried out during the "H" period of the window signal Wf.

This prevents improper detecting operation wherein the voltage detecting part 523 produces the detected pulse signal Dt improperly by using improper pulses included in the compared pulse signals. As a result, the voltage detecting part 523 can produce the detected pulse signal Dt at the accurate timing responding with the terminal voltages, and the rotational speed of motor can be controlled of the stablely. Thus, an abnormal motor rotation, such as a hunting and an abnormal stop, owing to an improper detection of the voltage detecting part 523 can be prevented. In addition, since the third adjust time is changed depending on the adjust change signal Ft so that the third adjust time, the stop period of the voltage detecting part 523, becomes small during acceleration of the motor, and thus the detected pulse signal Dt can be obtained at accurate timing even during acceleration.

The other configurations and operations are similar to those of the above-mentioned embodiment 1, and their detailed explanations are omitted.

In this embodiment, by using the third timing signal F3 of the adjusting part of the state shifting part, the voltage detecting part stops the detecting operation of the detected pulse signal in the stop period responding with the third adjust time from the generation of the detected pulse signal to the third timing signal. Thus, the voltage detecting part detects the terminal voltages after a required time (T3−T2) has passed after the alteration of the current paths by the FET power transistors. For this reason, the detecting operation of the terminal voltages by the voltage detecting part can be made stable, and a hunting of the motor rotation can be prevented. Furthermore, when the command signal becomes larger than the predetermined value, at least the third adjust time is changed so that the product value of the third adjust time and the rotational speed is made smaller, thereby making the stop period (the stop electrical angle) smaller in that case. As a result, the detected pulse signal Dt can be obtained at accurate timing even during acceleration, whereby smooth acceleration can be carried out.

When the command signal is larger than the predetermined value, at least the second adjust time is changed so that the product value of the second adjust time and the rotational speed of the rotor is made small. This makes the active periods (the active electrical angles) of the three-phase low-side activation control signals and the three-phase high-side activation control signals shortened. As a result, a stable voltage detecting operation of the voltage detecting part is attained during acceleration. In this case, the active periods of the three-phase low-side activation control signals and the three-phase high-side activation control signals, and the active periods (the active electrical angles) of the low-side and high-side FET power transistors are made a little wider than an electrical angle of 360/3=120 degrees during acceleration (Ft="H").

When the command signal is smaller than the predetermined value in a stable speed control, the second adjust time is a considerably large electrical angle. This makes the active periods (the active electrical angles) of the three-phase low-side activation control signals and the three-phase high-side activation control signals considerably large. So the active periods of the low-side and high-side FET power transistors can be made far wider than an electrical angle of 360/3=120 degrees during a steady speed control. As a result, an excellent motor rotation with a low acoustic noise and a low vibration is realized in a steady speed control (Ft="L").

Besides, when the command signal is smaller than the predetermined value in a stable speed control, the third adjust time is a considerably large electrical angle. This makes the stop period (the stop electrical angle) of the voltage detecting part considerably large. Then, the active periods (the active electrical angles) of the three-phase low-side activation control signals and the three-phase high-side activation control signals, and the active periods of the low-side and high-side FET power transistors can be made far wider than an electrical angle of 360/3=120 degrees during a steady speed control. As a result, an excellent motor rotation with a low acoustic noise and a low vibration is realized in a steady speed control (Ft="L").

Therefore, it is possible to attain a stable motor acceleration and also achieve an excellent motor rotation with a low acoustic noise and a low vibration in a steady speed control.

Three-phase drive currents proportional or nearly proportional to the command signal are supplied to the three-phase windings, while at least one of the FET power transistors is subjected to high-frequency switching operation in response to the command signal. As a result, the command signal becomes large during acceleration and during a heavy load operation, the adjust time can be changed accurately by monitoring the command signal. So the detecting operation of the voltage detecting part can be made stable. Besides, when the first adjust time is short originally, it is not necessary to shorten the first adjust time further.

In this embodiment, there are numerous technical advantages similar to those of the above-mentioned embodiment 1, which are explained before.

The adjust changing part 436 shown in FIG. 20 can be used in place of the adjust changing part 36 shown in FIG. 21. The adjust changing part 436 detects the rotational speed of the rotor 11 by using the period or frequency of the detected pulse signal Dt. When the rotational speed of the rotor 11 is lower than the predetermined value, the adjust changing part 436 changes the first adjust time of the adjusting part 535 so that the product value of the first adjust time and the rotational speed of the rotor becomes small, thereby producing the first timing signal F1 earlier. In addition, the adjust changing part 436 changes the second adjust time of the adjusting part 535 so that the product value of the second adjust time and the rotational speed of the rotor becomes small, thereby producing the second timing signal F2 earlier. Furthermore, the adjust changing part 436 changes the third adjust time of the adjusting part 535 so that the product value of the third adjust time and the rotational speed of the rotor becomes small, thereby producing the third timing signal F3 earlier. As a result, the detected pulse signal Dt can be obtained at accurate timing even during acceleration, whereby the motor can be accelerated stably. Besides, the active periods of the FET power transistors are made wider than an electrical angle of 120 degrees during acceleration.

When the rotational speed of the rotor 11 becomes higher than the predetermined value, the product value of the first adjust time and the rotational speed of the rotor and/or the product value of the second adjust time and the rotational speed of the rotor and/or the product value of the third adjust time and the rotational speed of the rotor become required values. The first timing signal F1, the second timing signal F2 and the third timing signal F3 are produced at proper timings. As a result, in a steady state of the speed control, the active periods of the FET power transistors become wide appropriately (considerably wider than an electrical angle of 120 degrees). A pulsation of the generated drive force becomes smaller. In other words, the motor has a low vibration and a low acoustic noise during speed control.

The other configurations and operations are similar to those of the above-mentioned motor shown in FIG. 21, and their detailed explanations are omitted.

EMBODIMENT 3

The embodiments shown in FIGS. 1 and 21 are fabricated by hardwired circuits. The present invention, however, can comprise a CPU (central processing unit) and a software for carrying out the operations of the embodiments. An embodiment having this kind of configuration is shown in FIGS. 26 and 27, and will be described below.

Figure 26:
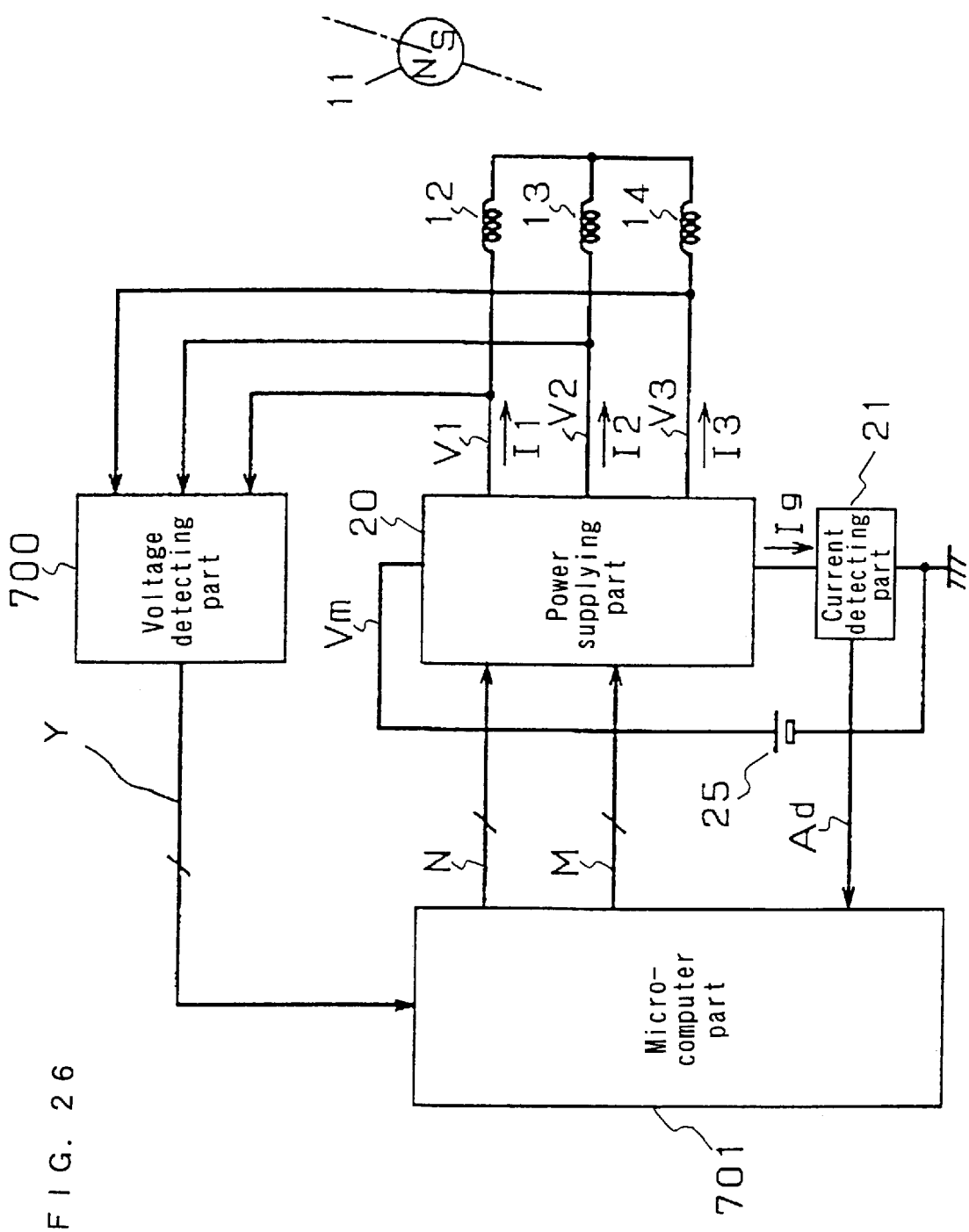
FIG. 26 is a diagram showing the configuration in accordance with embodiment 3 of the present invention.
Figure 27:
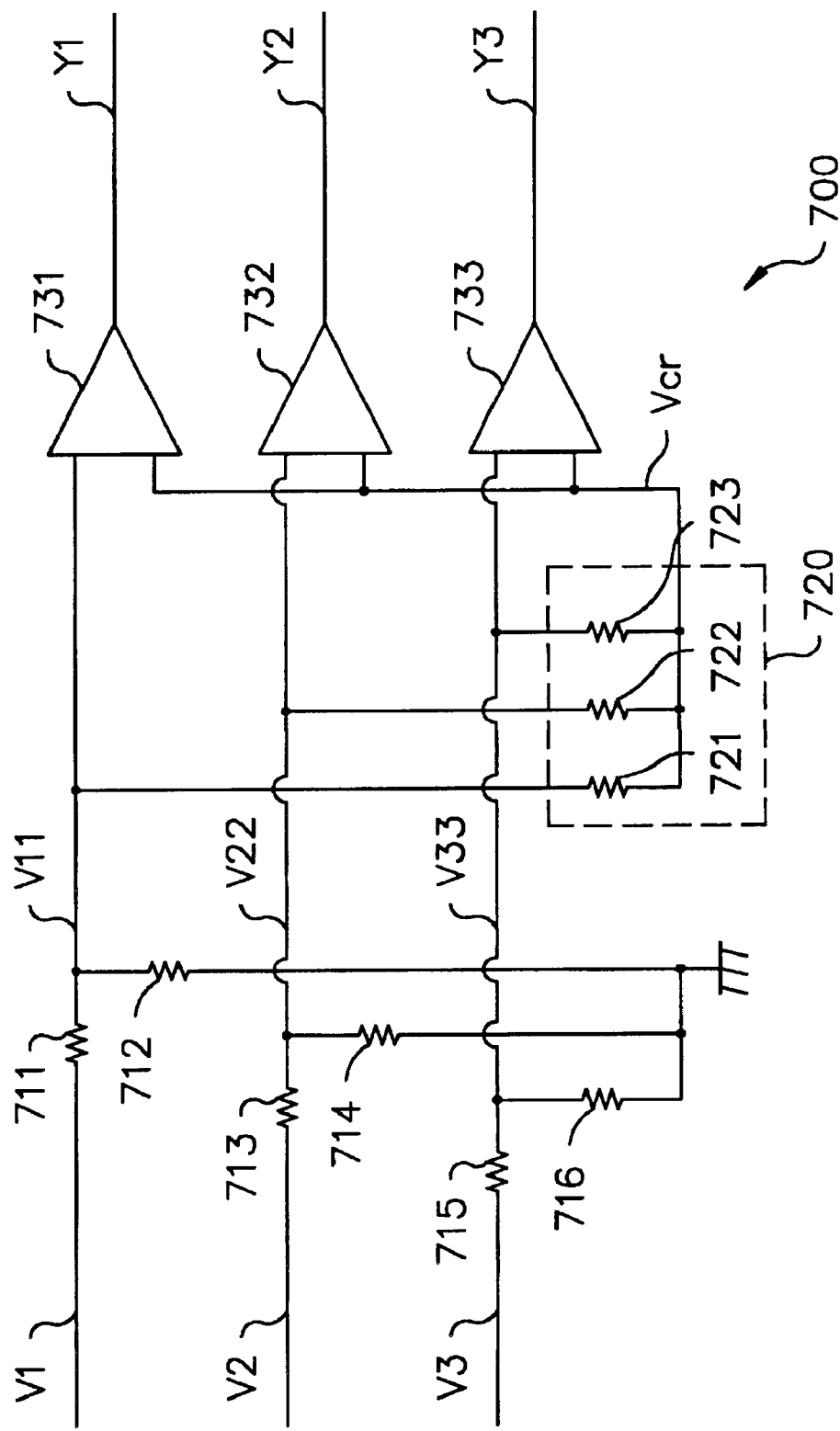
FIG. 27 is a circuit diagram of a voltage detecting part 700 in accordance with the embodiment 3.
Figure 28:
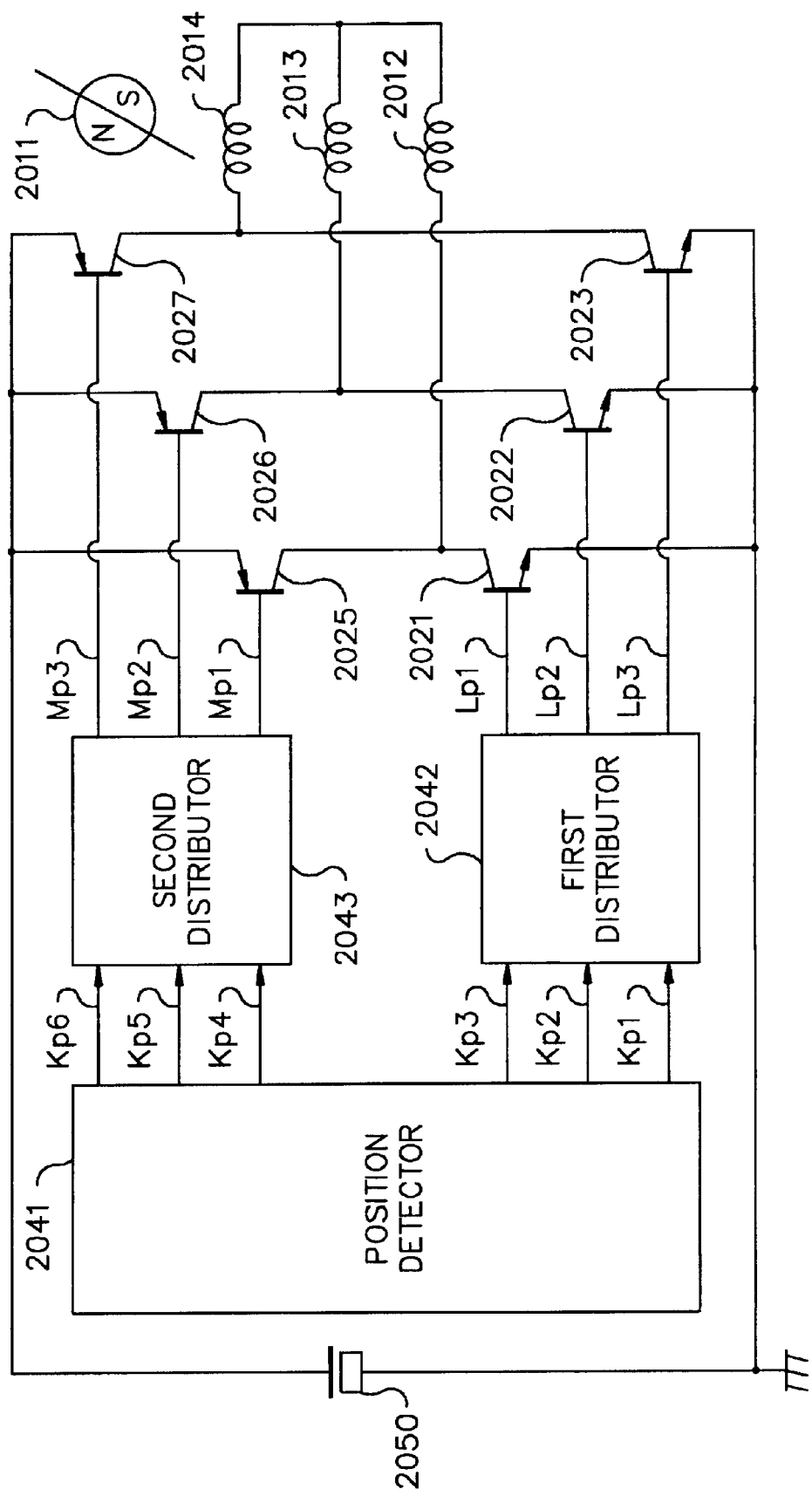
FIG. 28 is a diagram showing the configuration of the conventional motor.

FIGS. 26 and 27 show a motor in accordance with embodiment 3 of the present invention. FIG. 26 shows a comprehensive configuration of the motor. In this embodiment, the functions of the adjust operation part, the shift hold part, the activation control part, the switching control part and the commanding part of the above-mentioned embodiment 1 or 2 are included in the hardware and software of a micro-computer part 701. The parts or circuits having functions and configurations similar to or corresponding to those of the above-mentioned embodiment 1 or 2 are designated by the same numerals, and their explanations are omitted.

In accordance with the rotation of the rotor 11, the power supplying part 20 changes current paths to the three-phase windings 12, 13 and 14. A voltage detecting part 700 detects the terminal voltages of the three-phase windings 12, 13 and 14, and outputs compared pulse signals Y1, Y2 and Y3 responding with the terminal voltages to the micro-computer part 701. FIG. 27 shows a configuration of the voltage detecting part 700.

In FIG. 27, the voltage detecting part 700 divides the terminal voltages V1, V2 and V3 of the windings by using resistors 711 to 716, thereby producing divided terminal voltages V11, V22 and V33. A composite voltage circuit 720 composes the divided terminal voltages V11, V22 and V33 by using resistors 721, 722 and 723, thereby producing a composite common terminal voltage Vcr. Comparator circuits 731, 732 and 733 compare the divided terminal voltages V11, V22 and V33 with the composite common terminal voltage Vcr, respectively, and output the compared pulse signal Y1, Y2 and Y3 responding with the comparison result.

The micro-computer part 701 in FIG. 26 receives the compared pulse signals Y1, Y2 and Y3 of the voltage detecting part 700, and detects a rising edge or a falling edge of one of the compared pulse signals selected by a holding state which corresponds to the activation state of the low-side and high-side FET power transistors while eliminating the influence of PWM noises in the compared pulse signals. In response to this detecting operation, the detected pulse signal is produced equivalently. The holding state is shifted from a first state to a second state after the first adjust time from the detection of the detected pulse signal, and is further shifted from the second state to the third state after the second adjust time from the detection of the detected pulse signal. In accordance with the holding state, the active periods (the active electrical angles) of the low-side activation control signals M1, M2 and M3 and the high-side activation control signals N1, N2 and N3 are produced. As a result, the active periods of the FET power transistors are made larger than an electrical angle of 120 degrees. In addition, the micro-computer part 701 receives the current-detection signal Ad of the current-detecting part 21 as a digital current-detection signal converted by an AD converter, and compares the digital current-detection signal with a digital command signal. The micro-computer part 701 produces a PWM pulse signal responding with the comparison result between the digital current-detection signal and the digital command signal, and produces the above-mentioned low-side activation control signals M1, M2 and M3 responding with the PWM pulse signal. In this configuration, the microcomputer part 701 detects the rotational speed of the rotor 11 in response to the compared pulse signal s of the voltage detecting part 700, and produces the digital command signal responding with the difference between the rotational speed and the aimed rotational speed. Besides, the current-detection signal Ad can be compared with the command signal Ac in an analog manner.

When the command signal is larger than a predetermined value, the micro-computer 701 changes the adjust times so that the first product value of the first adjust time and the rotational speed and/or the second product value of the second adjust time and the rotational speed and/or the third product value of the third adjust time and the rotational speed become smaller. As a result, the active periods of the FET power transistors are shortened, and the rotation of the motor is stabilized during an acceleration and during a heavy load operation.

These operations are not required to be executed only by using the software of the micro-computer part 701, but can be executed by using its hardware.

Even in this embodiment, advantages similar to those of the above-mentioned embodiment 1 or 2 can also be obtained.

The configurations of the above-mentioned embodiments can be modified variously. For example, each of the three-phase windings can be formed by connecting a plurality of winding portions in series or parallel. The connection of the three-phase windings is not limited to star connection, but delta connection can be used. Furthermore, the number of the phases of the windings is not limited to three. Generally, it is possible to realize a configuration having windings with a plurality of phases. In addition, the number of the magnetic poles in the field part of the rotor is not limited to two, but multi-poles can be used.

In the above-mentioned embodiments, the current-detecting part is fabricated simply by, a single current-detecting resistor. The present invention, however, is not limited to such a case, but various current-detecting methods can be used. For example, the present invention is not limited to detect the current obtained by composing the negative-part current values of the three-phase drive currents, but the current obtained by composing the positive-part current values can be detected. Furthermore, each of the low-side FET power transistors and the high-side FET power transistors can have multiple output terminals, and the current output to one of the terminals can be detected.

In the above-mentioned embodiments, FET power transistors are used as the power transistors of the power supplying part to make high-frequency switching operation easy. With this configuration, power losses and heat generation of the power transistors are reduced remarkably, whereby the FET power transistors with other electronic elements such as transistors, resistors, and diodes can be formed into an integrated circuit easily. IGBT transistor, however, is a type of FET power transistor because it utilizes a field effect phenomenon. So IGBT transistors can be used as the FET power transistors although the IGBT transistors have an disadvantage of a large saturation voltage in an ON state. Besides, at least one of the FET power transistors of the power supplying part should only be subjected to high-frequency switching operation between the ON state and the OFF state, where the ON state include not only a full-ON state but also a half-ON state.

In the above-mentioned embodiments, the voltages of the power supplying terminals of the windings are detected. The present invention, however, is not limited to such a case, but the voltage of the common terminal of the windings may be detected.

Although only the low-side FET power transistors are subjected to high-frequency switching operation in the above-mentioned embodiments, the present invention is not limited to such a case. For example, only the high-side FET power transistors can be subjected to high-frequency switching operation responding with the command signal, or the low-side FET power transistors and the high-side FET power transistors can be subjected to high-frequency switching operation simultaneously responding with the command signal, or the low-side FET power transistors and the high-side FET power transistors can be subjected to high-frequency switching operation alternately responding with the command signal.

The high-side FET power transistors in phase with the low-side FET power transistors subjected to ON-OFF high-frequency switching operation can be subjected to OFF-ON high-frequency switching operation complementary to the ON-OFF high-frequency switching operation of the low-side FET power transistors. Hence, the power losses of the high-side power diodes and the high-side FET power transistors can be reduced, and the power efficiency of the motor can be improved further. Since the low-side FET power transistors of the power supplying part are subjected to the high-frequency switching operation in response to a single pulse signal at this time, the high-side FET power transistors can easily be subjected to the OFF-ON high-frequency switching operation complementary to the ON-OFF high-frequency switching operation of the low-side FET power transistors. In other words, it is possible to provide clearance times easily, whereby simultaneous turnings ON of the low-side FET power transistors and the high-side FET power transistors can be prevented easily.

The configuration of the present invention can be modified variously without departing from the purpose of the present invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A motor comprising:

a rotor which has a field part generating field fluxes;

Q-phase windings (Q is an integer of 3 or more);

voltage supplying means which includes two output terminals for supplying a DC voltage;

power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;

voltage detecting means for producing a detected pulse signal in response to terminal voltages of said Q-phase windings;

state shifting means for shift-holding a holding state from one state to at least one other state in sequence in response to the detected pulse signal of said voltage detecting means;

activation control means for controlling active periods of said Q first FET power transistors and said Q second FET power transistors in response to said holding state;

commanding means for producing a command signal in response to an output pulse signal of said voltage detecting means; and switching operation means for causing at least one of said Q first FET power transistors and said Q second FET power transistors to perform high-frequency switching in response to said command signal;

and that
  said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees,
  said switching operation means produces a switching pulse signal in response to said command signal, and makes high-frequency switching operation of at least one FET power transistor among said Q first FET power transistors and said Q second FET power transistors in response to said switching pulse signal, and
  said state shifting means includes:
    adjusting means for producing a timing signal after an adjust time from detection of said detected pulse signal,
    shift hold means for shift-holding said holding state in response to said timing signal, and
    adjust changing means for changing said adjust time of said adjusting means smaller in case that said command signal is larger than a predetermined value, thereby making the product value of said adjust time and said rotational speed of said rotor smaller in said case.

2. The motor in accordance with claim 1, wherein said switching operation means includes:
  current-detecting means for producing a current-detection signal in response to or corresponding to a current from said voltage supplying means to said Q-phase windings, and
  switching control means for comparing said current-detection signal with said command signal and producing said switching pulse signal in response to the comparison result.

3. The motor in accordance with claim 1, wherein said state shifting means shifts said holding state from a first state to a second state after a first adjust time from detection of said detected pulse signal, and further shifts said holding state from said second state to a third state after a second adjust time from detection of said detected pulse signal, said first adjust time and said second adjust time being substantially proportional to an interval of said detected pulse signal, and
said adjust changing means changes at least said second adjust time smaller in case that said command signal is larger than the predetermined value, said second adjust time being larger than said first adjust time.

4. The motor in accordance with claim 1, wherein said state shifting means changes active periods of said Q-phase first activation control signals and said Q-phase second activation control signals smaller in case that said command signal is larger than the predetermined value, each of said active periods of said Q-phase first activation control signals and said Q-phase second activation control signals being an electrical angle which is larger than 360/Q degrees.

5. The motor in accordance with claim 1, wherein said voltage detecting means stops detecting of said detected pulse signal from a pulse timing of said detected pulse signal to another adjust time, said another adjust time being larger than said adjust time and substantially proportional to an interval of said detected pulse signal.

6. A motor comprising:
a rotor which has a field part generating field fluxes;
Q-phase windings (Q is an integer of 3 or more);
voltage supplying means which includes two output terminals for supplying a DC voltage;
power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;
voltage detecting means for producing a detected pulse signal in response to terminal voltages of said Q-phase windings;
state shifting means for shift-holding a holding state from one state to at least one other state in sequence in response to the detected pulse signal of said voltage detecting means;
activation control means for controlling active periods of said Q first FET power transistors and said Q second FET power transistors in response to said holding state;
commanding means for producing a command signal in response to an output pulse signal of said voltage detecting means; and
switching operation means for causing at least one of said Q first FET power transistors and said Q second FET power transistors to perform high-frequency switching in response to said command signal;
and that
  said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees,
  said switching operation means produces a switching pulse signal in response to said command signal, and makes high-frequency switching operation of at least one FET power transistor among said Q first FET power transistors and said Q second FET power transistors in response to said switching pulse signal, and
  said state shifting means includes:
    adjusting means for producing a first timing signal after a first adjust time from detection of said detected pulse signal and a second timing signal after a second adjust time from detection of said detected pulse signal, said second adjust time being larger than said first adjust time,
    shift hold means for shift-holding said holding state from a first state to a second state after said first adjust time from detection of said detected pulse signal in response to said first timing signal, and further shift-holding said holding state from said second state to a third state after said second adjust time from detection of said detected pulse signal in response to said second timing signal, and
    adjust changing means for changing at least said second adjust time of said adjusting means smaller in case that said command signal is larger than a predetermined value, thereby making the product value of said second adjust time and said rotational speed of said rotor smaller in said case.

7. The motor in accordance with claim 6, wherein said switching operation means includes:
   current-detecting means for producing a current-detection signal in response to or corresponding to a current from said voltage supplying means to said Q-phase windings, and
   switching control means for comparing said current-detection signal with said command signal and producing said switching pulse signal in response to the comparison result.

8. The motor in accordance with the claim 6, wherein said state shifting means produces said first adjust time and said second adjust time which are substantially proportional to an interval of said detected pulse signal.

9. The motor in accordance with claim 6, wherein said voltage detecting means stops detecting of said detected pulse signal from a pulse timing of said detected pulse signal to another adjust time, said another adjust time being larger than said second adjust time and substantially proportional to an interval of said detected pulse signal.

10. A motor comprising:
    a rotor which has a field part generating field fluxes;
    Q-phase windings (Q is an integer of 3 or more);
    voltage supplying means which includes two output terminals for supplying a DC voltage;
    power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;
    voltage detecting means for producing a detected pulse signal in response to terminal voltages of said Q-phase windings;
    state shifting means for shift-holding a holding state from one state to at least one other state in sequence in response to the detected pulse signal of said voltage detecting means;
    activation control means for controlling active periods of said Q first FET power transistors and said Q second FET power transistors in response to said holding state;
    commanding means for producing a command signal in response to an output pulse signal of said voltage detecting means; and
    switching operation means for causing at least one of said Q first FET power transistors and said Q second FET power transistors to perform high-frequency switching in response to said command signal;
    and that
    said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees, said switching operation means produces a switching pulse signal in response to said command signal, and makes high-frequency switching operation of at least one FET power transistor among said Q first FET power transistors and said Q second FET power transistors in response to said switching pulse signal, and
    said state shifting means, in cooperation with said activation control means, changes active periods of said Q-phase first activation control signals and said Q-phase second activation control signals smaller in case that said command signal is larger than a predetermined value, each of said active periods of said Q-phase first activation control signals and said Q-phase second activation control signals being an electrical angle which is larger than 360/Q degrees.

11. The motor in accordance with claim 10, wherein said switching operation means includes:
    current-detecting means for producing a current-detection signal in response to or corresponding to a current from said voltage supplying means to said Q-phase windings, and
    switching control means for comparing said current-detection signal with said command signal and producing said switching pulse signal in response to the comparison result.

12. The motor in accordance with claim 10, wherein said state shifting means includes:
    adjusting means for producing a first timing signal after a first adjust time from detection of said detected pulse signal and a second timing signal after a second adjust time from detection of said detected pulse signal, said first adjust time and said second adjust time being substantially proportional to an interval of said detected pulse signal, said second adjust time being larger than said first adjust time,
    shift hold means for shift-holding said holding state from a first state to a second state after said first adjust time from detection of said detected pulse signal in response to said first timing signal, and further shift-holding said holding state from said second state to a third state after said second adjust time from detection of said detected pulse signal in response to said second timing signal, and
    adjust changing means for changing at least said second adjust time of said adjusting means smaller in case that said command signal is larger than a predetermined value, thereby making the product value of said second adjust time and said rotational speed of said rotor smaller in said case.

13. The motor in accordance with claim 10, wherein said voltage detecting means stops detecting of said detected pulse signal from a pulse timing of said detected pulse signal to another adjust time, said another adjust time being larger than said second adjust time and substantially proportional to an interval of said detected pulse signal.

14. A motor comprising:
    a rotor which has a field part generating field fluxes;
    Q-phase windings (Q is an integer of 3 or more);
    voltage supplying means which includes two output terminals for supplying a DC voltage;
    power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;

voltage detecting means for producing a detected pulse signal in response to terminal voltages of said Q-phase windings;

state shifting means for shift-holding a holding state from one state to at least one other state in sequence in response to the detected pulse signal of said voltage detecting means;

activation control means for controlling active periods of said Q first FET power transistors and said Q second FET power transistors in response to said holding state;

commanding means for producing a command signal in response to an output pulse signal of said voltage detecting means; and switching operation means for causing at least one of said Q first FET power transistors and said Q second FET power transistors to perform high-frequency switching in response to said command signal;

and that said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees, said switching operation means produces a switching pulse signal in response to said command signal, and makes high-frequency switching operation of at least one FET power transistor among said Q first FET power transistors and said Q second FET power transistors in response to said switching pulse signal, and said state shifting means includes:
   adjusting means for producing a timing signal after an adjust time from detection of said detected pulse signal and another timing signal after another adjust time from detection of said detected pulse signal,
   shift hold means for shift-holding said holding state in response to said timing signal, and
   adjust changing means for changing said adjust time and said another adjust time of said adjusting means smaller in case that said command signal is larger than a predetermined value, thereby making the product value of said adjust time and said rotational speed of said rotor smaller and the product value of said another adjust time and said rotational speed of said rotor smaller in said case, and
   said voltage detecting means stops detecting of said detected pulse signal from a pulse timing of said detected pulse signal to said another adjust time by said another timing signal, said another adjust time being larger than said adjust time.

15. The motor in accordance with claim 14, wherein
said switching operation means includes:
   current-detecting means for producing a current-detection signal in response to or corresponding to a current from said voltage supplying means to said Q-phase windings, and
   switching control means for comparing said current-detection signal with said command signal and producing said switching pulse signal in response to the comparison result.

16. The motor in accordance with claim 14, wherein
said state shifting means shifts said holding state from a first state to a second state after a first adjust time from detection of said detected pulse signal, and further shifts said holding state from said second state to a third state after a second adjust time from detection of said detected pulse signal, said first adjust time and said second adjust time being substantially proportional to an interval of said detected pulse signal, and said adjust changing means changes at least said second adjust time, said second adjust time being larger than said first adjust time.

17. The motor in accordance with claim 14, wherein
said state shifting means changes active periods of said Q-phase first activation control signals and said Q-phase second activation control signals smaller in case that said command signal is larger than the predetermined value, each of said active periods of said Q-phase first activation control signals and said Q-phase second activation control signals being an electrical angle which is larger than 360/Q degrees.

18. A motor comprising:
a rotor which has a field part generating field fluxes;
Q-phase windings (Q is an integer of 3 or more);
voltage supplying means which includes two output terminals for supplying a DC voltage;
power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;

voltage detecting means for producing a detected pulse signal in response to terminal voltages of said Q-phase windings;

state shifting means for shift-holding a holding state from one state to at least one other state in sequence in response to the detected pulse signal of said voltage detecting means;

activation control means for controlling active periods of said Q first FET power transistors and said Q second FET power transistors in response to said holding state;

commanding means for producing a command signal in response to an output pulse signal of said voltage detecting means; and switching operation means for causing at least one of said Q first FET power transistors and said Q second FET power transistors to perform high-frequency switching in response to said command signal;

and that said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees, said switching operation means produces a switching pulse signal in response to said command signal, and makes high-frequency switching operation of at least one FET power transistor among said Q first FET power transistors and said Q second FET power transistors in response to said switching pulse signal, and said state shifting means includes:

adjusting means for producing a first timing signal after a first adjust time from detection of said detected pulse signal, a second timing signal after a second adjust time from detection of said detected pulse signal, and a third timing signal after a third adjust time from detection of said detected pulse signal, said second adjust time being larger than said first adjust time, shift hold means for shift-holding said holding state from a first state to a second state after said first adjust time from detection of said detected pulse signal in response to said first timing signal, and further shift-holding said holding state from said second state to a third state after said second adjust time from detection of said detected pulse signal in response to said second timing signal, and adjust changing means for changing at least said third adjust time of said adjusting means smaller in case that said command signal is larger than a predetermined value, thereby making the product value of said third adjust time and said rotational speed of said rotor smaller in said case, and said voltage detecting means stops detecting of said detected pulse signal from a pulse timing of said detected pulse signal to said third adjust time in response to said third timing signal, said third adjust time being larger than said second adjust time and substantially proportional to an interval of said detected pulse signal.

19. The motor in accordance with claim 18, wherein said switching operation means includes:

current-detecting means for producing a current-detection signal in response to or corresponding to a current from said voltage supplying means to said Q-phase windings, and switching control means for comparing said current-detection signal with said command signal and producing said switching pulse signal in response to the comparison result.

20. The motor in accordance with the claim 18, wherein said state shifting means produces said first adjust time and said second adjust time which are substantially proportional to an interval of said detected pulse signal.

21. A motor comprising:

a rotor which has a field part generating field fluxes;

Q-phase windings (Q is an integer of 3 or more);

voltage supplying means which includes two output terminals for supplying a DC voltage;

power supplying means having Q first FET power transistors and Q second FET power transistors for supplying a power to said Q-phase windings, each of said Q first FET power transistors forming a current path between one output terminal side of said voltage supplying means and one of said Q-phase windings, and each of said Q second FET power transistors forming a current path between the other output terminal side of said voltage supplying means and one of said Q-phase windings;

voltage detecting means for producing a detected pulse signal in response to terminal voltages of said Q-phase windings;

state shifting means for shift-holding a holding state from one state to at least one other state in sequence in response to the detected pulse signal of said voltage detecting means;

activation control means for controlling active periods of said Q first FET power transistors and said Q second FET power transistors in response to said holding state;

commanding means for producing a command signal in response to an output pulse signal of said voltage detecting means; and switching operation means for causing at least one of said Q first FET power transistors and said Q second FET power transistors to perform high-frequency switching in response to said command signal;

and that said activation control means produces Q-phase first activation control signals and Q-phase second activation control signals in response to said holding state of said state shifting means for controlling said active periods of said Q first FET power transistors and said Q second FET power transistors, each of said active periods being an electrical angle which is larger than 360/Q degrees, said switching operation means produces a switching pulse signal in response to said command signal, and makes high-frequency switching operation of at least one FET power transistor among said Q first FET power transistors and said Q second FET power transistors in response to said switching pulse signal, said state shifting means, in cooperation with said activation control means, changes active periods of said Q-phase first activation control signals and said Q-phase second activation control signals smaller in case that said command signal is larger than a predetermined value, each of said active periods of said Q-phase first activation control signals and said Q-phase second activation control signals being an electrical angle which is larger than 360/Q degrees, and said voltage detecting means stops detecting of said detected pulse signal from a pulse timing of said detected pulse signal to an adjust time, the product value of said adjust time and said rotational speed of said rotor being changed smaller in said case.

22. The motor in accordance with claim 21, wherein said switching operation means includes:

current-detecting means for producing a current-detection signal in response to or corresponding to a current from said voltage supplying means to said Q-phase windings, and switching control means for comparing said current-detection signal with said command signal and producing said switching pulse signal in response to the comparison result.

23. The motor in accordance with claim 21, wherein said state shifting means includes:

adjusting means for producing a first timing signal after a first adjust time from detection of said detected pulse signal and a second timing signal after a second adjust time from detection of said detected pulse signal, said second adjust time being larger than said first adjust time, said first adjust time and said second adjust time being substantially proportional to an interval of said detected pulse signal, shift hold means for shift-holding said holding state from a first state to a second state after said first adjust time from detection of said detected pulse signal in response to said first timing signal, and further shift-holding said holding state from said second state to a third state after said second adjust time from detection of said detected pulse signal in response to said second timing signal, and adjust changing means for changing at least said second adjust time of said adjusting means smaller in case that said command signal is larger than a predetermined value, thereby making the product value of said second adjust time and said rotational speed of said rotor smaller in said case.

* * * * *